United States Patent
Foroutan

(10) Patent No.: US 8,019,641 B2
(45) Date of Patent: Sep. 13, 2011

(54) SYSTEM AND METHOD FOR INTERACTIVE CONTESTS

(75) Inventor: Iman Foroutan, Santa Ana, CA (US)

(73) Assignee: Opusone Corporation, Orange, CA (US)

( * ) Notice: Subject to any disclaimer, the term of this patent is extended or adjusted under 35 U.S.C. 154(b) by 0 days.

(21) Appl. No.: 12/233,487

(22) Filed: Sep. 18, 2008

(65) Prior Publication Data

US 2009/0024457 A1    Jan. 22, 2009

Related U.S. Application Data

(63) Continuation of application No. 11/613,495, filed on Dec. 20, 2006, which is a continuation of application No. 11/359,816, filed on Feb. 22, 2006, now Pat. No. 7,162,433, which is a continuation of application No. 10/033,184, filed on Oct. 24, 2001, now abandoned.

(60) Provisional application No. 60/242,784, filed on Oct. 24, 2000, provisional application No. 60/302,612, filed on Jul. 2, 2001.

(51) Int. Cl.
     *G06Q 99/00*      (2006.01)

(52) U.S. Cl. .................... 705/12; 705/7; 705/8; 705/11; 707/607

(58) Field of Classification Search ................ 705/7–12; 707/607
See application file for complete search history.

(56) References Cited

U.S. PATENT DOCUMENTS

| | | | |
|---|---|---|---|
| 5,278,753 A * | 1/1994 | Graft, III | ........................ 705/12 |
| 5,772,446 A | 6/1998 | Rosen | |
| 5,875,432 A | 2/1999 | Sehr | |
| 5,936,916 A | 8/1999 | Nakayama et al. | |
| 5,963,916 A | 10/1999 | Kaplan | |
| 5,987,302 A | 11/1999 | Driscoll et al. | |
| 6,193,610 B1 | 2/2001 | Junkin | |
| 6,240,415 B1 * | 5/2001 | Blumberg | ............................. 1/1 |
| 6,532,448 B1 | 3/2003 | Higginson et al. | |
| 6,578,008 B1 | 6/2003 | Chacker | |
| 6,606,615 B1 | 8/2003 | Jennings et al. | |
| 6,631,404 B1 | 10/2003 | Philyaw | |
| 6,636,892 B1 | 10/2003 | Philyaw | |
| 6,754,348 B1 * | 6/2004 | Sako | ............................. 380/251 |
| 6,791,588 B1 | 9/2004 | Philyaw | |
| 7,152,156 B1 | 12/2006 | Babbitt et al. | |
| 7,162,433 B1 | 1/2007 | Foroutan | |
| 7,308,413 B1 * | 12/2007 | Tota et al. | ......................... 705/7 |
| 2001/0037234 A1 * | 11/2001 | Parmasad et al. | ............... 705/12 |
| 2001/0049648 A1 | 12/2001 | Naylor et al. | |
| 2002/0120501 A1 | 8/2002 | Bell et al. | |
| 2003/0014428 A1 | 1/2003 | Mascarenhas | |

(Continued)

OTHER PUBLICATIONS

Irv Lichtman, "Notting Hill inks Kristofferson, Bowie seeks lyrical help", Dec. 5, 1998, Billard.*

(Continued)

*Primary Examiner* — Jalatee Worjloh
(74) *Attorney, Agent, or Firm* — Knobbe, Martens, Olson & Bear, LLP

(57) ABSTRACT

A system and method provide content review, distribution, ranking and access and automate creation and performance of contests among sets of content-based contestants. The system and method provide customizable interactive, ongoing, multi-level, multi-round contests with expert review of and filtered submission of content-based contestants. Among other advantages, providers may use the system and method to obtain expert and consumer review and ranking of their content.

26 Claims, 30 Drawing Sheets

U.S. PATENT DOCUMENTS

| | | | |
|---|---|---|---|
| 2003/0195795 A1* | 10/2003 | Chacker | 705/10 |
| 2003/0233274 A1 | 12/2003 | Urken et al. | |
| 2004/0093235 A1 | 5/2004 | Chacker | |
| 2004/0093249 A1 | 5/2004 | Chacker | |
| 2005/0004981 A1 | 1/2005 | Philyaw | |
| 2005/0108659 A1 | 5/2005 | Philyaw | |
| 2007/0186230 A1 | 8/2007 | Foroutan | |
| 2009/0024457 A1 | 1/2009 | Foroutan | |

OTHER PUBLICATIONS

IUMA Website Press Release Apr. 24, 200. "IUMA Presents Collage Musicomania National Championships". www.iuma.com.

"Panle to Give its Choice by Jan. 1. Songs Left in Contest to Go on Internet", The Associated Press Richmond Times-Dispatch, Richmond, VA, Oct. 18, 1999, p. B4.

"Demanding Attention Via Web Contests", Kellee Harris, Sporting Goods Business, Mar. 25, 1998 p. 16.

"E-Contest" through the Internet Association of Total Fashion, JTN Montly, Osaka, Japan, Sep. 2000, p. 114.

Want to Be a Famous Musician? CDnow's Unheard Contest Helps Dreams Come True, PR Newswire, New York, Aug. 4, 1998.

<http://www.garageband.com>, printed Jan. 17, 2002, and Internet Archive record of the same from <http://www.archive.org>.

<http://www.farmclub.com>, printed Jan. 18, 2002 and Internet Archive record of the same from <http://www.archive.org>.

U.S. Appl. No. 10/033,184, filed Oct. 24, 2001, Foroutan.

U.S. Appl. No. 11/359,816, filed Feb. 22, 2006, Foroutan.

U.S. Appl. No. 11/613,495, filed Dec. 20, 2006, Foroutan.

"Hollywood Film Festival". (retrieved from the internet and archived on www.archive.org)., Oct. 1997.

"Laughing Horse Productions ListServ", (retrieved from the internet), Jan. 13, 1997.

"New York City municipal finance professional wins MBIA forecasting contest", PR Newswire, Jun. 8, 1988.

"Swackhamer Peace essay contest", www.wagingpeace.org, (retrieved from the internet), 1997.

Sandelands, Ed, "Utilizing the internet for marketing success", Pricing Strategy & Practice, 1997.

Yamada, Denise; "Sorebutts 2000 Cushion Design Competition", Disability World, http://www.disabilityworld.org/March2000/English/TableofContents.htm, Issue No. 1, Mar. 2000.

\* cited by examiner

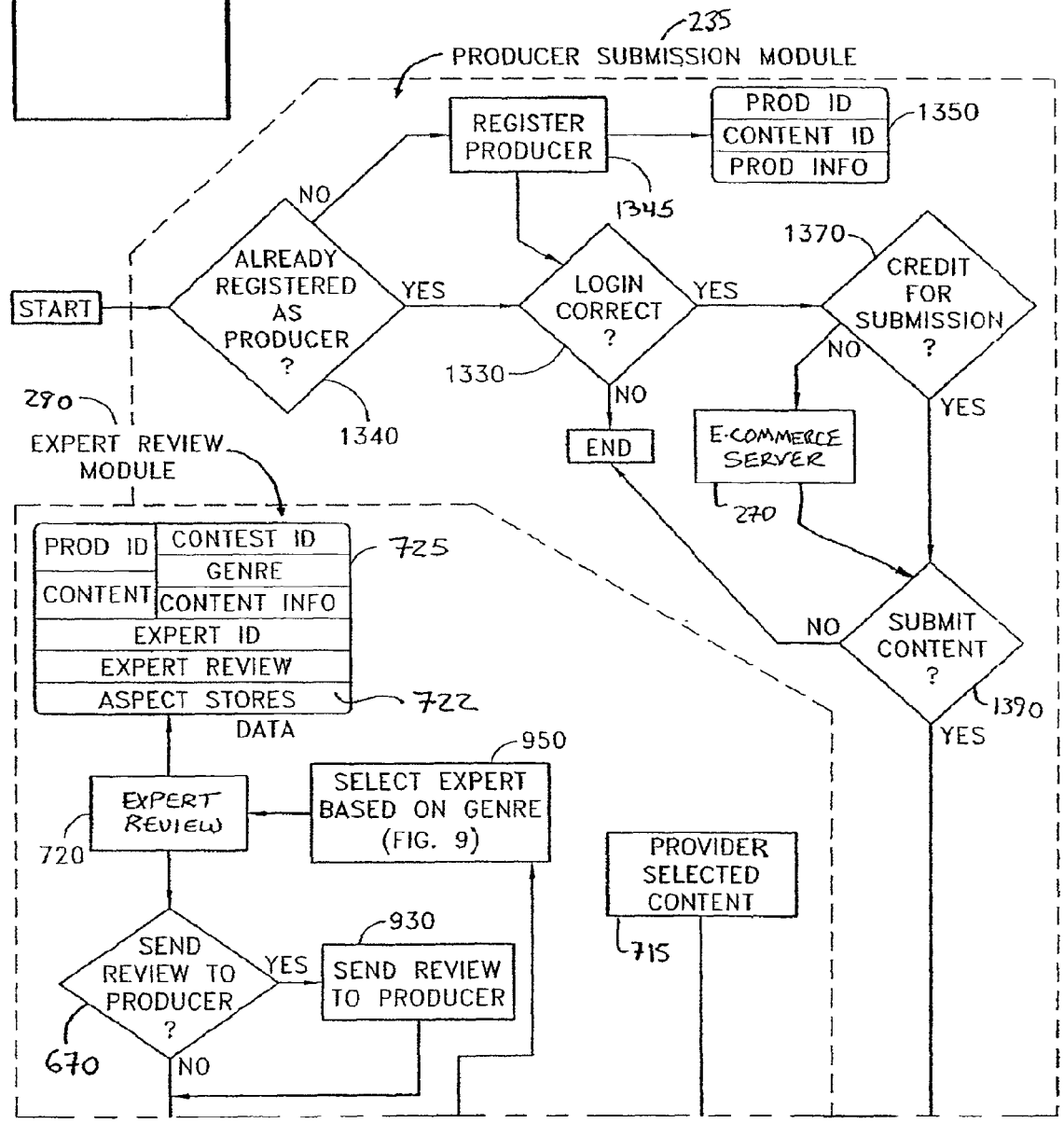

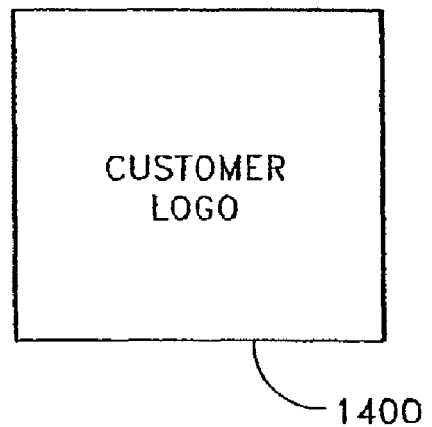
— 1400
DETAIL DESCRIPTION FOR: DJ DADDY
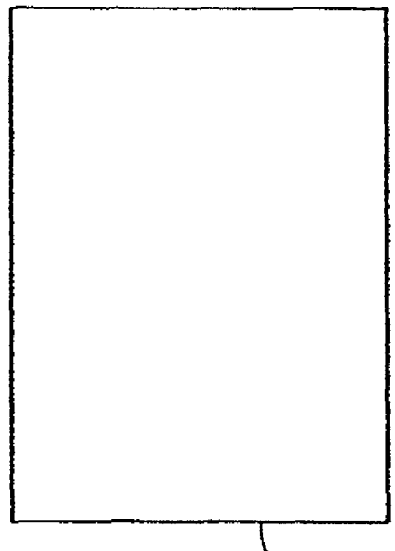
DETAIL DESCRIPTION GOES HERE.
DETAIL DESCRIPTION GOES HERE.
DETAIL DESCRIPTION GOES HERE.
DETAIL DESCRIPTION GOES HERE.
DETAIL DESCRIPTION GOES HERE.
— 1600
— 1610
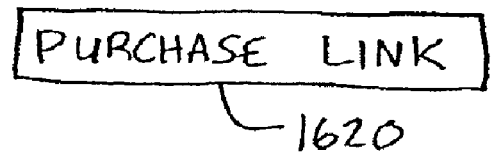
— 1620
*FIG. 18*

SWEEPSTAKES ENTRIES FOR: <u>NARAYAN RAMU</u>

OCTOBER 2000

 SUMMARY  DETAIL  [ SUBMIT ]

SUMMARY REPORT

| ACTIVITY | NO. | ENTRIES |
|---|---|---|
| REGISTRATION | 1 | 5 |
| OPT IN – NEWSLETTER | 1 | 5 |
| OPT IN – SPECIAL OFFERS | 1 | 5 |
| OPT IN – SHARE MY INFO | 1 | 5 |
| REFER-A-FRIEND | 10 | 200 |
| CORRECT VOTES | 31 | 248 |
| WRITING VOTES | 14 | 56 |
| ALL CORRECT VOTES | 0 | 0 |
|  | TOTAL: | 524 |

} 1800

DETAIL REPORT

| CONTEST | ACTIVITY | NO. | ENTRIES |
|---|---|---|---|
|  | REGISTRATION | 1 | 5 |
|  | OPT IN – NEWSLETTER | 1 | 5 |
|  | OPT IN – SPECIAL OFFERS | 1 | 5 |
|  | OPT IN – SHARE MY INFO | 1 | 5 |
|  | REFER-A-FRIEND | 1 | 5 |
|  | ALL CORRECT VOTES | 0 | 0 |
| BATTLE OF DJs | CORRECT VOTES | 31 | 248 |
|  | WRONG VOTES | 14 | 56 |
| BATTLE OF BABBIES | CORRECT VOTES | 12 | 200 |
|  | WRONG VOTES | 1 | 20 |
| BATTLE OF PIANISTS | CORRECT VOTES | 15 | 205 |
|  | WRONG VOTES | 14 | 120 |

MEMBER PROFILE FOR: JANE DOE

| | |
|---|---|
| MEMBER ID | 381 |
| FIRST NAME | JANE |
| LAST NAME | DOE |
| ADDRESS | 5 ELM ST. |
| CITY | STARVILLE |
| STATE | NY |
| ZIP CODE | 12345 |
| COUNTRY | US |
| EMAIL ADDRESS | JDOE@MKSTAR.COM |
| PHONE | 555-1212 |
| FAX NUMBER | 555-1212 |
| OPT IN – NEWSLETTER | YES |
| OPT IN – SPECIAL PRODUCTS | YES |
| OPT IN – SHARE MY INFO WITH OTHERS | NO |
| USER NAME | JDOE |

⎫ 1900

[EDIT] —1910    [RESET] —1920

FIG. 21

CONTEST DIRECTORY

| ID | CONTEST | DESCRIPTION | SPONSORING WEB SITE |
|---|---|---|---|
| 1 | ADAM & EVE | CONTEST OF BEAUTY | ADAM.COM |
| 2 | BATTLE OF DJs | VOTE FOR THE BEST DJ | DJ.COM |
| 3 | BATTLE OF NOVELS | VOTE FOR THE BEST NOVEL | NOVEL.COM |
| 4 | CARPENTERS | VOTE FOR THE BEST CARPENTER | WOOD.COM |

FIG. 22

TELL A FRIEND

REFER YOUR FRIENDS TO YCN AND EARN EXTRA SWEEPSTAKES ENTRIES. CLICK HERE TO SEE THE TEXT WE WILL SEND TO YOUR FRIENDS

| FRIEND'S NAME | FRIEND'S EMAIL ADDRESS |
|---|---|
| JOHN DOE | JDOE@NOWWHERE.NET |
| JIM DOE | JIMDOE@YCN.NET |
| JANET DOE | JANETD@YCN.NET |
|  |  |
|  |  |
|  |  |
|  | SUBMIT    RESET |

2300 — FRIEND'S NAME column
2310 — FRIEND'S EMAIL ADDRESS column
2320 — SUBMIT
2330 — RESET

1400 — CUSTOMER LOGO

MENU

HOME
LISTEN
CONTEST
SUBMIT SONG
MY PICKS
REFER FRIEND
LOGOUT
SEARCH

1430

Contest Name: [_____] 2600

Contest Web Address: [http://_____] 2610

Please pick your contest template below. Please note that each Round runs for 1 week. You will be able to specify the exact start date and time later.

|   | Style | Parameters | Price |
|---|---|---|---|
| o | TEMPLATE 1 | 1 Round<br>1 Room<br>2 Works min. | $5 |
| • | TEMPLATE 2 | 2 Rounds<br>3 Rooms<br>4 Works min. | $10 |
| o | TEMPLATE 3 | 1 Round<br>7 Rooms<br>8 Works min. | $15 |
| o | TEMPLATE 4 | 4 Rounds<br>15 Rooms<br>16 Works min. | $20 |

2620

Contest Period (Voting Period per Round)  [Voting Period.]
One Day
One Week
Two Weeks...

MENU

HOME
LISTEN
CONTEST
SUBMIT SONG
MY PICKS
REFER FRIEND
LOGOUT
SEARCH

⏟ 1430

⎰ 2720

CONTEST DESCRIPTION
Please enter the text that you would like to be displayed on top of your contest pages

[                                                              ] — 2700

DISPLAY YOUR LOGO
This image will appear at the top of the contest pages as the customer logo.

o  Don't display a logo
   o  Logo URL
    [                    ] — 2710

PAGE BACKGROUND
  URL for Page Background Image
  [http://         ]  — 2730
  Select Page Background Color
  [#       ] (enter hex color value)

STANDARD TEXT SIZE/COLORS FOR CONTEST   — 2740
  Font Size     [-1 ◊]  ☒Bold  ☐Italic
  Font Color   [White. ◊] or [#        ] (hex color value)

HYPERLINK TEXT SIZE/COLORS FOR CONTEST   — 2750
  Font Size     [-1 ◊]  ☒Bold  ☐Italic
  Font Color   [Blue . ◊] or [#        ] (hex color value)

VISITED HYPERLINK TEXT SIZE/COLORS FOR CONTEST  — 2760
  Font Size     [-1 ◊]  ☒Bold  ☐Italic
  Font Color   [Red   ◊] or [#        ] (hex color value)

CSS STYLE SHEET   — 2770
Enter a CSS style sheet for the font, color and hyperlink attributes of you contest

MENU

HOME
LISTEN
CONTEST
SUBMIT SONG
MY PICKS
REFER FRIEND
LOGOUT
SEARCH

} 1430

CONTESTANT SELECTION

You are adding CONTESTANT 1 in
ROOM 1 ("HOUSE PARTY 1")  _2800_

| Contestant Name: | |
|---|---|
| Short Description: | |
| Picture URL: | http:// |
| Content URL: | http:// |
| Detailed Info: | _2810_ |
| Content Genre | Select Genre.... |
| Content Info | |

2820 {

CONTEST OVERVIEW

| GENERAL CONTEST INFORMATION | | | |
|---|---|---|---|
| Contest Name: | Battle of the DJ's | | EDIT |
| Template: | TEMPLATE 2 | | EDIT |
| CONTEST ROOM PROPERTIES | | | |
| ROUND | ROOM | ROOM NAME | # WORKS | |
| Semi-final | 1 | House Party 1 | 5 | EDIT |
| Semi-final | 2 | House Party 2 | 2 | EDIT |
| Final | 1 | Club Party | 2 | EDIT |
| CONTEST DURATION | | | |
| Contest Duration: | 2 Weeks | | |
| Contest Period | One Week | | |

FIGURE 29

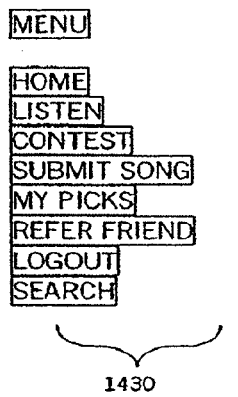

1430

CONTEST DISPLAY OPTIONS

Choose PUBLIC/PRIVATE Rooms
A public room means that your contest will be listed in the CONTEST DIRECTORY. Anyone visiting the directory will be able to click on your contest link. A Private contest will not list your contest in our directory. Your contest will only be available to people that visit your web site and click on your contest link.

| Public or Private Contest? | o PUBLIC | o PRIVATE |
|---|---|---|

2900

Choose CONTEST DIRECTORY LINK
If you choose YES, a link will be added to the bottom of your contest that shows all other contests your users can participate in. If you choose NO, no link will be added.

| Include Contest Directory Link? | o YES | o NO |
|---|---|---|

2910

Choose BANNER ADVERTISING
By default, banner advertising is added to the top of your pages. if you would prefer not to have banner advertising, choose NO.

| Allow Banner Advertising? | o YES | o NO |
|---|---|---|

2920

CUSTOMER AGREEMENT

| I agree to all the terms and conditions displayed herein, and by pressing ACCEPT... |
|---|

2930

| ACCEPT | REJECT |
|---|---|
| 2940 | 2950 |

SYSTEM AND METHOD FOR INTERACTIVE CONTESTS

CROSS-REFERENCE TO RELATED APPLICATIONS

This application is a continuation of U.S. patent application Ser. No. 11/613,495 entitled SYSTEM AND METHOD FOR INTERACTIVE CONTESTS filed on Dec. 20, 2006, which is a continuation of U.S. patent application Ser. No. 11/359,816, entitled SYSTEM AND METHOD FOR INTERACTIVE CONTESTS filed on Feb. 22, 2006, now U.S. Pat. No. 7,162,433, which is a continuation of U.S. patent application Ser. No. 10/033,184, entitled SYSTEM AND METHOD FOR INTERACTIVE CONTESTS, filed Oct. 24, 2001 and claims priority under 35 U.S.C. §120 from U.S. Provisional Patent Application No. 60/242,784, entitled "VIRTUAL EXPERT REVIEW SYSTEM AND MARKETING MACHINE", filed Oct. 24, 2000, hereby incorporated in its entirety by reference, and U.S. Provisional Patent Application No. 60/302,612, entitled "CONTEST CREATION SYSTEM", filed Jul. 2, 2001, also hereby incorporated by reference in its entirety.

BACKGROUND OF THE INVENTION

1. Field of the Invention

The present invention pertains to contests, ranking, and review of content and specifically relates to systems and methods for creating, hosting and/or distributing automated contests, rankings and reviews of content.

2. Description of the Related Art

There are few effective paths for producers of content to receive expert reviews of their works, whether the content is audio-visual (movies, music, books, scripts, etc.), products (food, cloths, wine, electronics, toys, etc.), or services (employee evaluations, tests, etc.) Similarly, outside of extensive demographic research, it is difficult for producers of content to obtain marketing research and consumer feedback data about their works. Moreover, no system exists to provide automated contests, rankings and expert reviews in a system accessible to producers of content, industry experts, and/or consumer end-users over a network such as the Internet.

Content producers frequently seek to conduct online promotions of media content inviting interactions with end-users such as purchases, forms, polls, discussions and the like. Ordinarily, a service provider, who links the content producer with consumer end-users over a network, develops static means to distribute content. Interactive capabilities for existing service providers require extensive programming by each service provider and by each content producer who wishes to distribute content. Large existing content providers, Internet content distribution sites, and peer-to-peer file-sharing networks each have distinct disadvantages.

For example, content distribution companies cannot easily find the best new artists, authors or producers of content using existing methods. Reciprocally, consumer end-users of content cannot easily find the best content, be it music, books, movies, or other creative works in any particular genre. Similarly, consumer end-users cannot readily find widespread objective reviews of products or content.

In the music industry, for example, artists generally need large content distribution companies to market and distribute their content. However, it is difficult for most artists to get the attention of the people in the industry who can start this process. Artist and Repertoire (A&R) personnel usually receive more unsolicited submissions than they have time to review, and ask that artists submit content through a qualified music industry professional such as an agent, manager or attorney. The costs of hiring such representatives are prohibitive for most new artists. In most cases, an artist who sends a demo to an industry professional will get no attention. Unsolicited content from artists or unsolicited products is also a problem for industry professionals. These professionals generally do not have the time and resources to wade through a large undifferentiated volume of unsolicited materials to find the few worthy of investment.

A provider is, for example, a web site operator, an Internet service provider, an online promotions manager, an interactive television producer, a kiosk provider, a game console provider, a set-top box provider, and the like. Content is created by a content producer, such as, for example, an artist, author, designer, and the like. It is foreseen that a service provider can be a content producer.

Some interactive operations such as web-polls, media ratings, purchases through electronic "shopping carts", or interactive discussion forums are available to providers from third parties. A provider can, for example, subscribe to a web-poll created by a third party, for example, to provide a simple poll of the provider's end-users for marketing, trivia, entertainment, research purposes, and the like. A web poll is an interactive operation where the responses are collected and ranked by frequency or are compared with a predetermined correct answer. However, current web-poll interactive operations do not simultaneously allow for flexible media content, such as videos, audio, or virtually any playable content, do not allow for adjustable scoring mechanisms, do not allow for registered end-users, do not allow for multiple round contests such as elimination contests, do not allow for scorekeeping among end-users, do not allow for demographic correlation and marketing data interpolation, do not allow for concurrent sweepstakes based on web poll voting, and do not allow for complete customization of the interactive operation elements to be provided by the third party to the provider.

A provider can similarly subscribe to a third party shopping-cart in order to provide standardized electronic commerce functionality (purchases, product information, returns, and the like) for the end-users of the provider's service. However, in addition to lacking those elements described above, shopping-cart interactive operations provided by third party systems do not provide for interactive, customizable non-purchase content and statistics, individual end-user information for interactive content. Such existing systems fail to provide cross-correlated content, demographic information, sweepstakes correlated to end-user selections, and end-user voting on media content, purchase items, and the like wherein the voting can be correlated to marketing, sweepstakes, and demographic information.

Similarly, a number of companies have attempted to provide a central location for content providers, such as new artists, to distribute their content via a global telecommunications network such as the Internet. But these companies do not typically provide access to industry professionals at all, nor do these companies provide much assistance to consumer users or fans or enlist their services to gather useful feedback. To the extent current companies rank content by popularity (based on, for example, the number of votes, number of downloads, or number of web-site "hits"), these rankings are subject to ballot-stuffing and voting by a non-representative set of listeners. Furthermore, Internet content distribution sites often feature the music of so many artists that only a few can receive a significant share of the attention. For example, at one point Mp3.com, an Internet content distribution site focusing on music, hosted over 500,000 songs and 80,000 artists in its database. Thus, very few songs or artists could be featured or popularized.

In addition, ranking content popularity by the number of downloads or streams selected off a site is ineffective as it is easy to inflate a ranking if the same person performs multiple downloads using available software. This problem is aggravated by the fact that, once such an artificially ranked song attains a high ranking, it is likely to be downloaded or streamed by future visitors, who prolong the effect of the artificially high ranking. As a result, consumer end-users cannot find the best content and express their opinion in an effective manner, industry experts cannot find the best producers of content for development, and producers of content do not have an efficient means for marketing, distributing and receiving feedback on their works from experts, other content producers, and end-users.

SUMMARY OF THE INVENTION

What is needed is a system which provides interactive contests, rankings and distribution of content for any number of content producers, service providers, consumer end-users and/or industry experts. In particular, there is a need for a system including multiple multi-level contests for any number of end-users and any number of content providers, allowing, among other features, a content producer to submit content for the contest, industry experts to review content and seek out top content, and end-users to rank, vote for, and seek out the content.

In one embodiment of the present invention a third party interactive contest server ("TPICS") is provided with customizable and interactive contest operations. The provider has wide ranging control over the form of the content review or contest system, media content for the contestants or reviewers, the information gathered from the contest or reviewers, and the scope of end-users allowed access to the contest or reviewing process. Producers can submit content to the system, end-users can vote for content in multi-level contests, and industry experts can rank content or vote for content.

One embodiment of the present invention allows a content provider to register with a TPICS system, and then use the TPICS system to develop a contest or other interactive operation. Once the contest has been created, the TPICS system gives the provider code to couple the newly-created TPICS contest with the provider's pre-existing service (such as an existing web site, interactive television system, kiosk, game console, online promotion, set-top box, and the like). The provider adds or integrates this code with the existing service. As a result, end-users of the provider's service have access to the newly-created TPICS contest through the provider. The end-users participate in the TPICS contest through the provider, and the TPICS contest can appear integrated with the provider's service. The TPICS contest is typically located at the TPICS system, but can also be located at the provider's service.

One embodiment of the present invention provides a TPICS system accessible to any number of providers. The TPICS system is linked to the provider's service via any type of code over a closed, local, wide area, or global network. The TPICS provides any number of contests, where the contests can be run independently and simultaneously by one or more content providers. A contest can allow content providers to submit content for expert review, filtering and possible inclusion in a contest, or a contest can use pre-selected content chosen by the creator of the contest. The TPICS system can be adapted to other interactive operations besides contests, and is particularly suited for online promotions of media content.

In one embodiment, the present invention is a TPICS system comprising: (1) a computer readable storage, (2) expert information including information identifying experts and an expert selection criterion (such as expert genre), the expert information stored in the computer readable storage, (3) voter information identifying voters, the voter information stored in the computer readable storage; (4) a producer submission module, the producer submission module responsive to a request to submit content to serve a content submission page prompting a producer for content information, the content submission module responsive to content information received in response to the prompting to store in the computer readable storage at least part of the content information; (5) an expert review module, the expert review module responsive to the receipt of the content information to notify a set of the experts that content is available for expert review, the expert review module selecting each of the set of experts by scanning the content information (such as a content genre) and using the expert selection criterion (such as an expert genre), the expert review module responsive to a review request from an expert to serve a content review page prompting an expert for review information, the expert review module responsive to review information received in response to the prompting for review information to store in the computer readable storage at least part of the review information, the stored review information including ranking data representing a ranking of a content (such as an aspect score); (6) a filtering module responsive to a satisfaction of a filtering threshold to access stored review information and to select a set of top scoring content by scanning ranking data in the review information and selecting each content work having corresponding ranking data satisfying a selection algorithm, the filtering module adding each of the selected top scoring content work to a contest pool; and (7) a contest module responsive to a satisfaction of a contest period threshold to serve to each of a set of voters identified by the voter information a contest page presenting a visual representation of at least a pair of content works from the contest pool and to prompt each of the set of voters to vote for at least one of the visually represented content works, the contest module responsive to a satisfaction of a contest period threshold to select at least one winning content work from the content in the contest pool by scanning votes received from the set of voters, the contest module responsive to requests to view the contest to serve a contest presentation page visually representing a current state of a contest.

TPICS provides a modularized set of contest serving, contest creation, contest management, database management, expert review, content submission and administration code modules. The contest server module provides formatted contest content to one or more selected provider services in online contest or online promotions, through an apparatus such as a web server, interactive television server, and the like, either directly, or indirectly through the provider service to the provider's end-users, thus permitting end-users to play in the provider's contests and interact with both TPICS content and provider content. The contest creation module enables providers to create, format, and initialize customized contests employing any media and multiple form designs. The contest management module permits providers and TPICS administrators to control future, ongoing, and completed contest operations.

The database management module permits some combination of end-users, providers, and TPICS administrators to interact with interrelated databases including, for example, provider registration information, end-user registration information, provider contest information, end-user contest information, provider sweepstakes information, end-user sweepstakes information, provider marketing information, end-user marketing information, provider commerce information, end-user commerce information, provider security information, end-user security information, and the like. In one embodiment, the database management module is a standard SQL server which serves as an interface between the numerous databases and the contest server, allowing contest forms to be customized and served to end-users.

In one embodiment, the expert review module provides a distributed expert review system for detailed review of media content, where the expert review can be provided directly to the producer of the content, or the expert review can be used to filter content for inclusion in a multi-stage contest. A content submission module provides for submission of media content by third party content providers to a TPICS system. An administration module permits TPICS administrators to have control over the scope, permissions, and general functionality of a TPICS system.

One embodiment comprises a contest management module provides service providers and TPICS administrators with interfaces to control future, ongoing, and completed contest parameters, end-users, and content; a database management module which provides providers and TPICS administrators to perform general database management functions for interrelated databases including, for example, provider registration information, end-user registration information, provider contest information, end-user contest information, provider sweepstakes information, end-user sweepstakes information, provider marketing information, end-user marketing information, provider commerce information, end-user commerce information, provider security information, end-user security information, digital rights management information, content information, and the like; an administration module, which provides TPICS administrators with an interface to manage the scope, permissions, and general functionality of a TPICS system; and, a modular contest server which can use both internal TPICS databases and external databases provided over a network for TPICS operations In another embodiment of the invention, a third party interactive contest server comprises: (1) a computer readable storage, (2) a microprocessor, (3) a contest server module comprising instructions executable by the microprocessor, (4) a first contest including first contest data stored in the computer readable storage, the first contest data representing first and second sets of works, the contest server module responsive to a first set of votes to identify a first selected work from the first set of works, the contest server module responsive to a second set of votes to identify a second selected work from the second set of works, the first and second sets of votes received within a predetermined time, and (5) a second contest including second contest data stored in the computer readable storage, the second contest data representing a third set of works including the first selected work and the second selected work, the contest server module responsive to a third set of votes to identify one of the third set of works.

One aspect of the invention includes a virtual expert review system and marketing machine, comprising: an expert review module, the expert review module accessible by an expert over a network, the expert selected based on expert information associated with the expert, the expert review module providing at least one selected work to the expert for expert review based on a correlation between work information associated with the work and expert information, the expert review module receiving an expert review of the selected work including at least one aspect score, and the expert review module associating the expert review with the selected work.

Another aspect of the invention includes a contest server comprising a contest including at least two contest rounds of at least two contest rooms, each contest room including at least two content works, the contest server serving the contest to a voter, the contest server receiving at least one vote from the voter for at least one content work in at least one content round.

In another embodiment of the invention, a contest method comprises (1) submitting first, second, third and fourth works for representation in a contest, (2) automatically generating representations of first and second contests, the first contest representing the first and second works, and the second contest representing the third and fourth works, the first and second contests substantially of the same duration and substantially coterminous, (3) receiving one or more votes for the first work in the first contest, (4) receiving one or more votes for the third work in the second contest, (5) automatically generating a third contest representing the first work and the third work, (6) receiving one or more votes for the first work in the third contest, and (7) automatically selecting the first work as a winning work.

BRIEF DESCRIPTION OF THE DRAWINGS

FIGS. 5A and 5B is a flow chart illustrating a representation of paths for content through an embodiment of a TPICS system;

FIG. 18 shows an overview of one embodiment of a contestant detail form;

FIG. 20 shows one embodiment of a sweepstakes history form;

FIG. 21 shows one embodiment of a profile form;

FIG. 22 shows one embodiment of a list of available contests;

FIG. 23 shows one embodiment of a referral form;

FIG. 26 shows one embodiment of a contest creation form;

FIG. 27 shows one embodiment of a contest format form;

FIG. 28 shows one embodiment of a contest creation form for provider selected content; and, FIG. 29 shows one embodiment of a contest options form.

DETAILED DESCRIPTION OF THE PREFERRED EMBODIMENT

System Architecture

Figure 1:
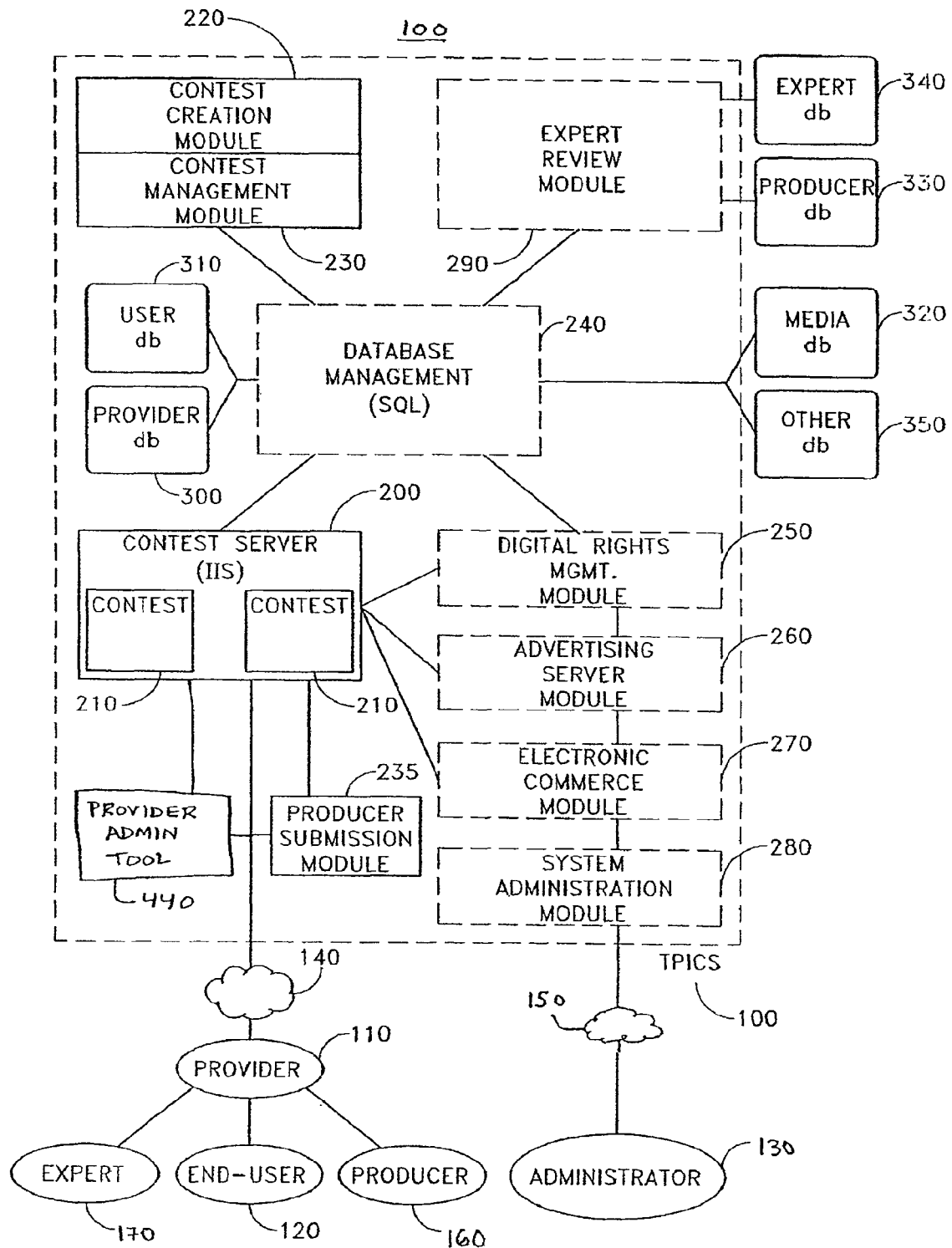
FIG. 1 shows an exemplary overview of an architecture for a TPICS system.

Aspects of the present invention may be embodied in a third party contest server or TPICS. FIG. 1 shows an overview of one exemplary architecture for a TPICS system 100. The TPICS system provides interactive operations to one or more providers 110, where end-users 120 use the providers' 110 services including the interactive operations. The TPICS system is maintained by an administrator 130, optionally through an administrative network 150.

Figure 2:
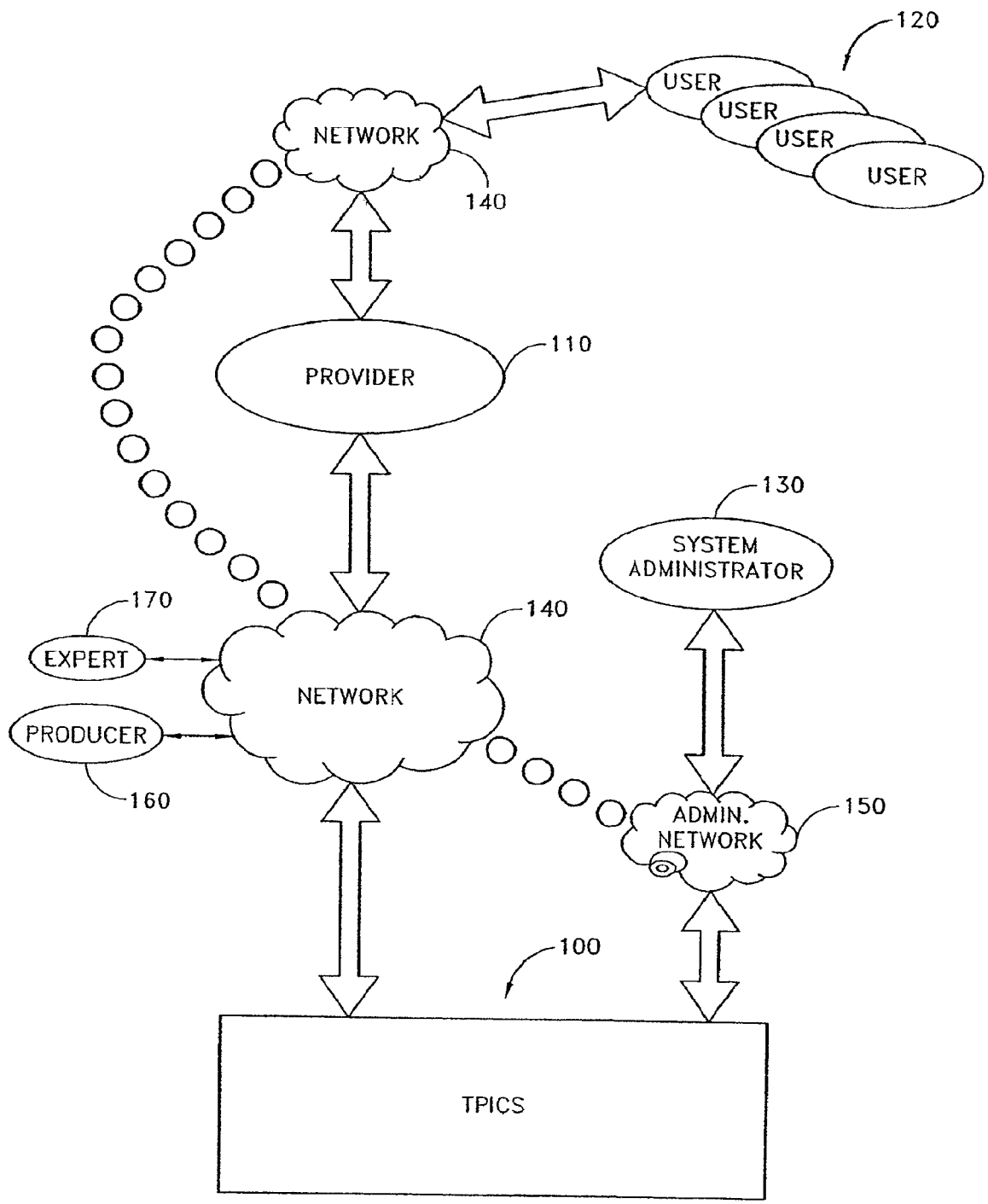
FIG. 2 shows an overview of system connectivity for one embodiment of a TPICS system.

The TPICS system 100 and its components and modules are accessible via a network 140 such as, for example, a local intranet, a phone network, a wireless network, a cable network, the Internet, and/or direct or indirect local physical connections, or a combination of any of these. The administrative network 150 can be a subset of the general network 140, a separate network, or a VPN (Virtual Private Network). FIG. 2 shows an overview of system connectivity for one embodiment of a TPICS system.

Turing again to FIG. 1, a provider 110 is generally any entity that provides network services, a producer 160 is any entity providing content of any type, an administrator 130 is an entity which maintains or controls aspects of contests and/or TPICS, an expert 170 is an entity providing reviews of content, and an end-user 120 is an entity using TPICS, for example, to review, rank or vote on content.

A provider 110 accesses the TPICS system 100 through the network 140. An end-user 120 accesses the provider 110 and TPICS system 100 by direct connection, by network 140, or by another network (not shown). For example, the end-user 120 in one embodiment reaches the provider 110 through a cable network, and the provider 110 then links through the network 140 to the TPICS system.

In one embodiment, a producer 160 of content and expert reviewer 170 of content also access a TPICS system in a similar manner. It is foreseen that any combination of one or more different network types can be used to connect a TPICS system 100, provider 110, end-user 120, administrator 130, producer 160, and/or expert 170.

A TPICS system 100 typically includes: a contest server module 200, which serves one or more contests 210 to end-users 120 over the network 140, a contest creation module 220 which assists in the development of contest forms, and contest management module 230 which controls contest options. One embodiment includes a producer submission module 235 for submission of content, and an expert review module 290 for review, ranking and filtering of content.

The TPICS system 100, in one embodiment, is a web-based interactive contest system which provides TPICS system 100 functions to numerous web-content producers: the TPICS system 100 includes a TPICS contest server 200 which serves contests 210 for third party providers 110, such as, for example, provider web sites or provider interactive television servers. TPICS end-users 120, in this embodiment, then access the TPICS server 200 either directly, through a URL of the TPICS server, or through the provider 110 which links the end-user to the TPICS contest 210 through code such as a URL, XML, or framed content, and the like. Content and information is transferred from TPICS to users via a "page" or a "form," which in one embodiment consists of a dynamically created combination of one or more HTML elements, database information retrieved via structured query language, and/or pre-formatted TPICS materials such as graphic images, text and style sheets (CSS), created by the contest server and served to TPICS users over the network. The "page" or "form" may use any other communications format, including interactive television formats and other network useable markup languages, which would allow transfer of pre-formatted and dynamically created "form" materials between the server and TPICS users.

Development of interactive operations such as contests and reviews typically occurs using well known development tools, such as, for example, some combination of hypertext markup language ("HTML") including uniform resource locators ("URLs"), Java®, JavaScript®, ActiveX®, CGI (common gateway interface), plug in software taking advantage of a known application interface protocol ("API"), a markup language variant such as XML, pre-existing or custom object modules or libraries and the like (hereinafter "code"). Alternatively, a provider can use prepackaged code (i.e., an "e-commerce server in a box," for example) to implement particular interactive operations on the provider's service.

In addition, the embodiment a TPICS system 100 can advantageously include one or more of a database management module 240, digital rights management module 250, an advertising module 260, an electronic commerce module 270, and a system administration module 280. As used herein, the term module refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are preferably implemented as software modules, but could be represented in hardware or firmware.

In one embodiment, each module is provided as a modular code object, where the code objects typically interact through a set of standardized function calls. In one embodiment, the code objects are written in a suitable software language such as C++, but the code objects can be written in any low level or high level language so long as the language permits the code objects to interact efficiently enough to provide at least one contest 210 to at least one provider 110. In one embodiment, the code modules are implemented in C++ and compiled on a computer running a content server, such as, for example, Microsoft® IIS or Linux® Apache. In one embodiment, Microsoft IIS is preferred, where the contest server 200 interfaces with various contest forms through a standard SQL (structured query language, a standard language for getting, sending and changing information in databases) server represented by the database management module 240. Alternatively, the code modules can be compiled with their own front end on a kiosk, or can be compiled on a cluster of server machines serving interactive television content through a cable, packet, telephone, satellite, or other telecommunications network. Artisans of skill in the art will recognize that any number of implementations, including code implementations directly to hardware, are also possible.

Contest Server

The contest server module 200 serves formatted contests 210 to one or more selected providers 110 and permits end-users 120 to play in contests 210 and interact with both TPICS content and provider content. A contest server can be placed on any microprocessor based system with a computer readable storage and a network interface, such as a web server, in one embodiment a Pentium-class based computer running web server software on a network. The contest server module 200, for example, determines what provider 110 is requesting a particular TPICS contest 210, determines what end-user 120 is accessing the contest 210, acquires the appropriate provider 110 data (including contest form data, contest media data, and contest customization data) from the provider database 300, acquires the appropriate end-user data (including end-user options data, end-user contest data, and end-user identification) from the end-user database 310, and the like. The contest server module 200 combines the database elements and form elements using, for example, a dynamic web page generation component of a web server or a real time interactive television component. Media elements can be stored at the provider 110, with the end-user 120 (in a direct or peer-to-peer form), at the TPICS system 100, or in an internal or external media/content database 320, where the external database is accessible over a network and can contain digital rights management features 250.

In one embodiment, an expert review module 290 allows pre-selected experts 170 to review content submitted by content producers 160. Information related to the content producers is stored in an internal or external producer database 330, and information related to experts is stored in an internal or external expert database 340. The expert review module is described in more detail in FIGS. 4 and 5 below, Other content elements used by the contest server 200 can be stored, for example, in an internal or external other database 260.

The resulting contest 210 is then transmitted as a completed contest form, via a network, to the end-user 120 (or in one embodiment, an expert or producer participating in contest voting as well). The transmission can be directly to the end-user 120 from the contest server module 200, can be indirect from the contest server module 200 to the provider 110, and then to the end-user 120, or can be indirect through a third party such as a third party software provider, internet service provider, cable provider, broadcast provider, online promotions site, and the like (not shown). The end user, along with producers and experts who participate in the contest, are voters in the contest.

It is foreseen that any combination of provider data, end-user data, contest data and media data can be combined to create contests 210, so long as some unique identification of the contest 210 to be provided, the provider 110 associated with the contest 210, and the media to be associated with the contest 210 is known to TPICS 100.

The TPICS contest server module 200 serves any number of contest elements. These elements include graphics, text, page formatting, audio-visual works such as, for example, movies, music or any other accessible media content, and at a minimum include an option menu, text, and at least one contest form.

Contest Creation

A contest creation module 220 provides an interface to providers 110 for creation, formatting, payment and initialization of customized contests 210 employing any media and multiple form designs. A provider 110 uses the interface form provided by the contest creation module 220 to provide sufficient information to TPICS 100 for TPICS to provide a contest 210 to the provider 110. For example, in one embodiment, a person accesses TPICS 100 through the contest server 200 and registers as a provider 110 of the TPICS system 100. Then, the provider 110 accesses the contest creation module 220 through a TPICS option menu such as, for example, a hyperlink, text command, button, and the like. The contest creation module 220 can include provider formatting options, such as a choice of contest templates, fonts, colors, graphics, text, and the like, or in one embodiment a choice of the provider's own code (such as, for example, custom style sheets ("CSS") or extensible markup language ("XML") which provides a completely customizable format in which to place TPICS contest elements. The contest creation module, for example, provides a contest creation form, through the contest server, to the provider, where the provider submits customization and configuration information to queries in the form. The form is then submitted back to the contest creation module through the contest server. An example embodiment of a resulting contest form is shown below in FIG. 16. Contest creation can be accomplished using standard selection boxes or other input methods available in HTML served to the contest creator for various options, through submission of XML or CSS code by the contest creator, through contest creator selection of a few pre-selected contest formats, and the like.

The contest creation module 220 can also permit the provider 110 to choose the form of a contest 210, including the type of contest 210. Types of contests include, but are not limited to, multi-round contests where each round features one or more pools of contestants in individual elimination contests, survivor contests where each round features a plurality of contestants and where in each round the highest vote-getter is eliminated from competition, traditional voting in one round where the highest vote-getter in one round wins the that contest round, or parliamentary voting, where each end-user has one or more votes or one or more weighted preferences to give to a plurality of contestants (i.e. an end-user has five votes to distribute in any way among ten contestants, or an end-user can select his preferences in a group of ten contestants by placing them in preference order, for example). Any number of alternative contest voting schemes can be provided, and the above mentioned voting schemes can be implemented as part of an online promotion of media content.

In one embodiment, the provider 110 can provide authentication of identity, or authentication of the provider 110 to be associated with the contest 210. In one embodiment, the provider can provide electronic billing information through an electronic commerce server 270 to pay for TPICS system 100 access, TPICS contests 210, and, for example, for a provider-run TPICS sweepstakes. The provider (or, alternatively, in one embodiment the TPICS administrator 130) can set a starting time for the contest 210, the length of the entire contest 210, the length of individual contest rounds, and, in one embodiment, time windows for end-users to vote in the contest 210.

Through a provider administration tool ("PAT") 440, the provider can register as a TPICS provider 110 and create TPICS contests 210. A provider 110 can create more than one contest 210. Multiple providers 110 can use a TPICS server 200 at the same time, and create multiple contests 210 through individual PATs 440.

The provider 110 can also submit the media to be the subject matter of the contest 210. The media can be any content accessible to the end-user 120, including, for example, audio files, video files, text, web pages, broadcasts, products, services, software, code and the like. The provider 110 can directly submit the media to TPICS 100 for market research or an online promotion of the media content, or, in one embodiment, the provider can submit code, such as, for example a URL or other reference to material hosted on the provider 110 or with a third party media database 320. In one embodiment, TPICS data can be stored in an internal or external other database 350.

Contest Management

A contest management module 230 provides providers 110 and TPICS administrators 130 with interfaces to control future, ongoing, and completed contest parameters, end-users, and media content. The contest management module 230 permits a registered provider 110 to access contests 210 the provider 110 has created on the TPICS system 100. For each contest 210 the provider 110 has created, the provider 110 can edit, add, modify or delete individual contest elements or entire contests 210. Depending on TPICS system 100 parameters, the ability of a provider 110 to modify contest elements once a contest 210 has begun can be limited, in order to protect end-users 120 who have already voted and in order to prevent contest fraud. Before the contest 210 begins, most or all contest parameters and customizations can be modified by the provider 110. After the contest 210 begins, the provider 110 can, in one embodiment, at least delete the entire contest 210 and can add, modify, or delete limited contest parameters which do not effect the outcome of the contest 210. In one embodiment, the provider 110 can delete contestants after a contest 210 has begun if contestants violate copyright laws, attempt to rig the contest, or if contestant media or links do not function properly. It is foreseen that any combination of features can be available to a provider 110 before, during and after the contest 210, depending on the needs of an individual TPICS system 100. In addition, the TPICS administrator 130 can access all contests 210 through the system administration module 280 to perform administrative tasks and deal with unforeseen events such as, for example, contestant media failure (i.e. the provider has provided an incorrect URL resulting in no media for a contestant), contestant copyright infringement (i.e. the provider has provided a link to a work without copyright permission), improper contestant content (i.e. the content violates terms of use or is otherwise inappropriate for the particular TPICS system 100), the provider is creating substantial burden on the TPICS system 100, and the like.

In one embodiment, the provider includes digital rights management information to ensure the media content can be provided to only authorized end-users 120. This digital rights management information and controls can be handled by external or internal digital rights management modules 250 to prevent unwarranted content distribution, such as those provided by Microsoft Corp. or InterTrust Corp.

Database Management

A database management module 240 provides providers 110 and TPICS administrators 130 general database management functions for interrelated databases including, for example, provider registration information, end-user registration information, provider contest information, end-user contest information, provider sweepstakes information, end-user sweepstakes information, provider marketing information, end-user marketing information, provider commerce information, end-user commerce information, provider security information, end-user security information, digital rights management information, content information, and the like. In one embodiment, all provider information is kept in a provider database 300. Similarly, the user information can be kept in an end-user database 310. A TPICS system 100 does not require all of these databases to function, and this list is provided only by way of example. The database management module, for example, can be an integral part of the contest server module 200.

Database categories above can be combined, further divided or cross-correlated, and any combination of databases 300, 310, 320, 330, 340, 350, and the like can be provided from within TPICS 100. In one embodiment, any portion of the databases can be provided externally from TPICS, either locally on the TPICS computer, or remotely over a network. The external data from an external database can be provided in any standardized form which TPICS can understand. For example, an external database at a provider 110 can advantageously provide end-user data in response to requests from TPICS in a standard format, such as, for example, name, user identification, and computer identification number, and the like, and the end-user data blocks are transformed by the database management module 240 into a function call format which the TPICS code modules can understand. Typically, the database management module is a standard SQL server, where dynamic requests from the contest server build forms from the various databases used by TPICS as well as pre-selected contest forms.

TPICS, for example, can function with only minimal information on end-users 120, providers 110, and contests 210. For example, end-user information can be stored that is sufficient to keep track of an end-user's voting history, such as an end-user identification number stored at the end-user's location (for example, in one embodiment as a "cookie", a personal identification number ("PIN"), or a public-private end-user identification key pair, and the like,) can be stored as an external user database 310. Additionally, information on providers sufficient to correlate contest information with provider services can be stored as an external or internal provider database 300. Contest information can be reduced to competitors such as, in one embodiment a URL to competitors' media content, for further example.

System Administration

A system administration module 280 provides TPICS administrators 130 with an interface to manage the scope, permissions, and general functionality of a TPICS system 100. Thus, the TPICS administrator 130 can control electronic commerce functionality, terms of use, contest types, contest availability, the flexibility of contest customizations, as well as all options available to an end-user 120 or a provider 110.

Figure 3:
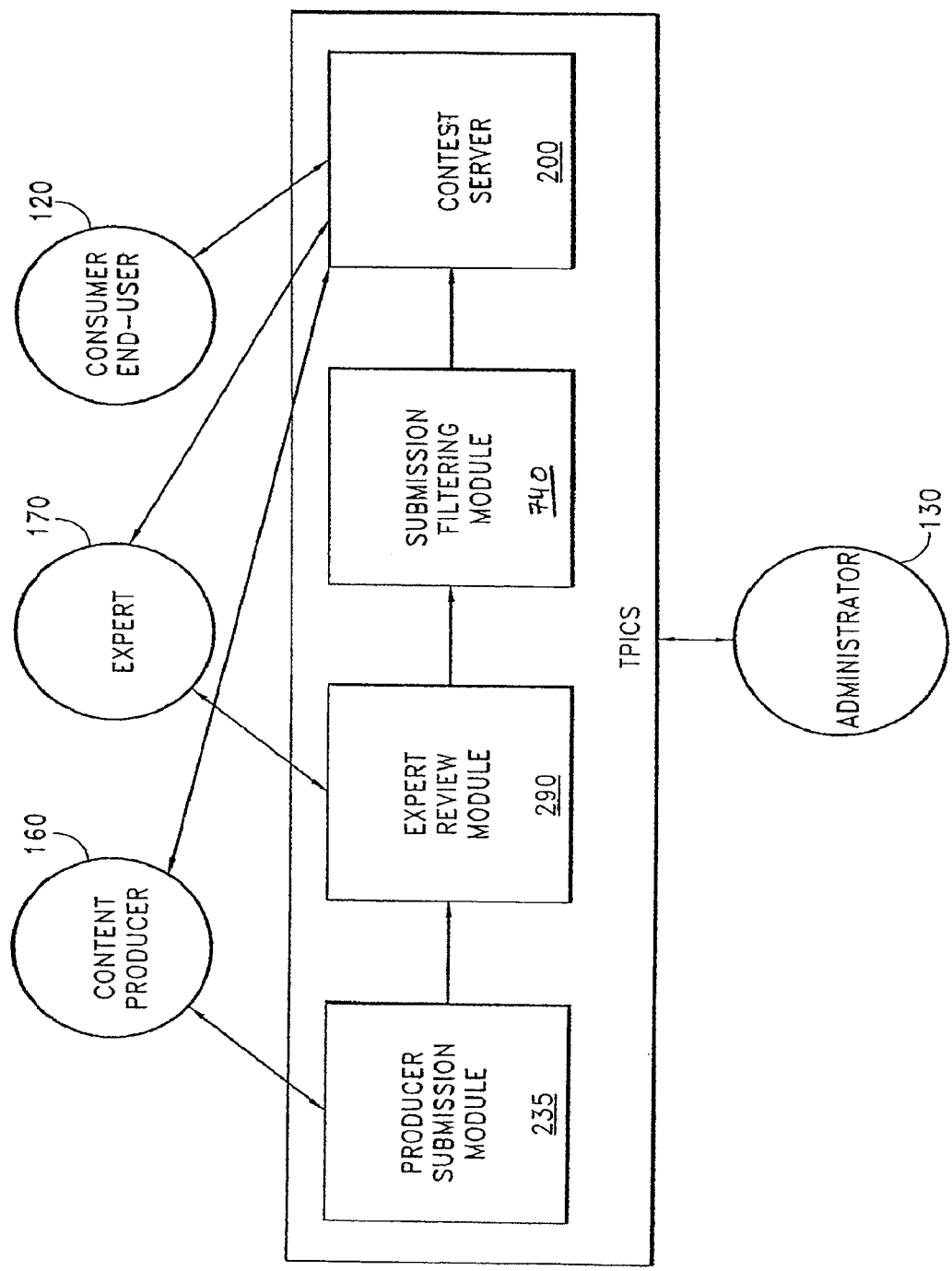
FIG. 3 represents a generalized overview of phases provided in one embodiment of a TPICS system.

FIG. 3 represents a generalized overview of phases provided in one embodiment of a TPICS system. The first phase is the submission phase, in which a producer/creator 160 of a work submits a work to a producer submission module 235 of TPICS. The producer submission module 235 then automatically forwards or makes available the work to an expert review module 290 in an expert review phase. In one embodiment, the expert review module 290 provides completed expert reviews compiled by experts 170 to the producer 160. In one embodiment, the expert review module 290 collects reviewed work until a selected number of works have been reviewed or until a selected period of time has passed.

In a submission filtering phase, a submission filtering module 740 uses an adjustable filter criteria, such as top review score, to automatically select and forward to a contest server 200 certain of the submitted and reviewed works. In the marketing and contest phase, the contest server 200 uses an adaptable consumer contest and marketing system to make the works available to consumer users 120 for voting, market research, distribution, and reviews. The marketing and contest phase typically uses the contest server 200 for these functions. These phases may be combined, adjusted, and adapted by an administrative user 130 who may control the TPICS system through the administrative module 280 (not shown).

User Connections

Figure 4:
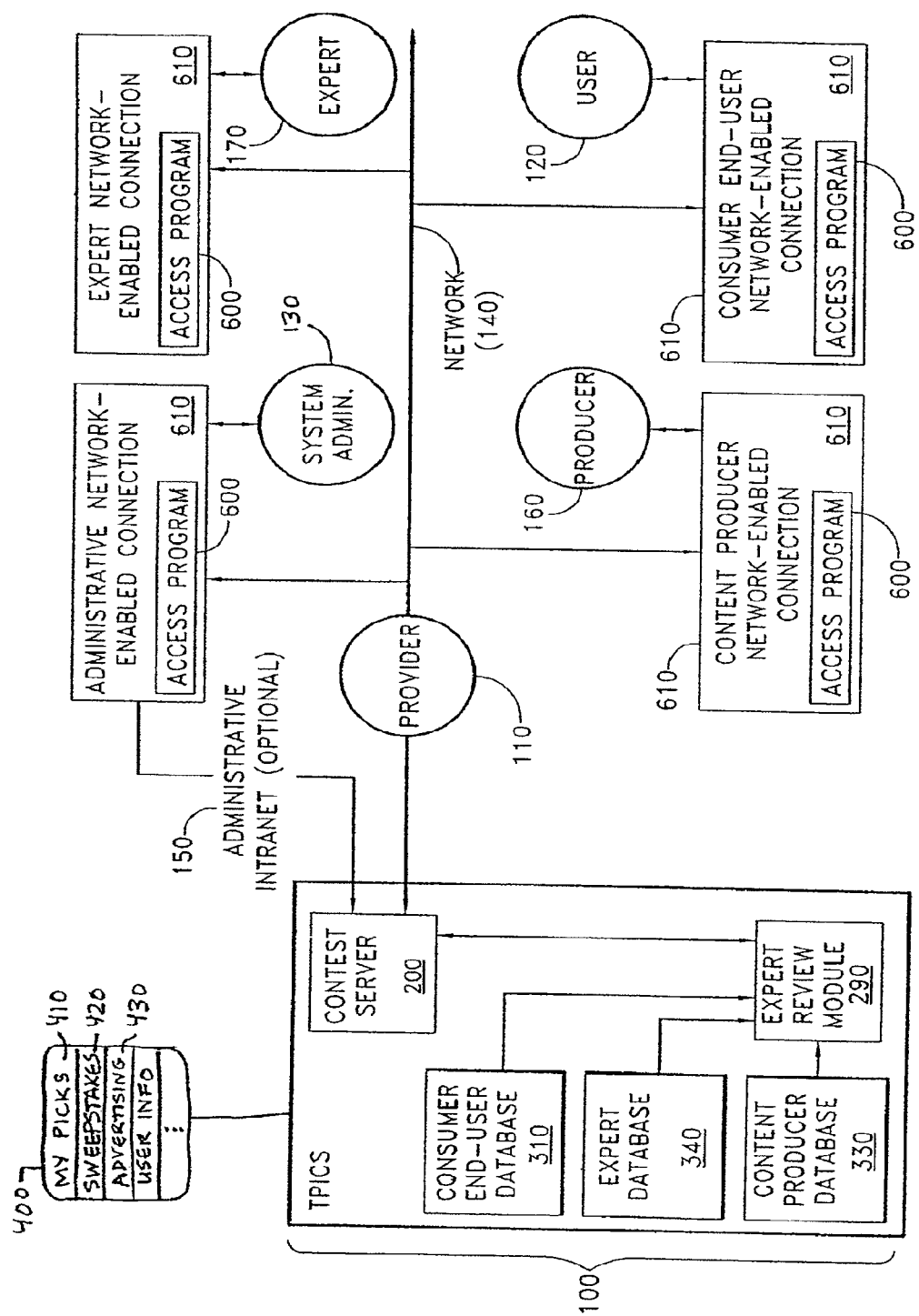
FIG. 4 shows an overview of one implementation of connections to a TPICS system.

Users connect to TPICS, in one embodiment, by using any network enabled connection. FIG. 4 shows an overview of one implementation of connections to a TPICS system. An access program 600 communicates information to and from users using TPICS forms. However, those of ordinary skill will appreciate that users may connect to computer-based systems in a variety of ways. For example, the network-enabled connection 610 may use an access program 600 such as a specialized computer application, a standard web browser, a terminal or console text or graphics window, database entry, or communications with an external program such as a database which automatically submits information to TPICS 100 based on external criteria.

For an expert 170, producer 160, or user 120, user identification is via some combination of passwords, encryption, metric, and/or a persistent client-side data, i.e. a cookie. Similarly, an administrative user 130 is represented via any combination of usernames, passwords, a client side cookie, or some sort of encryption regime.

FIG. 4 also illustrates an external user database 400, including a My Picks table 410 which holds data representing users' correct and incorrect votes, a My Sweepstakes table 420 which holds data representing users' sweepstakes entries and other types of credits (discussed in detail below), an Advertising table 430 which holds data representing user demographics or third-party advertising information, and other user information such as a unique user identification. Those of ordinary skill will appreciate that the external user database 400 is accessible over a network 140, and will also appreciate that an internal database may be used any may be accessible by direct physical (or other) connection.

First Example Embodiment of the Present Invention

TPICS allows producers, who are owners of any type of work, (i.e. content) such as but not limited to music, scripts, photographs, movies, recipes, short audio-visual clips, software, or other creative works, a physical product such as but not limited to a food, a drink, an electronic device, a toy, and so on, or a service such as but not limited to employee reviews, software engineering, professional services, etc., to submit their work or service on-line to be rated, ranked and/or reviewed by experts, consumers, fans, peers and/or by at least one accredited member of the related industry, company, or field of expertise.

TPICS automatically routes and/or makes available submissions to industry expert reviewers, who are, in one embodiment, pre-identified, pre-registered and qualified industry, company or field experts. These industry expert reviewers register with TPICS to review and score submitted works, and to provide their reviews and scores back to TPICS.

In one embodiment, the submitting artist or the producer receives the review or reviews once completed. The works submitted and reviewed are then automatically forwarded by TPICS into a general contest pool (GCP).

TPICS automatically calculates the total expert review scores of works submitted and, in one embodiment, filters top-scoring works from the GCP and automatically forwards those top-scoring works into a contest phase. In one embodiment, the contest phase comprises at least one or more sneak peek pools and/or at least one or more contest stages of elimination. The contest period is typically one week but may be any time or numerical period, or could be based on a pre-determined but adjustable number of works submitted, reviewed, and forwarded to the GCP.

In one embodiment, once the top-scoring submitted works are entered into the contest phase, the top-scoring works are advantageously forwarded to a sneak peek pool in which any combination of consumer users, producer users, and/or expert users can be given privilege to preview works submitted. For example, the sneak peek pools can be limited to only expert users. The expert users then have an early opportunity to identify new artists and producers whose works may be deserving of promotion and/or investment.

The works, after some one or more contest periods in the sneak peek pools, are then automatically forwarded, in one embodiment, to an elimination contest. In the elimination contest, consumer users (such as but not limited to members of the general public who have registered with TPICS, members of a target demographic group, or members of a specific group such as, for example, employees of a company), and/or accredited experts of the related industry vote for the submitted works in the contest. TPICS is capable of allowing different weight factors to be assigned to the votes from experts and consumer users. Advantageously, any combination of producers, experts and consumer users can be given access to voting in the contest, by the administrative user, and the weight of producer votes, expert votes, and consumer votes is adjustable. Also advantageously, non-registered users (i.e., the general public) can view the contest at any stage and thus gain the benefit of the experts' reviews and the voters' preferences and learn which works or products are being ranked higher than others.

The elimination contest, in one embodiment, includes one or more rounds of elimination voting between works submitted. Winning works for each round are determined by TPICS, in one embodiment, through, for example, selection of a pre-determined number of top-vote getters in each round, or through binary elimination style votes between works in each round.

If a work, in the contest phase, receives more votes than other competing works, and/or the work survives all elimination rounds, then the work is declared the winner. TPICS, in one embodiment, places the winning work in a highly publicized position on web pages served to users, provides a simple means of distributing the work, and/or provides access to industry experts to assist in further distribution of the work. In one embodiment, the producer of the winning work receives an award, receives credit towards electronic commerce transactions, and receives substantial advertising and promotion. This promotion can be through content served web pages, electronic mail, banner ad promotion, links to works or content, or access to industry experts.

Additionally, in one embodiment, as consumer users, producers, and/or experts vote in the contest or participate in other activities such as referrals, TPICS automatically awards them points for periodic sweepstakes. TPICS thus tracks all votes cast by users and automatically compares user votes with the actual outcome of contests to determine "correct votes" or "incorrect votes" cast by users. For example, a consumer user in one embodiment earns points for voting in the contest phase, earns more points for voting correctly in the contest phase, and earns more points for correctly guessing the winning work. For another example, a producer earns points for referring new producers to TPICS. The points can be used towards consumer sweepstakes entries, or, in one embodiment, points from referrals to TPICS are treated as credits, where the credits provide access to TPICS functionality, such as, for example, producer access to work submissions where accumulated credits replace a submission fee.

TPICS operates over a network, such as a global telecommunications network (e.g., the Internet), a local intranet, a private carrier, or a common carrier, or any combination thereof, and generally comprises a central computer program which controls a producer database, an expert database and a consumer user database. The producer database contains at least one of but not limited to producer contact information for producers registered with TPICS, work information, work category, the work or service submitted by such producer users, producer contest information, and accounting information. The expert database contains at least one of but not limited to information on expert users of TPICS, their category and specialty, expert works information, and accounting information. The consumer user database contains at least one of but not limited to information on consumer users registered with TPICS, consumer contest information, information on categories of interest, and accounting information. Each database may contain additional information as well, depending on the embodiment and use of TPICS. It is foreseen that the information necessary to run TPICS from the producer, expert, and consumer databases may be combined into any number of TPICS database other than three, and the description of three databases rather than a different number is merely for clarity.

Users such as producers, experts, administrators, and consumer users interact with TPICS through any network-enabled connection to the Internet, in one embodiment a computer with a web browser and a connection to the Internet. In another embodiment, for example, the connection is through a network-accessible device using a standard network protocol.

Users initially register with TPICS through this network-enabled connection, and the identity of a particular user can be maintained through any means of identification, such as any combination of usernames, passwords, metrics, or a client side persistent identifier such as a cookie. In one embodiment, through any web browser, users send and receive commands via a web server connected to the control software and TPICS databases described above. The web server in this embodiment also serves and receives works requested through the return of web-pages containing works from and for the TPICS databases. For example, information to be placed in the producer, expert or consumer database is gathered from TPICS-web pages after user input. Other web pages dynamically constructed by TPICS will include information extracted from the producer, expert or consumer databases. In an alternative embodiment, communication between TPICS and a network is accomplished using a standard network server, a daemon, a socket, or other standard network connection.

Advantageously, TPICS supports and connects intra-industry business paths. For example, in the music industry TPICS supports (1) B-B (Business to Business): For an annual fee, other businesses in the music industry may access a music-oriented sneak peek pool areas, described above, to discover and sign quality-screened talent before the rest of the world discovers them; (2) B-C (Business to Customer): TPICS can provide expert review services to the public for a fee; (3) C-C (Customer to Customer): Through TPICS, quality artists may promote and sell their products (songs) to the public; and (4) C-B (Customer to Business): Through TPICS, artists can present and market their products (songs) to the industry for purchase or licensing.

TPICS, in one embodiment, includes a payment system such as an electronic wallet or electronic commerce server to provide monetary transactions between TPICS and users, or between users themselves. The payment system is capable of being automated by the TPICS control software or controlled directly by users. TPICS also optionally includes a content or works access control system, to limit distribution of works beyond TPICS, through, for example, encryption of works or watermarking of works.

TPICS provides automated administration of: (1) various aspects of contests (number of entrants or elimination rounds, period of voting, length of time users preview works before the general public, amount of works available to users, the public or to some selected group of industry experts), (2) entry points in contests, (3) expert reviewer payments, (4) producer submission fees, (5) general accounting, and (6) categories that make up the reviews and works genres. This is accomplished through an administrative user who, at a network-enabled connection to the Internet, and once authenticated as an administrator, sends commands to and receives commands from TPICS through the web server.

TPICS is quite generic and flexible and lends itself to many uses in a variety of industries. In one embodiment a TPICS database management application permits a TPICS administrator to interact with various database tables to, for example, browse the existing records in any of the tables, enter new data and create new records in any of the tables, modify data in any existing record in any table, and also delete any record data in any of the tables. Such database management applications are common and supported by existing database applications such as, for example, Microsoft Access, Oracle, Sybase and FoxBase. Those and other database applications provide extensive database management application design tools, simplifying the design of database management applications, and those of ordinary skill understand well how to use the design tools to construct and operate such database management applications. Thus, the present invention is not limited by a particular database management application.

In one embodiment, the TPICS database management application permits a TPICS administrator to adjust parameters. Such adjustment may be performed on individual records and on entire contests.

Using TPICS, work submissions (e.g. music demos) can be categorized (given genres) in an unlimited number of categories (e.g. Jazz, Rock, Pop). Generally, a TPICS administrator establishes categories, such as, for example, music, fashion, literature and also establishes respective subcategories such as, for example, jazz, rock and pop, or shirts, shoes and pants, or novels, screenplays or poetry. In one embodiment, a TPICS administrator populates a submission category table and a submission subcategory table related by a category field. Those of ordinary skill will appreciate that any relational database system permits such tables and relationships, and further will appreciate that the category and subcategory information may be retrieved by query language statements such as those that may be formed from structured query language (SQL). It will further be appreciated that Web pages may be constructed dynamically including content information retrieved from a database. A web server may access a template web page, including logic such as can be formed with CGI scripts, or another scripting language, and may execute such scripts whenever it receives a request for the template web page. The scripts may include queries to a database to retrieve information that is formatted and included in a web page ultimately presented to the requesting user. In one embodiment, a submission template web page includes script logic which queries submission category and subcategory tables and which, using a returned record set, includes the submission category and subcategory data to construct a submission web page presented to an artist or producer. The submission web page may thus include categories and subcategories which can be selected by the artist or producer in submitting the work.

Using the database management interface, the TPICS administrator has total control over the number of categories used to review the work (e.g., vocal, music, lyrics), the range of scores for each of the review categories (e.g., 1 through 10, 1 through 100, etc.), the weight of each review category (e.g. more weight for music score than for production score, etc.).

Work submissions can be assigned unlimited numbers of other attributes (e.g. solo artist, a band with 5 members, a blond female vocalist, etc.) which, in a manner similar to that described in connection with category information may be determined by an administrator and selected by an artist or producer. Alternatively, the artist or producer may specify attributes in an attribute text box included on the submission web page. The attributes selected or provided are received by the web server and extracted for storage in the database.

The size of the sneak peek area can be expanded, in one embodiment by an administrator, to hold an unlimited number of work submissions. In one embodiment, the size of a sneak peek area is determined by a sneak peek size integer field in a sneak peek table in a database. One of ordinary skill will appreciate that the sneak peek table may include a record for each contest.

A TPICS administrator may also adjust the dimensions of any particular contest, using the database management application. Thus, in one embodiment, the TPICS administrator can shrink or expand a contest horizontally (e.g., number of stages in the contest, Preliminary, Quarter-Final, etc.) and/or can shrink or expand a contest vertically (e.g., number of matches in any stage of the contest, thus 8 matches in the Preliminary Round, 4 in the Quarter Final, etc.).

A TPICS administrator may also adjust the number of contestants in a match (e.g. 2, 3, 10, 100), the voting period of all contest rounds (e.g., one month) or contest stages (e.g. one week), and the relative weight of votes by industry and fan groups (e.g., 50%-50%, 40%-60%), the number of sweepstakes entries earned by users (e.g., 100 points for incorrect votes, 200 for correct votes, 150 points for correct votes when the total number of votes falls in a certain bracket with flexible lower and upper numeric boundaries).

TPICS also provides flexibility in routing submitted work to appropriate virtual staff. The routing can be done on category and/or subcategory bases, extracting, for example, physical or e-mail addresses from industry groups or other individuals associated with the category or subcategories, and then sending e-mails to those identified that a submission is available for review.

TPICS provides a submission phase and a review phase for automating expert review of any work or service over a network. TPICS also provides additional phases of product filtering and consumer contests/market testing. In one embodiment, a submission module handles functions associated with the submission phase, an expert review module handles functions associated with the review phase, and filtering and contest modules handle respectively, the functions associated with the filtering and consumer contests/market testing phases.

In the submission phase, a producer of a work submits the work to TPICS through any network-enabled connection. The producer submits the work and related information, in this embodiment, through fields in a dynamic TPICS web page. TPICS then automatically forwards the submitted work to an expert for review, and/or makes the submitted work available for an expert to first select and then review. If TPICS selects the reviewing experts, it does so based on selection criteria such as, for example, the category of the work, and then notifies the expert that work is available for review. Thus, in the review phase, the expert receives notification of the new work to review, in one embodiment through a TPICS web page accessible to the expert, or in another embodiment through an electronic mail message, voice mail message, or other automated notification.

The expert reviews the work, in one embodiment, through a TPICS web page which includes a link to a copy of the work or service (if possible, or in one embodiment, a link to a commercially available version of the work or service), fields for review comments, and at least one quantitative or descriptive aspect score with a minimum and maximum value. In one embodiment, the expert review, once received by TPICS, is automatically forwarded to the producer. This is accomplished, for example, by electronic mail or other automatic notification, or through a dynamic TPICS web page accessible to the producer.

In one embodiment, the reviewed works then enter a filter phase, in which a selected number of works with the highest expert review scores (computed using any selection algorithm such as, for example, the average of all aspect scores) are selected for a contest phase. In one embodiment, some selected number of reviewed works (including all or none) enter a contest phase, in which some combination of consumer users, experts and producers vote in one or more rounds of voting for winning works. The number of rounds, weight of voting, user accessibility to works in each round, and number of works in each round can be modified by an administrative user.

Figure 5B:
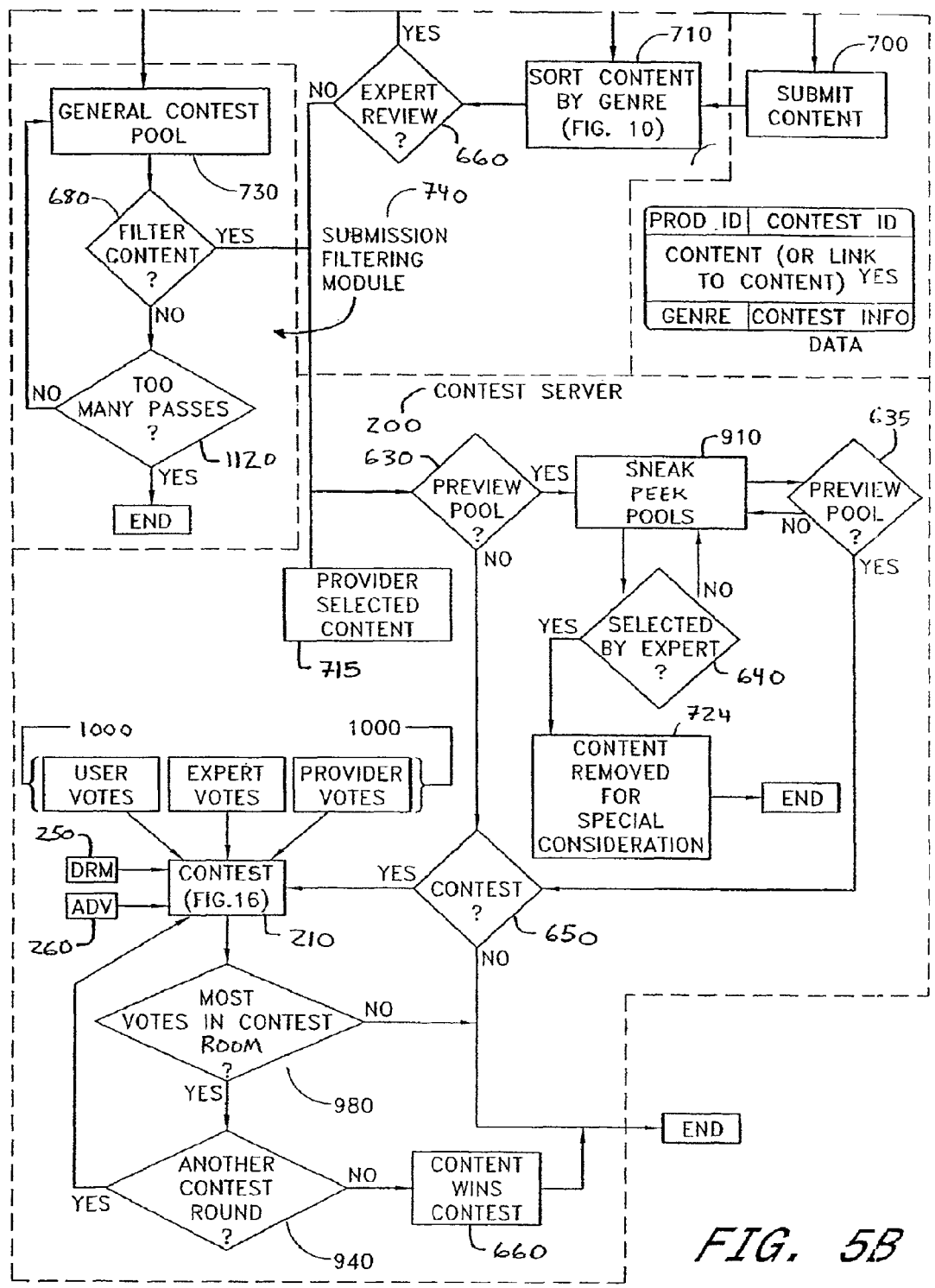

FIG. 5 (FIGS. 5A & 5B) is a flow chart illustrating a representation of paths for content submitted to one embodiment of TPICS, including a path through the producer submission module, expert review module, and contest server.

Typically, to use the producer submission module 235, a producer selects, from a standard form, to submit content to TPICS. In one embodiment, that module then performs a producer registration check 1340 to determine whether the user is registered as a content producer. If not, the user is registered as a producer 1345, and producer information 1350 is collected for TPICS. The registered producer then logs in, and login is confirmed 1330. If login is repeatedly unsuccessful, then the process ends. Otherwise, upon login confirmation 1330, the producer submission module 235 determines whether the producer has credit available for submission through a credit check 1370. Credit may be from, for example, sweepstakes entries, prior winning content submitted, coupons permitting free content submission, or monetary payment. If there is insufficient credit, the producer is forwarded to the e-commerce server 270 for payment, if payment is required in the particular embodiment of TPICS.

The producer then decides whether to submit content in an optional content submission query 1390, and, if so, then content submission 700 takes place. Otherwise the process may end.

Figure 15:
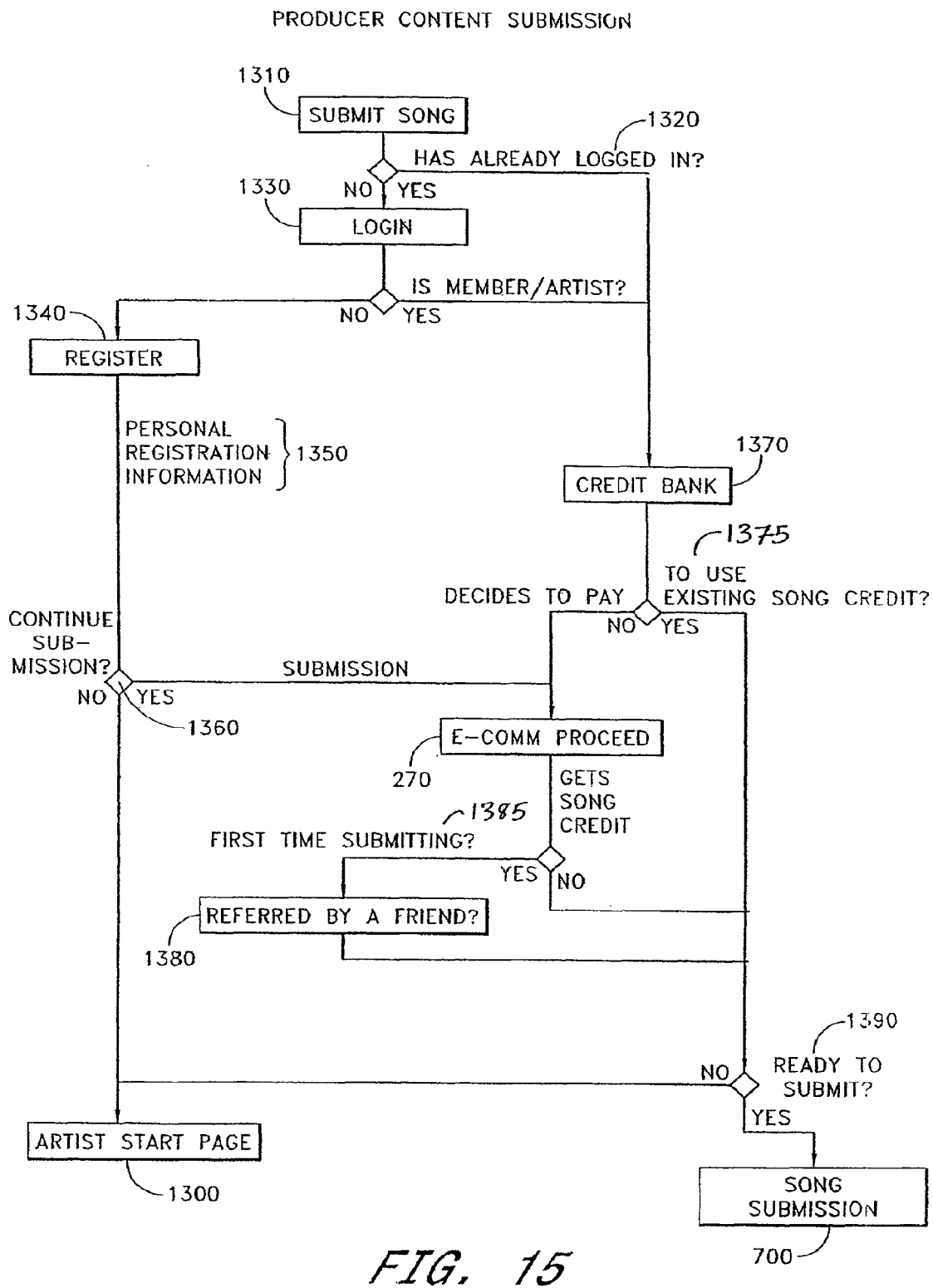
FIG. 15 represents acts performed by an a producer using one embodiment of TPICS to submit a song.

An example of the content data structure 705 containing the submitted content (or a link or reference to the submitted content hosted or stored by a third party) contains, for example, producer information 1350 including a unique producer identifier, the content or content link, and content information including, for example, content genre. The order of operations in the producer submission module 235 is variable, and another example of such a module is shown in FIG. 15.

The content is then forwarded, in one embodiment, to an expert review module 290. (In other embodiment, the content can be forwarded straight to the contest server, for example, based on an expert review query 660.) Alternatively, if the producer submission module is not used, provider selected content 715 can be submitted directly to the expert review module 290, or can be submitted along with provider selected content 715. The submitted content is sorted 710 by some identifying characteristic in the content information, such as, for example, content genre. If expert review is selected 660 for the content submitted, expert selection 950 takes placed based, for example, based on genre. This is shown for one embodiment in FIG. 9. If expert review is not selected, the content is forwarded to the contest server 200 at a preview pool query 630.

If expert review is selected, then an expert is selected 950, typically by matching the genre of the content to the genre of expertise of the expert, but also by other determinations including simply which experts are available for review. The selected expert or experts then reviews 720 the work. The resulting expert review data 725 may contain, for example, some combination of producer information, the content or a reference to the content, content information including the content genre, expert information, and the expert review itself. The completed expert review 725 typically contains at least one aspect score 722, a quantitative ranking that can be used to compare various expert reviews of various content. If TPICS is configured to optionally or always send a copy of the expert review to the content producer, a producer content review page 930 is forwarded the expert review for the content producer.

Figure 10:
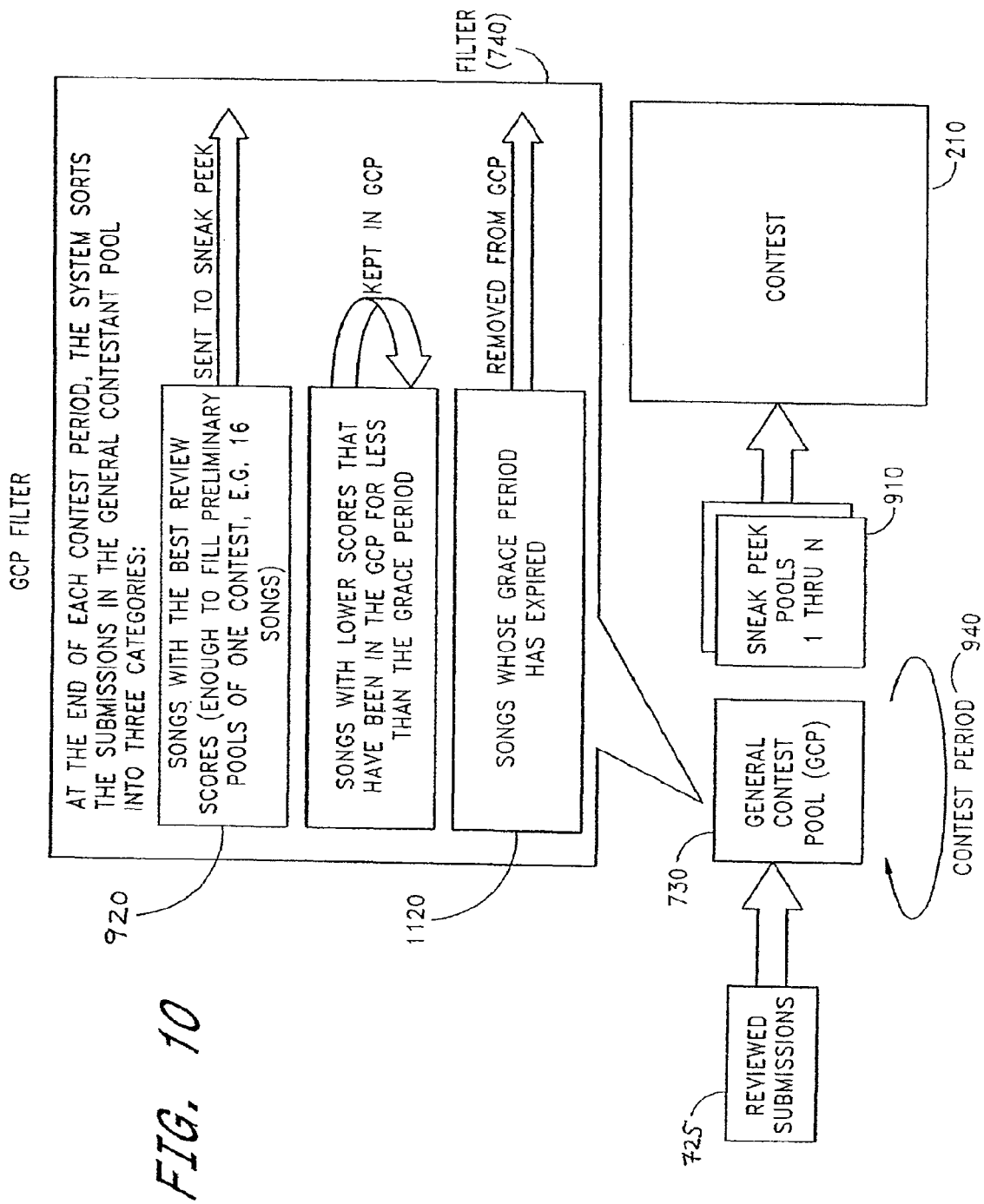
FIG. 10 illustrates a representation of the movement of submitted content through the general contest pool (GCP) in one embodiment of TPICS.

The reviewed works are then, in one embodiment, forwarded to a general contest pool (GCP) 730, where after a predetermined period of time the content in the GCP goes through a content filter 680 of the submission filtering module 740, which selects top submitted content to forward to the contest server. (One embodiment of this filter is shown in FIG. 10.) Those of ordinary skill will appreciate that other filters such as random selection filters may be used, or no filter at all need be used. Content not selected to go on to the contest returns to the GCP for a pre-determined number of passes 1120 through the filter, in one embodiment, after which, if still not selected for the contest, the content is disposed of.

Content selected through the expert review module and/or provider selected content introduced without expert review 715 is forwarded to the contest server. If TPICS is providing a preview pool 630, then the content is placed in a set of one or more sneak peek pools 910. The content in the sneak peek pool is available for preview by a subset of TPICS users, typically experts, for a pre-determined period of time. While in the sneak peek pool, experts using the sneak peek pool may select content for special consideration 724, at which time experts can use producer information and content information to directly contact the content producer. When the preview pool period is over 635, or if the preview pool is not selected for special consideration 724, TPICS moves the content on to the contest. If no contest is selected 650 (such as, for example, if the TPICS system is being used solely for expert review of content pre-selected by the service provider) then the path for the content ends. If a contest is selected 650, the content is forwarded to the actual contest 210. In the contest, (an example form of which is shown in more detail in FIGS. 11-14 and 16) some combination of end-users, experts, and providers vote 1000 for content in individual contest rooms (or stages) 980 and contest rounds 940, until winning content is selected 690. Typically, in each contest room (an example of which is shown in FIG. 17) each voter (an end-user, producer, or expert authorized to vote in the contest) votes for one or more of the content displayed. There are typically multiple contest rooms in each contest stage. Some combination of the winning content from each contest room in a contest stage, in one embodiment, moves to the next contest round, until all but a pre-selected number of content works are excluded. The one or more content works remaining are declared the winner of the contest, and the content producer winning the contest may receive, for example, credit within TPICS, certain contact information for interested experts, or a monetary prize. Optionally, the advertising module 260 may be used to add advertising support to forms served from the contest server containing one or more contests, and the digital rights management module 250 may be used to control distribution of content from the contest server.

Figure 6:
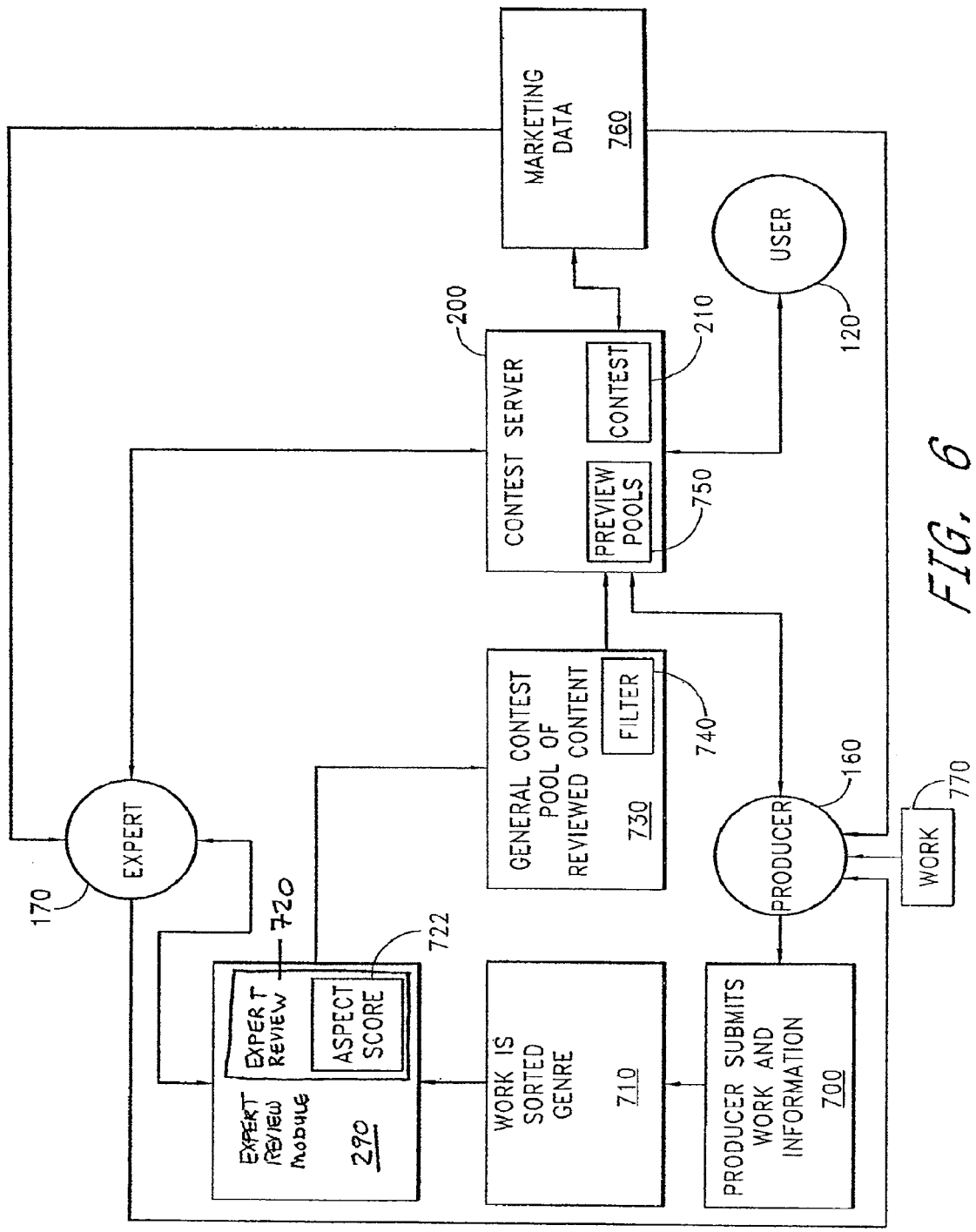
FIG. 6 illustrates a representation of the flow of content works through an embodiment of TPICS.

FIG. 6 illustrates a representation of the flow of content works through an embodiment of TPICS. A producer 160 uses a submission process 700 to submit a work 770 and related information to TPICS. The work 770 is put through a sorting routine 710 based on category and/or other work information, and the work 770 is automatically forwarded to an expert review module 290, where the work is typically made available to one or more experts 170 for an expert review 720. The one or more expert reviews 720, when completed, are forwarded (in one embodiment) back to the producer 160. In one embodiment, the expert review 720 contains at least one aspect score 722 which rates an aspect of the work using some quantitative metric to judge a characteristic of the work such as lyrics, technique, quality of writing, spelling, creativity, punctuation, and the like. The reviewed work then enters a general contest pool (GCP) 730 of reviewed work. In the GCP 730, in one embodiment, the reviewed works are put through a filter process 740 for those meeting selection criteria, such as, for example, top-scoring reviews or low scoring reviews, based, in one embodiment, on relative aspect scores 722 for compared works 770. In one embodiment, a selected number of reviewed works with a top score (e.g., the sixteen top-scoring works) are forwarded to the contest server 200.

The expert review module 290, in one embodiment, implements the multi-stage format of the contest server for multi-level expert review. Thus, works reviewed move to later rounds of expert review based on a voting algorithm applied to expert review aspect scores rather than traditional votes. In this manner, multi-tiered expert review of works can be achieved with or without inclusion of a contest.

In one embodiment of the contest server 200, experts 170 and consumer users 120 vote on works, through one or more rounds of elimination—contest rounds—voting between top-scoring works. In one embodiment, only experts 170 have access to submitted top-scoring works for some selected period, in a sneak peek pool 750. In one embodiment, consumer users 120 and experts 170 vote in a contest 210 on works, but consumer user 120 and expert votes are weighed differently. TPICS also supports an embodiment wherein only a subset of consumer users 120, meeting certain demographic or information criteria, are given access to a work, and/or the ability to vote on a work. In one embodiment, TPICS collects market-related data 760 and forwards it to experts 170, providers 110 and/or producers 160. Market-related data 760 may include, for example, user vote histories, user purchase histories, advertising data, and/or user demographic data, and the like.

Applications of the First Example Embodiment

In one embodiment, TPICS is configured to review clothing fashions. A producer of clothing submits the work to TPICS through a submission web page served by TPICS over the Internet. The submission includes, for example, multiple pictures of the clothing, textual descriptions of the clothing, information on the producer, and in some embodiments a submission fee. Optionally, physical embodiments of the clothing can be submitted via mail and distributed to expert reviewers via a mail distribution system attached to TPICS via a simple mailing database included in the expert database. Based on the category of the clothing, or randomly among all fashion expert reviewers, the expert review module automatically forwards the submitted work and related information to any number of expert reviewers (in one embodiment, three reviewers). The three reviewers provide standardized reviews of the work and related information, through dynamic review web pages served by TPICS to each expert reviewer. When each expert completes his or her respective review, the resulting review is automatically made available to the producer via electronic mail or a dynamic web page accessible to the producer.

In one embodiment, TPICS is configured to review wine or food. The submission and review steps are substantially the same as those described above for clothing. However, in this embodiment, the items reviewed (e.g., wines) go into a filtering phase, in this embodiment in a general contest pool (GCP). After a predetermined period of time (a contest period, lasting, in one embodiment, one week), TPICS automatically selects some number of those wines reviewed within the GCP with the top review scores (in one embodiment the highest average of all aspect scores for all reviews of each wine submitted) and places those wines in the contest phase. Wines remaining in the GCP are, in one embodiment, kept in the GCP for some selected number of contest periods; if a wine is not selected as having a top review score within the selected number of contest periods, TPICS removes the wine from the GCP. In the contest phase, in one embodiment, wine consumer users and experts vote on wines through dynamically created web pages. In each contest period, a selected number of wines with the top number of votes from consumer users and experts go on to the next round. After a selected number of rounds, one wine is selected as the winner. In an alternative embodiment, expert and consumer votes are weighted differently, such that, for example, an expert vote counts as the equivalent of two consumer votes. In one alternative embodiment, TPICS is configured to present the contest in an elimination fashion, such that consumer users and experts vote between numerous competing pairs of wines in each round, such that half of the wines in each round are eliminated and the winners in each round go on to the next round in the next contest period.

In another embodiment, TPICS is configured to review manuscripts within a publishing house. A producer/author submits the work to TPICS by using a web browser to fill in information on a submission web page. The submission includes, for example, a summary of the work, the manuscript, information about the producer, and in some embodiments a submission fee. Based on the category of the manuscript, or randomly among all literary expert reviewers, the expert review module makes available the submitted manuscript and related information to any number of expert reviewers (in one embodiment, one reviewer) over the network. The expert reviewer provides a review of the work by filling in fields and providing scoring information on a dynamic review web page served by TPICS to the expert, and the resulting review is automatically made available to the producer via electronic mail or a dynamic web page accessible to the producer. All manuscripts reviewed within a certain period (in one embodiment, one month, or in an alternative embodiment, any time until fifty works have been reviewed) go into a GCP. From the GCP, some selected number of works with highest total review scores, based on a computation involving at least one aspect score from the expert review (in one embodiment, the root mean square of all aspect scores for a manuscript reviewed, thus magnifying the effect of high scores received), are automatically placed in the contest phase. In one embodiment, in the contest phase, the selected manuscripts are made available to consumer users (in one embodiment, a selected larger group of employees of the publishing house, or a marketing sample of consumers, or a selected larger group of literary reviewers), who vote on the manuscripts in the contest phase. After a few rounds of elimination, some selected number of manuscripts with both top review scores and a high number of consumer votes are selected for publication by the publishing house.

In still another embodiment, TPICS is configured to review employees in a company. When an employee's review is due, the employee, an administrator or other personnel submit the employee's information, including, for example, a photograph, work record, sample work, and complaint history to TPICS through a console connection to TPICS running a text-based data entry application. Alternatively, this information can be automatically entered into TPICS from a pre-existing employee database that submits the required information to TPICS through any existing network connection between the TPICS database and the employee database. The employee information, once submitted, is automatically forwarded or made available (based on information in the employee records, at random, or based on category or department information) to a supervisor or one or more managers, who provides an expert review of the employee, including in one embodiment, three aspect scores (for example, in one embodiment, work efficiency, accounts opened, and complaints, each on a 1 to 10 scale). In one embodiment, this expert review can, but need not be forwarded to the employee or producer. Based on the expert review, a selected number of top review scores are forwarded to a first GCP for votes among experts (all administrators and supervisors) for a determination of which employees will receive a commendation. In one embodiment, this is the one or two highest ranked employees selected from the first GCP in a single voting period among only experts. The lowest scoring employees are forwarded to a second GCP for votes among experts (all administrators and supervisors) for a determination of which employees will receive a reprimand. In one embodiment, all employees reviewed are forwarded to a contest phase, in which consumers (all employees of the company) vote for employees. Each employee, in one embodiment, is given five votes, over one voting period. Based on high and low vote getters, reviewed employees once again enter the first GCP or second GCP for votes among experts. The results may advantageously indicate which employees get along best with other employees.

In one embodiment of the present invention, TPICS is configured to offer a Virtual Artist and Repertoire service (VAR) to artists (producers) such as musicians and industry experts (experts) such as music industry professionals. Artists (producers) and fans (consumer users) register with TPICS via the web server, and are provided access to some of the TPICS databases and web pages. An artist is one embodiment of a producer, industry is one embodiment of an expert, and fans are one embodiment of consumer users as described generally in connection with TPICS.

For a submission fee administrated by TPICS, an artist from anywhere in the world submits content (such as music) to receive a confidential Expert Industry Review (EIR) from a music industry professional on the Industry Review Board (IRB). Once the artist has submitted the content, and the artist has identified the content's particular genre, TPICS automatically makes the submission available to all industry professionals from the IRB with expertise in that genre, and the content is forwarded to the first industry expert who requests to review the submission. The EIR includes at least one or more aspect scores, each score rating on a numerical and/or descriptive scale an aspect of the content submitted. The automated TPICS submission system thus guarantees artists that all music content submitted will be heard in its entirety and reviewed by a music industry professional in a consistent, standard manner.

The artists who submit the best-reviewed content will also get exposure to potential buyers in the music industry through an artist and repertoire "Sneak Peek" system providing certain industry experts with preview access to high-ranked music, and through the contest. The selection of best-reviewed content is accomplished through any number of algorithms, the simplest of which is a selected number N of artists with the highest EIR scores. In one embodiment, the highest EIR score is, for example, calculated by a total EIR score, which is the average of the EIR aspect scores or the root mean square of the EIR aspect scores, although TPICS is capable of applying any algorithm which effectively distinguishes the top reviewed content submitted. An artist who receives high scoring reviews will get focused exposure to music fans during contests as well.

TPICS automates the contest. The number of artist submitted content items provided to the contest, the weight of voting, and most functionality of TPICS is adjustable by an administrative user. TPICS additionally provides for secondary contests, sweepstakes and content. TPICS can also provide incentives for use. In one embodiment, users are provided the opportunity to guess which music submitted will eventually win through an automated user contest. Correct guesses provide a user with points, the points providing the user with additional functionality or value. Users are also provided with access to music industry news, new music, and genre related information through the web server. Such news, music and information is adjustable based on user information stored in the fan, artist or industry database and/or on a client-side persistent cookie.

Finally, TPICS provides an automated listings service. The listing service allows industry experts to post a request for a certain type of content or music from artists and fans. TPICS then automatically forwards any content submitted in response to the listing to a reviewer, in a manner similar to the EIR used in the standard artist submission process described above. If the content meets the requirements of the industry expert listing, and has a top EIR score, the content is forwarded to the industry expert posting the listing.

Figure 7:
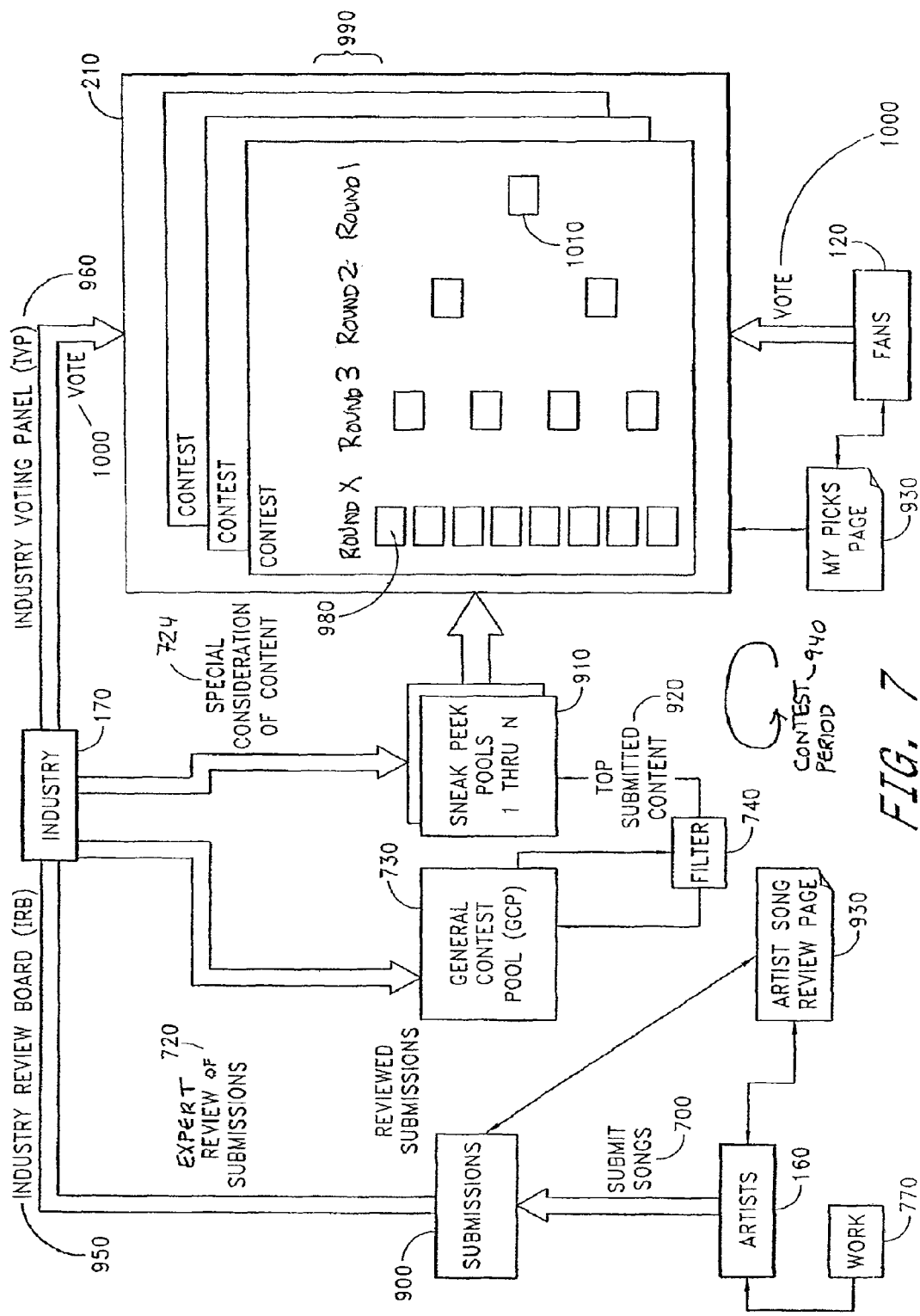
FIG. 7 illustrates processes of one embodiment of a contest.

FIG. 7 illustrates processes of one embodiment of a contest. An artist producer 160 of content 770 submits 700 the content to TPICS. Along with the content 770, the artist typically submits category information and other optional related artist, consumer or contact information. The artist also optionally provides payment with the submission. Such payment can be received through a standard electronic commerce server 270 (not shown) connected to TPICS, including, for example, an electronic payment system, an electronic wallet, an online billing system, or through other standard means of payment.

The submitted content 770 enters a pool of initial submissions 900. This pool of initial submissions 900 is automatically made available to industry experts 170 on an Industry Review Board (IRB) 950. The industry review board 950 consists of, in one embodiment, pre-selected, pre-qualified industry experts 170. Each IRB 950 member is associated with a particular category or genre of content in the industry expert database. TPICS forwards each artist content submission 900 to an industry expert on the IRB 950 using the genre or category of the content as a basis, among other factors such as, for example, in one embodiment the number of unfinished reviews an IRB 950 member has, or in another embodiment the IRB 950 member chooses the submission he or she will review.

The IRB 950 expert review 720 follows a standard form containing at least one aspect rating (e.g., a numerical ranking) along with comments and commentary (e.g., traditional elements of a content movie, music, or creative work review), in one embodiment an expert industry review (EIR 720). Once submitted content 900 is reviewed 720, TPICS adds the content 770 and its EIR 720 into a combined expert review 725, which is forwarded to a general contest pool (GCP 730).

The artist (producer) 160, after submission 900 has been reviewed 720 by the IRB 950, in one embodiment is able to see the reviewed submission 725, including all or part of the results of the EIR 720, and all or some of the aspect scores 722. These are displayed on an artist content review page 930 available to the artist through any network-enabled connection 610.

The GCP 730 represents reviewed content, and reviewed content continues to accumulate in the GCP 730 until a certain time period passes or a certain number of reviewed content entries have accumulated in the pool. When the configured threshold has been reached, TPICS filters 740 the reviewed submissions 725 from the GCP 730, and selects the top submitted content 920. This top submitted content is then forwarded to the sneak peek pools 910 (one embodiment of the preview pool 750). In one embodiment, the aspect scores for each submitted content are averaged and a selected number N of submitted content in the GCP 730 with the top total EIR 720 are added to the sneak peek pools 910. In another embodiment, the total EIR 720 are computed from the root mean square of the aspect scores for each reviewed submission. Any selection algorithm (including, for example, even random selection) can be used to determine what top submitted content 920 will be added to the next stage of the sneak peek pools 910 (SPPs). The number of content works selected to move to the next stage of the contest, and the algorithm used to compute the top scores, are typically adjustable by the administrator 130 of TPICS 100.

The SPPs 910 each contain some number of pieces of content accepted from the prior GCP 730. There may be any number of sneak peek pools 910 and, for each contest period 940, the content identified in one sneak peek pool 910 goes on to the next sneak peek pool 910. One embodiment of TPICS has three sneak peek pools 910 over three contest periods 940, such that a set of submitted content that was accepted from the GCP 730 into the SPPs 910 will go through the third, second, then first SPP 910 before going on to the final segment of the contest 210. In each progressive contest period 940, a new set of top submitted content 920 enters the sneak peek pools 910 such that as one set of top submitted content 920 moves from sneak peek pool 3 to 2, 2 to 1, and so on. For example, a new set of top submitted content 920 takes the place of the current top submitted content in the previous sneak peek pool 910 in the next contest period 940. When content is in the sneak peek pool 910, some group of users of TPICS can, in advance, preview the content 770 to provide special consideration of that content 724. In one embodiment, only certain industry experts 170 have access to content 770 in the SPPs 910, and fan users 120 and artist producers 160 do not have access to the sneak peek pools 910. In one embodiment, experts can select content from the In one embodiment, fan users 120 and artist producers 160 do have access to content in the sneak peek pools 910 but have no ability to vote or comment on the sneak peek pools 910.

Once a set of top submitted content 920 has gone into the last SPP 910, at the end of that contest period 940, the top submitted content 920 moves into a contest phase 530 of TPICS. In one embodiment of the elimination contest 210, all of the top submitted content 920 in the last SPP is paired into groups of two. Each group of two works is placed in a contest room 980. Industry experts on the Industry Voting Panel (IVP) 960 and fan users both vote 1000 in each contest room 980 as to which content work should progress to the next round 990 of the elimination contest 210. This elimination contest 210 continues in rounds 990 for each contest period 940 until only two submitted content remain in a final round 1010. From the two remaining submitted content 1010, industry experts on the IVP 960 and fan users 120 both vote 1000 between the two remaining works, and the winning content thus wins that embodiment of a TPICS competition. Industry votes 1000 are calculated from an Industry Voting Panel (IVP) 960. Fan user votes 1000 are calculated from among all fans registered through TPICS. Industry and fan votes 1000 may be given equal weight or may be given distinct, relative weights to each other in calculating the winner in each room 980, and during each round 990, of the elimination contest 210.

Fan users, in one embodiment, at any round 990 of the elimination contest 210, are provided by TPICS with a MY PICKS page 930 where fan users choose individual content which they believe will eventually win the elimination contest 210. Fans who choose the content which eventually wins the elimination contest 210 receive credit, such as, for example, sweepstakes entries as described in FIG. 20.

Figure 8:
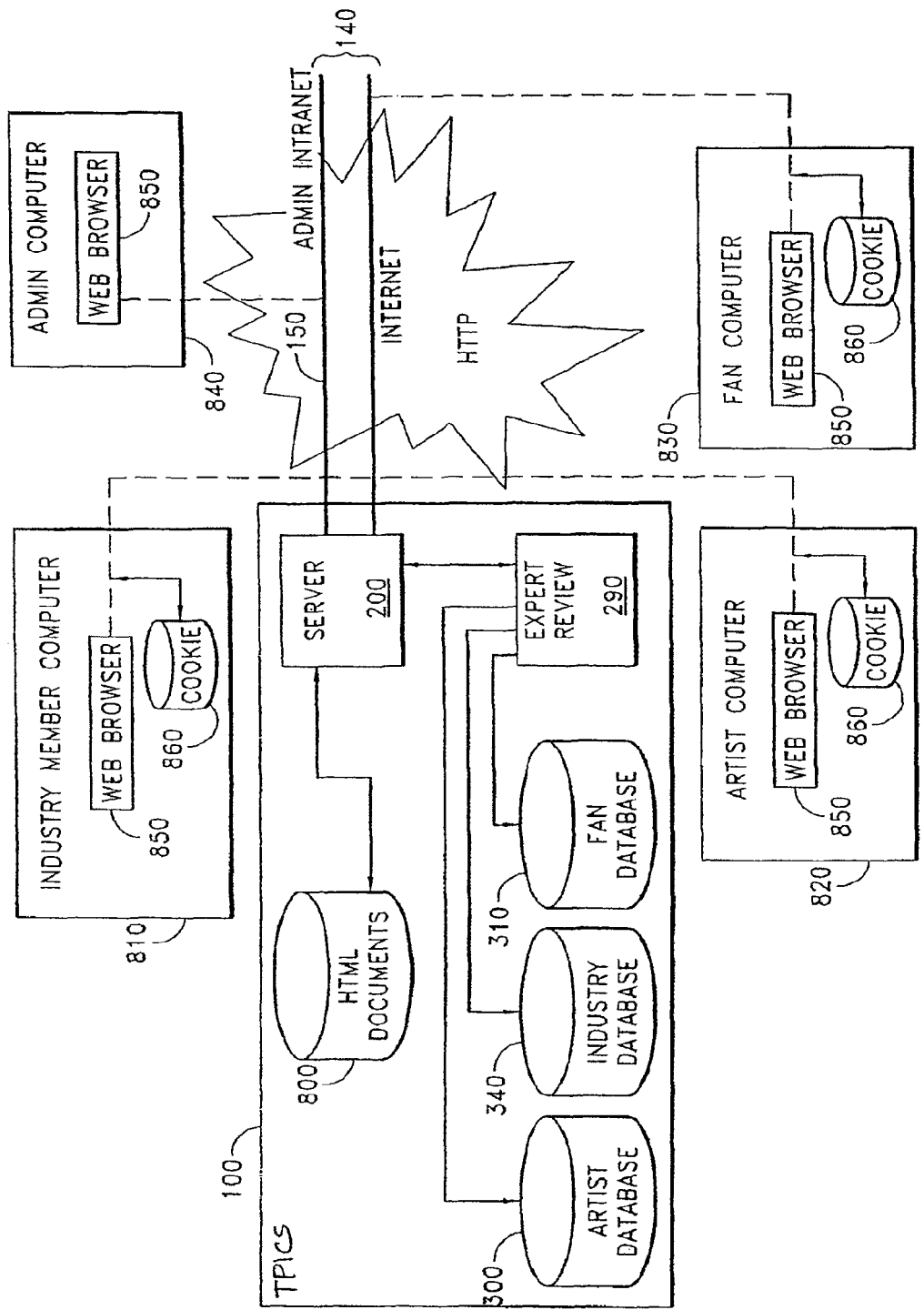
FIG. 8 represents one embodiment of web-based connections in a TPICS system.

FIG. 8 represents one embodiment of web-based connections in a TPICS system. Elements, such as an expert computer 810, an artist computer 820, a fan/user computer 830, and an administrative computer 840, are connected over one or more networks 140, optionally part of a global telecommunications network, such as the Internet, including intranets, private networks, and/or common carriers. The TPICS system 100 communicates with other computers 810, 820, 830 and 840 via the network 140 using a contest server or web server 200, but may use any network protocol and connection. TPICS uses, in this embodiment, three databases—an artist (producer) database 300, an industry (expert) database 340, and a fan (user) database 310. The artist database 300 contains at least one of but not limited to artist personal information, artist contest information, artist content submissions, and accounting information. The industry database 340 contains at least one of but not limited to industry expert personal information, industry expert genre and expertise information, general industry information, and accounting information. The fan database 310 contains at least one of but not limited to fan personal information, fan contest information, and accounting information. All three of these databases 300, 310 and 340 may contain additional pieces of information as necessary for the configured functions of TPICS, as separate functions, contests, sweepstakes or types of content to be reviewed are added or removed from the system.

In embodiments using a network-enabled connection 610 (in this case a networked computer 810, 820, 830 and 840) to the Internet, a user using a web browser 850 (an example of an access program 600) sends requests to TPICS 100 and specifically through the contest server 200. The requests may be hyperlink-based, and may include a URL with or without parameters extracted from an HTML-compliant web page or provided by the user. The server 200 accesses requested materials 800, processes any logic in the material (such as, for example, CGI scripts) and constructs and returns web pages. Those of ordinary skill will appreciate that the returned web pages may thus be dynamically created and may, via the logic processed, contain data retrieved from TPICS or other databases (e.g., external advertising databases) and/or may contain data requested from and formulated by TPICS modules. Thus, an industry expert 170, an artist producer 160, and a fan user 120 each have a computer 810, 820, or 830, a web browser 850, and some means of individual identification 860 such as a client-side persistent cookie to keep track of their identity as an industry expert, artist producer, or fan user of TPICS 100.

Advantageously, TPICS thus provides different functionality for different users. All artist producers and industry experts are typically registered with TPICS. Fan/consumer users also may, but need not register with TPICS in a similar manner. Even non-registered users (non-registered fans, or visitors) may have access to portions of TPICS functionality. The following sections provide an example of the access and functionality TPICS provides to various users.

Visitors (Unregistered Fans/Consumer Users)

Visitors can, in one embodiment, look, read and listen but cannot participate. Since they have not registered and have given no identifying information, they only have access to generic pages that do not use personal identifiers. They cannot, for example, vote in the contests, enter sweepstakes, submit songs, or send any email from this embodiment of TPICS. Visitors can see and hear all submissions otherwise accessible to fans/consumer users on TPICS—past and present—in the Contest phase, including TPICS winners, by navigation of TPICS provided web pages, a search function, or similar navigation for other embodiments of TPICS. Advantageously, the contest information provides immense value to visitors who may change their consumption patterns based on having the benefit of expert review and fan voting. Visitors can access contest information periodically over months or even years to receive the ongoing benefit of essentially an ever-evolving selection and refinement of the best works, products or services in an entire industry.

Visitors have access to all secondary web pages provided by the TPICS web server, such as, in one embodiment, for example, company background information, TPICS background information, frequently asked questions, detailed descriptions of TPICS functionality, TPICS contests, TPICS expert reviews, and benefits of registration, past TPICS winners, search functionality, legal disclosures, current contest content and works, and TPICS-provided news and information. The scope of access to TPICS for visitors is adjustable by the administrator user, such that, to the extent personal information is not necessary for any TPICS function, access privileges for visitors can be adjusted to allow access to such web pages, TPICS database information, works, and content. Other embodiments may, for example, provide access to all TPICS functions without registration.

News and Information Service

TPICS also provides "biz" pages, a set of adaptable pages, in this embodiment (VAR) primarily on the theme of the music business. For example, by attaching a standard database of updated news and information, either internally updated or through a third party via protocols such as, for example, XML (extensible markup language) or RDF (metadata resource description frameworks), this section includes music industry news and advice from music industry insiders. For example, exclusive interviews locally provided through TPICS biz pages, featured articles provided locally, through links to third parties, or through links and/or automated protocol from syndicated sources, and news, provided locally to TPICS, through links to third parties, or through links and/or an automated protocol from syndicated sources. Exclusive interviews with artists and featured articles by other music industry professionals will provide helpful career tips for artists who are starting out. News provides music industry news from syndicated sources. News, in this embodiment, is valuable to artists, industry, and music fans interested in the content involving artists they recognize.

Fans (Registered Visitors/Consumer Users)

After registering, a user has access to a personalized start page provided by TPICS every time the user initially accesses TPICS through, in one embodiment, a uniform resource locator (URL) and a web browser. This start page includes personalized content, addresses the user by name and offers a short list of links, primarily to TPICS pages and functions available to registered consumer/fan users. Registered consumer users/fans (fans) can vote in the contest, whereby a fan user also participates in the monthly sweepstakes.

A user may change any personal information, preferences for being included on email lists, and password—but not his/her user name—by, in one embodiment, clicking on information and password hyperlinks on the user start page.

Contest

The numbers used in the following description (e.g. number of contest stages in a Contest Round, number of pools in a contest round stage, number of submissions in a pool) are for the purpose of illustration and can be changed by the TPICS administrative user. In addition, each stage may run for any contest period, but a week-long period is used as an example.

For each contest, TPICS finds (e.g. filters) the 16 songs (e.g., works or content) with the highest review scores in the general contest pool and randomly pairs them to compete in 8 pools in the elimination contest. Visitors (unregistered fans/consumer users) can click on a visual representation of any of the pools and listen to the songs in that pool; fans (registered fans/consumer users) can vote for the one they think is the best. If a fan has already voted for one of the artists in this pool, the fan user will be asked whether the user wants to change that vote, and the user has the option either to confirm the new vote or leave the old one in place. Once the contest period, in this case one week, has ended, all votes for that contest period are final.

Once the voting period has ended (e.g. end of the week) TPICS tallies the votes in each pool and balances them with the votes of the Industry Voting Panel (IVP, described below) users. Regardless of how many people vote, the outcome of fan votes has a certain weight and the outcome of IVP votes has a certain weight, determined by the administrative user (e.g. 50% fan vote-50% industry IVP vote). For example, one embodiment of a voting score calculation is described below.

After the first round of the elimination contest (the first contest period), eight of the sixteen songs remain, which move on to the next stage, where they are matched in 4 pools of two songs. At the end of this contest period there are only 4 songs left from the original 16; and after another contest period, there are only two songs left. After one more contest period, a winner emerges from the final pool of two songs. In every contest period, 16 new songs enter the first round of the elimination contest, so all the pools are always filled. During a single visit, a fan may vote in all four stages. That means fans always have 30 competing songs (16 in preliminaries+8 semi-finalists+4 quarter-finalists+2 finalists) to hear, in this embodiment.

Each fan user can view that user's voting record via the MY PICKS function, which through a fan-accessible page, in this embodiment, shows every vote the fan user casts, per contest period, or alternatively through the length of one contest (i.e. a month for four stages of one week contest periods, the "sweepstakes period"). A user's voting record in each contest is represented, in this embodiment, as a table with a row for every artist who received a vote from this user. Each vote is represented, for example, as either a green or a red dot depending on whether the artist in that row was the eventual winner in that stage of the elimination contest or not, respectively.

Every vote is worth a certain number of points, or in one embodiment, sweepstakes entries, so at the top of the MY PICKS function page, TPICS presents to the fan the number of entries that fan has earned in the current sweepstakes.

Sweepstakes

Every contest period, or alternatively every sweepstakes period, TPICS randomly selects one entry from a pool of sweepstakes entries from fan users, and from this selected entry, for example, in one embodiment, a cash prize can be awarded to the person associated with that entry, absent some external reason for disqualification. Fans earn entries by registering with TPICS, voting through TPICS and through referrals (described below). TPICS can adapt to add (or subtract) sweepstakes entries for any TPICS function a fan user has access to.

There is a safeguard against random voting built into the current sweepstakes, whereby a "correct" vote is worth more entries than an "incorrect" vote. A "correct" vote is a vote cast in a particular contest pool (i.e. a contest among one set of works or content submitted) for the artist who became the winner in that elimination contest. In every contest pool, a user may cast a vote for exactly one artist, and exactly one artist will be the winner, and an "incorrect" vote is a vote for any other artist in the pool. Casting only "correct" votes in a contest period, or alternatively a sweepstakes period, is further rewarded by a large number of sweepstakes entries.

Furthermore, "correct" and "incorrect" votes are assigned different number of sweepstakes entries depending on the total number of votes cast in a contest period, or alternatively a sweepstakes period. The more votes cast by a user during a contest or sweepstakes period, the more entries the user receives for each "correct" and "incorrect" vote. Below is one example formula used by TPICS for the calculation of sweepstakes entries:

$$TE = TCV*WCV + TIV*WIV + ACVF*TV*WACV + TRF*WRF + RE + OPTE \quad (1)$$

where:
TE=Total Entries=total number of sweepstakes entries for a registered user
TCV=Total Correct Votes=total number of correct votes cast by a registered user in a contest or sweepstakes period
WCV=Weight for Correct Votes=the numeric weight value for each correct vote TIV=Total Incorrect Votes=total number of incorrect votes cast by a registered user in a contest or sweepstakes period WIV=Weight for Incorrect Votes=the numeric weight value for each incorrect vote ACVF=All-Correct Votes Flag=A Boolean flag (i.e. value of 0 or 1) indicating whether or not all votes were correct; i.e. ACVF=1 if all votes cast were correct and ACVF=0 if one or more votes case were incorrect.

TV=Total Votes=total number of votes cast by a registered user in a contest or sweepstakes period (already implemented)

WACV=Weight for All Correct Votes=the numeric weight value for each vote, when all votes are correct TRF=Total number of Referred Friends=Total number of new users who were referred to TPICS by the user during the month WRF=Weight for Referred Friends=the numeric weight value for each referred user who came and registered into TPICS.

RE=Number of entries for registering to TPICS or already being a user of TPICS

OPTE=Number of entries for opting in to receive third party product information

For referrals, a referrer user enters the referee (i.e., new user to be referred) name and email address in, for one embodiment, a simple HTML form, and the system sends the referee user an email in which the referrer user's first name appears as the sender.

When the referee visitor accesses TPICS and opts to become a user, the referee visitor may enter in the user registration form the email address of the referrer user. Upon completion of this registration, the referrer will receive a certain number of entries into the sweepstakes.

Wherever an artist is featured through TPICS—users may select (in one embodiment, select a link to the accompanying hyperlinks to) functions which send email to this artist and recommend this artist to a friend. Either option, in this embodiment, brings the user to an HTML form for email that will be sent to the artist (in the first case) or to a user-specified email address (in the second). The user's first name will appear in the email as the sender.

Artists

An artist producer is a fan user who has submitted a song, and thus become a producer of content. Artists can do anything that fan users can do, and also have access to some additional TPICS functions and pages associated with submitting songs. The start page for artist producers has additional hyperlinks that provide this access.

Every time an artist producer pays for a song submission, a song credit is added to his/her credit bank. Artists may also earn free song credits through the referral system described above, or, alternatively, through a variation of the sweepstakes system described above.

If an artist has a song credit in the credit bank, the artist producer may use that credit to submit a song; otherwise the artist producer must first pay for a song credit. The artist can pay quickly with a credit card through a secure form (e.g. through an e-commerce provider, a secure sockets layer payment system, an electronic wallet, credit card, and so on). Alternately, the artist producer may send payment through the mail.

To submit a song, the artist completes, in one embodiment, a single HTML form with information about the song, and with the location of the song, related image files to be uploaded, and other information. TPICS, in one embodiment of the VAR system, supports songs in the MP3 format, and images in the JPEG or GIF format. However, TPICS is adaptable to any media format, and does not depend on a particular media, content, or work format for the system to function. The artist also, in this embodiment, provides a song title, an artist name, and the genre or category where the artist producer believes the song belongs. The artist producer may also specify other information, including, for example, a subgenre, tempo, mood, and include lyrics, song notes, an artist bio, an artist home page URL, and special instructions to the reviewer. When the artist submits the form, the system will upload the song and image files from the locations he/she specified into the TPICS database. The entire submission will then be made available to all or some subset of industry reviewers with expertise in the artist-specified genre.

Besides earning sweepstakes entries by referring friends to TPICS, as previously described, artist producers can earn free song submissions. When a fan or artist producer submits a song for the first time, the user will be prompted to enter the email address of an artist who referred the new artist producer to this embodiment of TPICS. The referring artist will then receive a "referral point". Once the artist has accumulated a pre-defined number of referral points (e.g. 3), these points will be replaced by one song credit in his/her credit bank.

At the end of each contest period (e.g. a week), TPICS determines through a filter what songs in the general contest pool will be entering the contest. All artists whose songs entered the GCP during this period will then receive, in this embodiment, email notifying them that their songs have been reviewed; at the same time, they will find out whether or not their songs will enter the contest. Instead of emailing song reviews, TPICS, in this embodiment, posts them online on the artists' own song review pages (accessible via hyperlink on each artist's start page). The song review page will show a review for every song the artist submits, and show its status in the contest, if applicable.

Industry

Expert Reviewers—in this embodiment members of the Industry Review Board (IRB)—are employed or contracted for any particular embodiment of TPICS, in this case to review songs. They access TPICS, in one embodiment, through a dedicated industry Intranet, through which they complete reviews. This intranet also has an accounting section, which allows reviewers to see monies owed and paid them.

In this embodiment, music industry professionals who feel they are qualified for a position on the IRB may request an application. Based on the requirements for each embodiment of TPICS, certain professionals are invited to join the IRB. IRB members have access to TPICS functionality not accessible to artist or fan users.

The primary function of the industry review board is to complete reviews of songs submitted to TPICS. In this embodiment, reviews are confidential, to be viewed only by the artist whose work is reviewed, and potentially by administrative users performing a quality check. Each review has the same format, being the output of an online form in the industry Intranet.

After logging in to the industry Intranet, reviewers are provided, in this embodiment, with the first available song (i.e. having the earliest submission date) matching a genre in the reviewers' expertise specified when the reviewer applied for the position. If, upon listening to the song, a reviewer finds that it is still outside his/her expertise, the reviewer may decline to review it. As soon as the reviewer completes one review, another song is made available to the IRB industry expert by TPICS.

The virtual review form used by IRB members provides all the information reviewers need to review a song: links to download or stream the song, special instructions from the artist, and an image (e.g. photo, album cover) from the artist; it may also contain hyperlinks to lyrics, song notes, and an artist bio, or other additional information.

The same form allows the reviewer to write comments on any number of aspects of the work (song) submitted, and to assign a rating from 1 to 10 for each, in this embodiment encompassing the following elements: music, lyrics, arrangement/production, lead vocal, musicianship, originality, and marketability. The reviewer will also make general comments about the song. The reviewer completes each field, unless it is unambiguously not applicable.

The reviewer can choose to submit the review, finish it later, or return it to TPICS for assignment to another reviewer (if the industry expert (in this case IRB reviewer) feels not qualified to review the submission.) If the song was submitted for a particular industry listing, the reviewer will decide whether or not the song merits forwarding to the listing sponsor.

Reviewers can see the reviews for which they have been paid and for which they are owed payment, by selecting, in one embodiment, links accessing TPICS pages including accounting information dynamically retrieved from the TPICS database/databases.

Super reviewers—members of the Industry Voting Panel (IVP)—do not actually review songs. They are IVP industry experts of TPICS who vote in the elimination contest described above, or who have paid for access to the sneak peek preview. Industry experts may be super reviewers (i.e. IVP members) and/or reviewers (i.e. IRB members.)

As mentioned earlier, at the end of each voting period, TPICS tallies the review scores of all reviewed submissions and selects the top (e.g. 16) scoring submissions. Before these selected songs are entered into the Contest and thereby introduced to the public, including artist producers, fan users, and unregistered visitors, they are held for pre-determined periods of time in a sneak peek preview area. Members of the IVP have special access to the sneak peek preview where they can preview top-scoring submissions before the contest begins.

Score Calculation

In one embodiment, TPICS filters reviewed submissions from the GCP to determine the top-scoring submissions for entry into the Sneak Peek Pools and/or Elimination Contest. As an example of one of the many algorithms possible to filter works submitted, one can determine the total review score for an artist x in contest pool of potential submissions P calculated as:

$$\text{Score\_x\_P} = \frac{F\_x}{F\_total} FW + \frac{I\_x}{I\_total} IW \qquad (2)$$

where:
Score_x_P=final score for artist x in pool P
F_x=number of fan votes for artist x in pool P
F_total=number of fans who voted in pool P (for any artist in the pool)
FW=weight of fan votes
I_x=number of industry votes for artist x in pool P
I_total=number of industry who voted in pool P
IW=weight of industry votes The ratio FW:IW determines the relative voting power of fan users and artist producers to industry. A ratio of 1:1 gives each group equal weight. As an example, let us say that there are 3 artists (e.g. artists x, y, and z) in pool P, 1000 fans vote in pool P: 200 vote for x, 500 for y, and 300 for z, 50 industry vote in pool P: 35 for x, 5 for y, and 10 for z, and fans and industry are given equal weight. Then the scores are:

$$\text{Score\_x\_P} = \frac{200}{1000} \times 1 + \frac{35}{50} \times 1 = 0.2 + 0.7 = 0.9 \qquad (3)$$

$$\text{Score\_y\_P} = \frac{500}{1000} \times 1 + \frac{5}{50} \times 1 = 0.5 + 0.1 = 0.6 \qquad (4)$$

$$\text{Score\_z\_P} = \frac{300}{1000} \times 1 + \frac{10}{50} \times 1 = 0.3 + 0.2 = 0.5 \qquad (5)$$

and artist x, with the highest score as calculated in equation 3, is the winner in this pool.

Sweepstakes Entries

Each vote cast by a user is worth a certain number of sweepstakes entries, depending on the total number of votes cast by the user during the contest period or sweepstakes period (e.g. month), such that, for example:

TABLE 1

|  | Total Votes Bracket | | | |
| --- | --- | --- | --- | --- |
|  | 1-15 | 16-30 | 31-45 | 46 or more |
| Incorrect | 1 entry | 2 entries | 4 entries | 8 entries |
| Correct | 2 entries | 4 entries | 8 entries | 16 entries |

A "correct" vote is a vote for the winner of a match. If a user votes 17 times during a sweepstakes period, then that user gets 2 entries for each incorrect vote and 4 entries for each correct vote. If the user continues to vote, as soon as the user casts his/her 31st vote this sweepstakes period, each of the incorrect votes will be worth 4 entries and each correct vote will be worth 8 entries.

If all of the user's votes are correct, the user will get additional bonus entries. Again, the number of entries depends on the number of votes, for example:

TABLE 2

|  | Total Votes Bracket | | | |
| --- | --- | --- | --- | --- |
|  | 1-15 | 16-30 | 31-45 | 46 Or More |
| All-Correct Bonus | 10 entries | 200 entries | 300 entries | 500 entries |

If, for example, all of the user's 31 votes were correct, he/she would get 31×4=124 entries plus 300 bonus sweepstakes entries.

Users get certain number of entries (e.g. 100) every time one of their friends becomes a TPICS user through the Refer-A-Friend Bonus Program. This does not depend on the number of times the user votes.

Users get a certain number of entries (e.g. 5) when they first register to become users. From that point on, TPICS automatically credits the user with the prevailing number of registration entries at the start of any new sweepstakes.

Users get certain number of entries (e.g. 5) if they opt-in to receive third party product information when they first register to become users. From that point on, TPICS automatically credits the user with the prevailing number of Opt-In entries at the start of any new sweepstakes.

Figure 9:
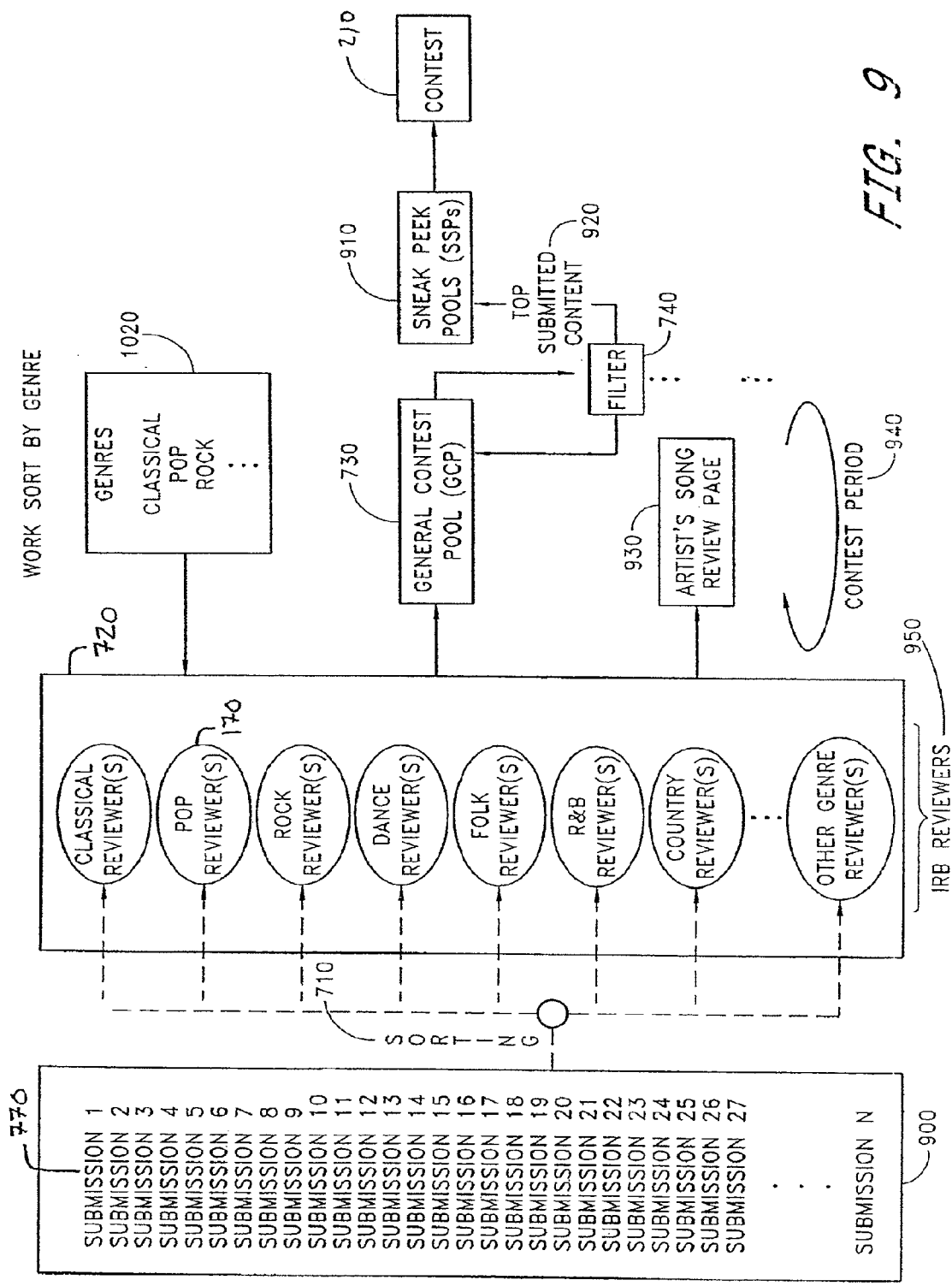
FIG. 9 represents an illustration of the movement of content through TPICS including an Industry Review Board (IRB) content review.

FIG. 9 represents an illustration of the movement of content through TPICS including an Industry Review Board (IRB) content review. First, all submitted content within a contest period 940 accumulates in the submission pool 900. Based on artist's choice of genre 1020 for their submitted content, their submission is sorted 710 and forwarded to an IRB expert reviewer 950. In one embodiment, for example, if the content 770 reviewed by TPICS is music, the genres 1020 from which the artist may choose and from which the expert reviewers 170 are chosen could be classical, pop, rock, dance, folk, R&B, country, etc. The genres 1020 are adjustable by the administrative user 130, and are not limited to this representative embodiment.

Once the expert reviewer 170 has provided the standard EIR 720 of the submitted content, in one embodiment the completed review 725 is typically sent to the artist content review page 930 where the artist 160 can view the EIR 720 of their submitted content 770. In the GCP 730, as previously described, during each contest period 940 some pre-selected number of top submitted content 920 is filtered 740 and selected from the GCP 730 using some algorithmic calculation on the aspect scores to form a total review score and a pre-selected number of top-scoring content are sent forward to the next stage which is the sneak peek pools 910 (SPP). The SPPs 910, as previously described, are some number of pools where the selected content moves from one pool to the next over each contest period for the number of pools that are selectively chosen for any particular embodiment of the system. Each pool contains the number of submitted content that were taken from the general contest pool 730 as having top total reviews and the content remains in the SPPs 910 for the number of contest periods 940 that there are number of pools. After the selected content in the sneak peek pool has gone through all of the sneak peek pools 910 (there can be anywhere from one to as many as selected) then the selected content enters a contest 210.

FIG. 10 illustrates a representation of the movement of submitted content through the general contest pool (GCP) in one embodiment of TPICS. At the end of each voting period, i.e., the end of each contest period 940, TPICS sorts the submissions 770 and associated completed expert reviews 725 in the general contest pool 730 by applying a submission filter module 740. In one embodiment, this results in three categories. The first category 1100 is content with top review scores sufficient to fill one sneak peek pool 910 is top submitted content 920. In one embodiment, the number of top submitted content 920 selected with the top review scores 720 will be sixteen content works. Second, content with EIR 720 scores that are lower than the first category, which have been in the GCP 730 for less than some selected grace period, are kept in the GCP 730 for another contest period 940. Third, content that have been in the GCP 730 for the entire grace period (which is a selected number of contest periods 940) and have not been selected as top submitted works 920 are removed 1120 from the GCP 730, and typically then removed from TPICS. Top submitted content 920 then enters the preview pools 750 (sneak peek pools 910 in this embodiment), before being forwarded to the contest 210.

Figure 11:
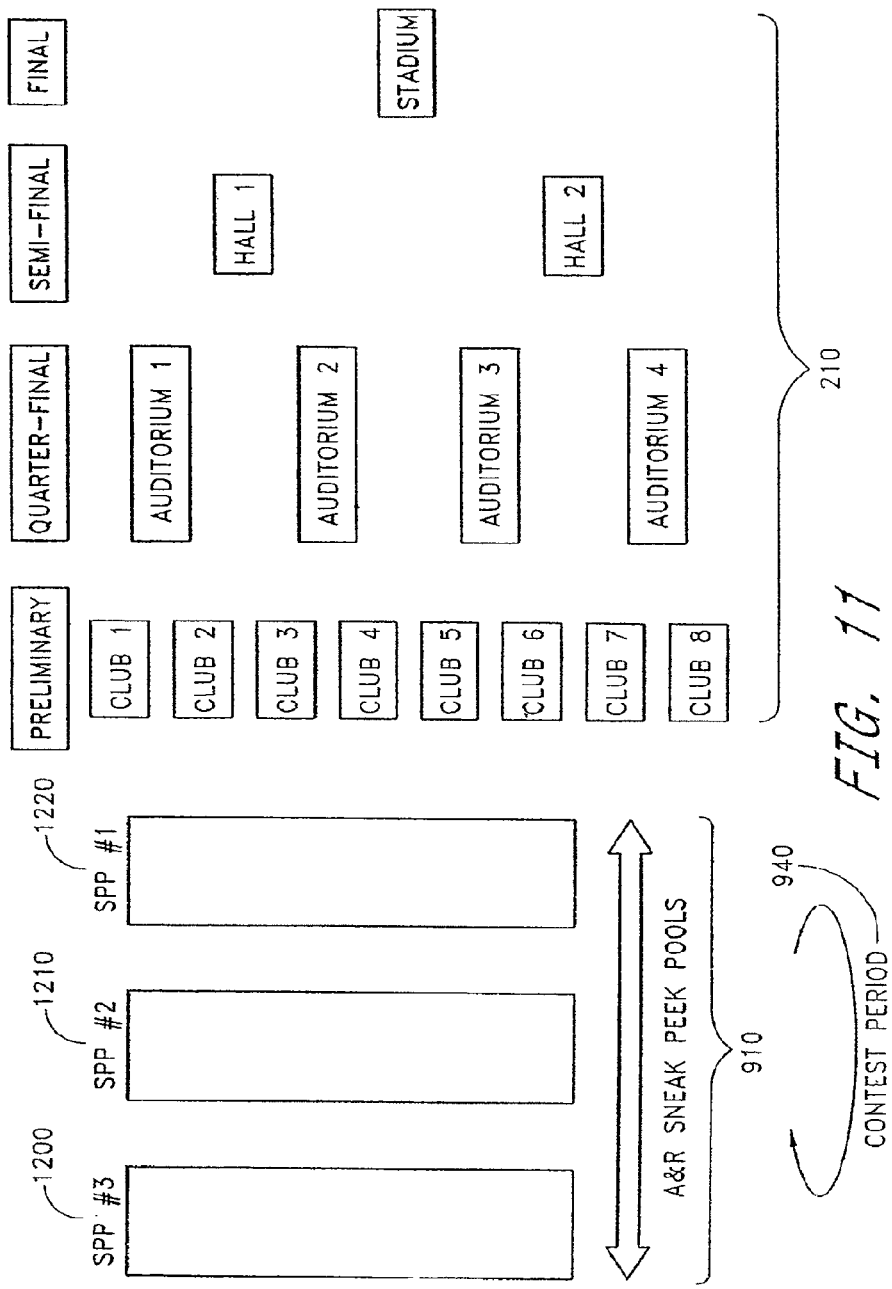
FIG. 11 represents an example, at week zero, of an embodiment of TPICS wherein a set of content has been reviewed and has entered the general contest pool.

FIG. 11 represents an example, at week zero, of an embodiment of TPICS wherein a set of content has been reviewed and has entered the general contest pool. This content 770 is labeled as artists #1 through #30, but can be any selected number of submitted content. At this point, no content has entered the sneak peek pools 910 or the elimination contest 210. Also, in this embodiment, the contest period 940 is one week. In this embodiment of a contest form (of which there are many variations), the sneak peek pools (SSPs) 910 include three pools 1200, 1210 and 1220, none of which initially have any content. Similarly, there is no content in the contest itself.

Figure 12:
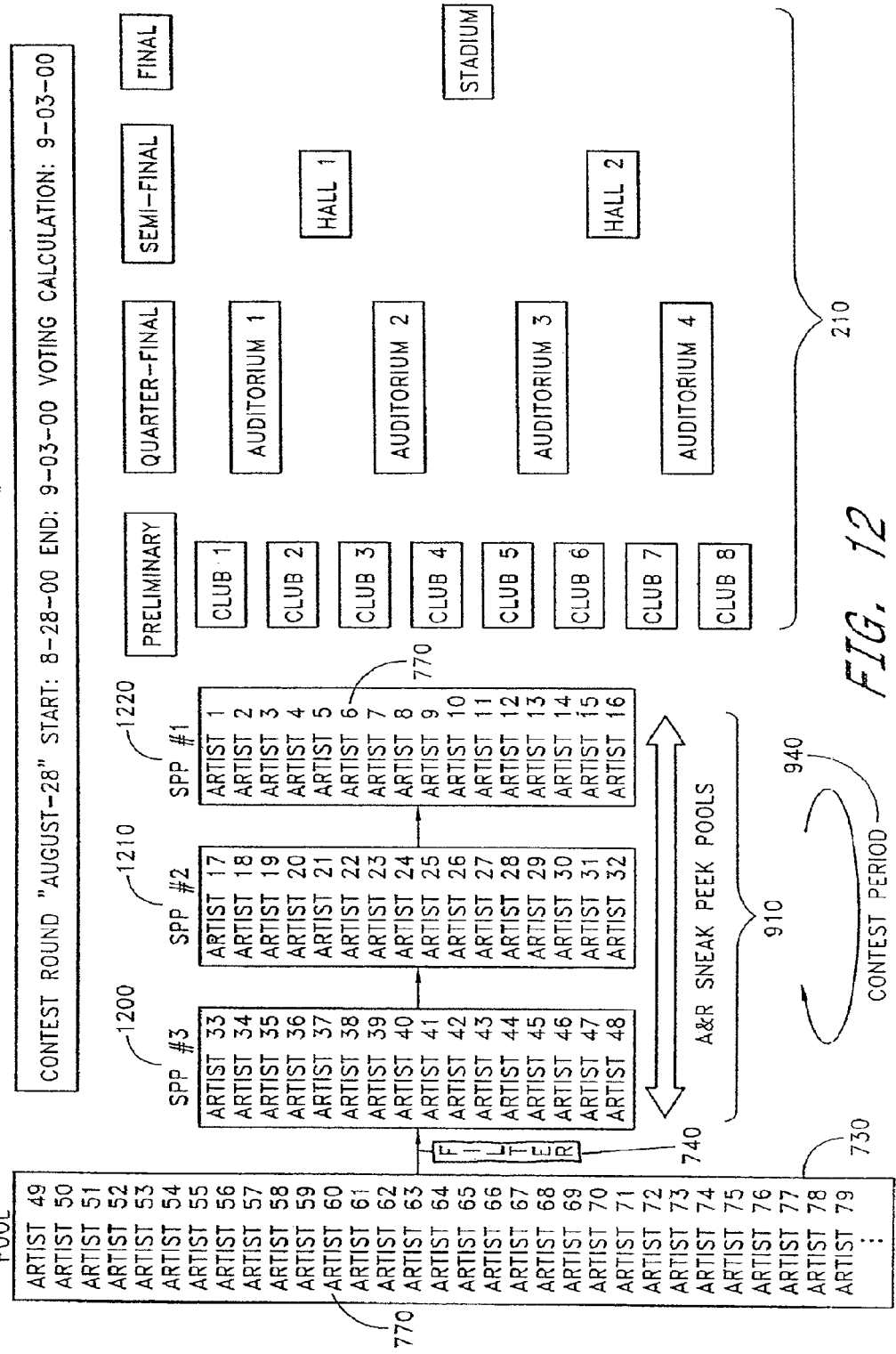
FIG. 12 represents the embodiment of TPICS as illustrated in FIG. 11 at a time three weeks later.

FIG. 12 represents the embodiment of TPICS as illustrated in FIG. 11 at a time three weeks later. The GCP 730 now has a new set of submitted and reviewed content items 770 in it, in this case, artists #49 through #79 but, again, this can be any selected number of submitted content. Through each of weeks 1, 2, and 3, some subset of the submitted content in the GCP 730 was selected by calculating the total EIR 720, and was forwarded into the SPPs 910. During the first week, artists 1 through 16 were selected from the GCP 730 to enter SPP 1 (1220). During the second week, artists in SPP 3 (1200) were sent to SPP 2 (1210), and artists #17-#32 were accepted into SPP 3 (1200) from the GCP 730 based on total review score. During week 3, artists #33-#48 were accepted from the GCP 730 based on top total review score and artists #17-#32 move from SPP 3 (1200) to SPP 2 (1210) and artists #1-#16 move from SPP 2 (1210) to SPP 1 (1220). At week three, no content 770 has yet entered the contest 210.

Figure 13:
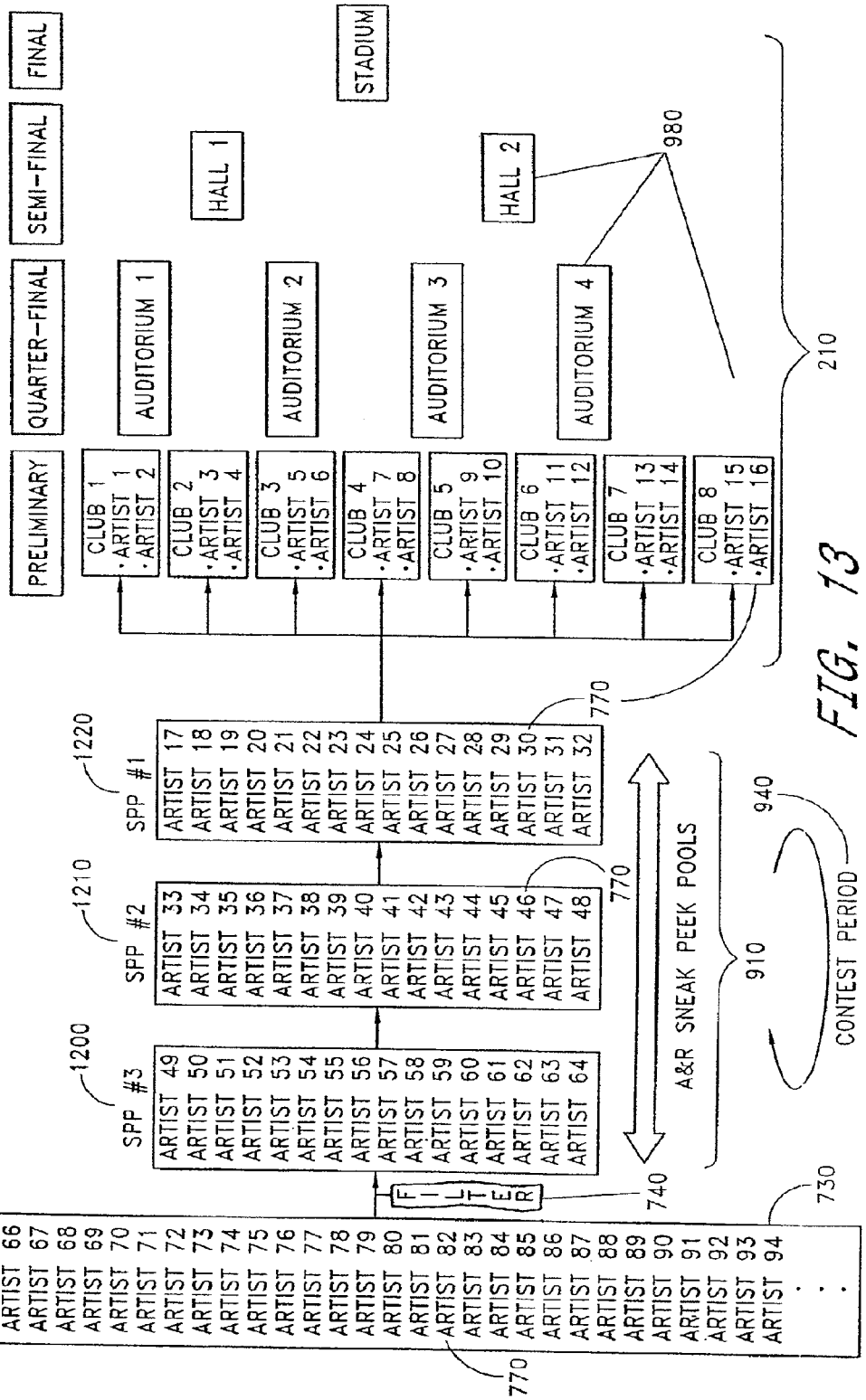
FIG. 13 represents the embodiment of TPICS as illustrated in FIG. 11 at a time four weeks later.

FIG. 13 represents the embodiment of TPICS as illustrated in FIG. 11 at a time four weeks later. A new set of content has entered the GCP 730, a new set of content has been selected from the GCP 730 as top submitted content 920 to go on to the SPPs 910. The set of 16 content works from the last SPP 910 round (SPP #1 1220) has entered the elimination contest 210. In this embodiment, submitted content is coupled into groups of two works 770 for each contest room 980. So in one embodiment, given 16 top submitted content 920 entering the elimination contest 210, there would then be eight rooms 980 of two works. (However, any number of works may be associated with a particular contest room 980). For each room 980 of two works, some combination of industry, artist, and fan users vote between each set of two to select a winning work in each room 980. These votes, as previously described, can be equally weighted or can be variably weighted relative to each other by user type or individual user, according to a voting algorithm.

Figure 14:
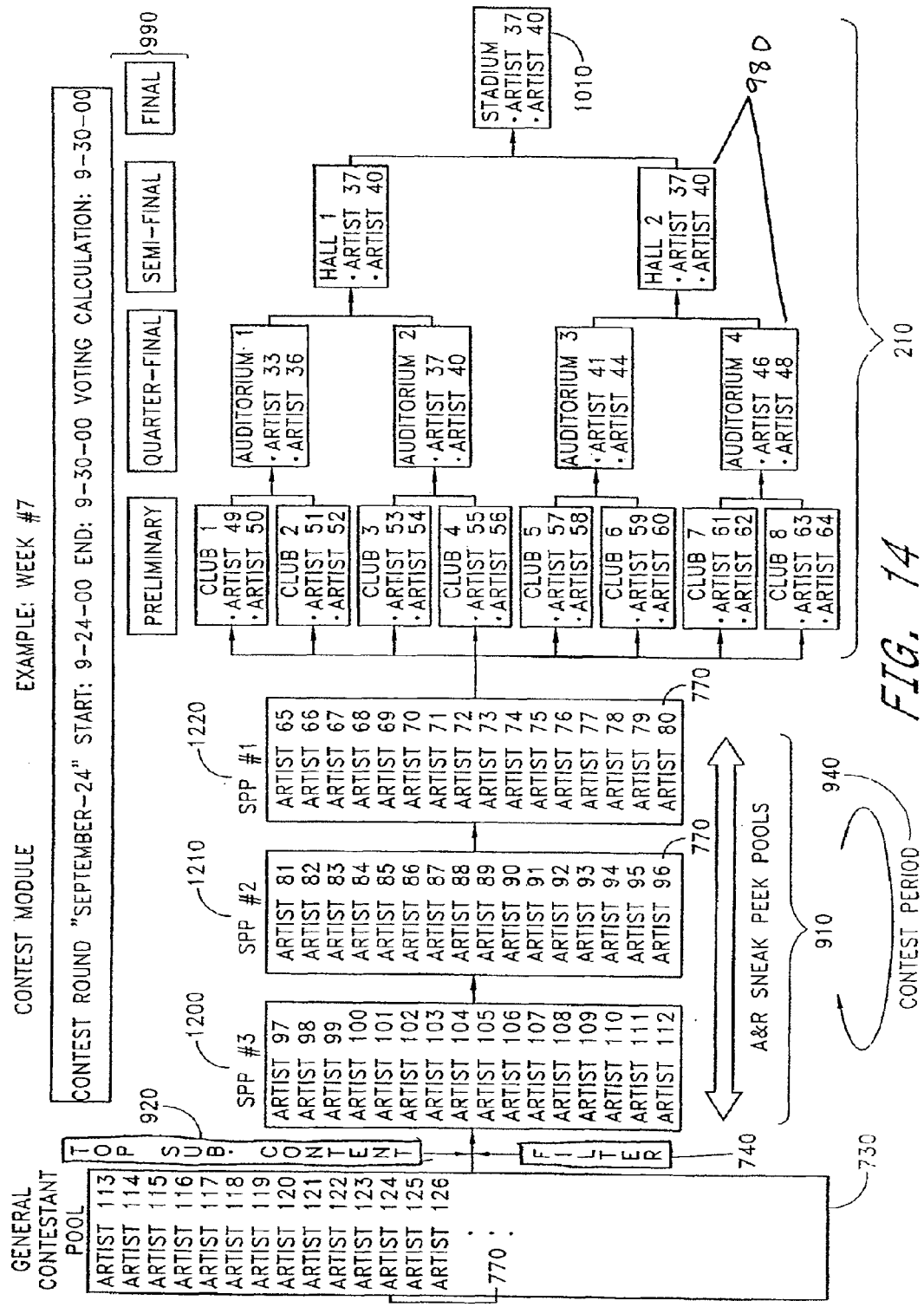
FIG. 14 represents the embodiment of TPICS as illustrated in FIG. 11 at a time seven weeks later.

FIG. 14 represents the embodiment of TPICS as illustrated in FIG. 11 at a time seven weeks later. This is after seven contest periods 940 or, in this embodiment, seven weeks. Content works 770 continue to collect in the GCP 730, and top submitted content 920 selected by the filter 740 continues to enter the SPP 910. The content entering the elimination contest 210, in each round, is either selected to go to the next round of elimination contest 210 by winning in its contest room 980, or loses. If there are 16 top submitted content 920 initially entered in each round 990, and the content works are divided into eight rooms 980 with two works in each room, half of the content will continue on to the next elimination contest stage (by winning in a contest room) and half of the content will be rejected (by losing in a contest room). In one alternative embodiment, the winning content from each elimination round 990 are selected by top vote score and the selected number of content having the top vote score will go on to the next elimination round 990. Once TPICS reaches the final elimination round 990, there are, in one embodiment, only two top submitted content 920 remaining and fan users and IVP 960 industry experts vote on the winning submission. The submission that wins the final round 1010 wins the contest.

FIG. 15 represents acts performed by an a producer using one embodiment of TPICS to submit a song. The artist 160 chooses via a command to the server to submit content 1310. TPICS queries 1320 to see if the artist 160 has already logged on. If not, the system asks the artist to log on 1330 to the system. If the artist is not yet a user, the artist is asked to register 1340 and personal artist/producer information 1350 is received by TPICS, including, for example, in one embodiment referral information, name and email addresses. If the artist has previously registered, then the artist is immediately sent to the credit or payment page 1370. At this point, the artist, if previously unregistered, can decide 1360 to submit content or not. If the previously unregistered artist decides not to submit content, the artist is returned to the artist start page 1300. If the artist decides to submit content, the artist can decide to pay using a simple standard electronic commerce transaction 270, via an online bank, credit card, paper billing, etc., or the artist may use an existing content credit 1375 received for prior work or received from prior contest participation or winning prior song submissions. The artist is asked whether he or she is ready to submit content 1390. If so, the artist submits 700 the content through any standard network protocol. If the artist producer is submitting content for the first time 1385, the user is asked for user referral information 1380, from which TPICS adds sweepstakes points and/or referral song credits to the referring user. After submission, the artist/producer is returned to an artist start page 1300 served by the contest server 200.

In one embodiment of TPICS, an artist submits content (in this case, the work is a song) 700. The artist 160 is provided with links to other parts of TPICS, and the artist can enter various information regarding the content, including, in one embodiment the content (song) title, the artist name, and a link to the content hosted on a third party server, in one embodiment in Mpeg-3 (MP3) format, the genre of the content, and other information such as, for example, the subgenre if required, the tempo of the content, the mood, any photos related to the album or the artist, lyrics, an artist biography, an artist home page, etc.

In one embodiment, content is reviewed in an expert industry review (EIR 720). The review, in this embodiment, is provided through a dynamic web page which combines one of many pre-formatted web pages 800 with data from the TPICS databases 300-350. In this embodiment the review is made accessible to an artist producer 160 through a web page accessible only to that artist. For aspects of a work 770 reviewed, the expert review 720 may include, in one embodiment, one or more aspect scores 772 which quantify the expert review 720 on a known scale (for example, 1 to 10) for ranking purposes.

In one embodiment, various aspects of the content are reviewed by an expert reviewer. In this case, for a musical work, aspects reviewed include music, lyrics, lead vocal, musicianship, arrangement, production, and originality. For each aspect in this embodiment, the expert reviewer 170 (typically, but not required to be, an IRB member 950) provides a quantitative or descriptive rating with a minimum or maximum value (aspect score 772). In this embodiment the expert review 720 also contains a textual commentary for each aspect reviewed. The expert review 720 also contains space for general comments by the expert reviewer 170. The expert reviewer 170, in this embodiment, is provided with an overview of the artist content submission 770 and related information to assist in preparing the expert review 720.

Second Example Embodiment of the Invention

Returning to FIGS. 1, 2 and 4, which show an overview of one implementation of a TPICS server portion of a TPICS system 100 in one embodiment, the TPICS server consists of numerous software modules including one or more contest servers 200, database management modules 240, contest creation modules 220, contest management modules 230, and the like. A provider 110 accesses the TPICS system 100 through the network 140. Through a provider administration tool ("PAT") 440 the provider can register as a TPICS provider 110 and create TPICS contests 210. A provider 110 can create more than one contest 210. Multiple providers 110 can use a TPICS system 100 and the TPICS contest server 200 at the same time, and create multiple contests 210 through individual PATs 440. Advantageously, the provider can use the TPICS contest for marketing research on media content, for online promotions of media content, or for expert review of media content as described above.

End-users 120 participate in TPICS contests 210 created by providers 110 by voting for TPICS contestants (see FIG. 17) in those contests 210. The TPICS system also includes an internal TPICS end-user database 310 which keeps records on each TPICS end-user 120. In addition to personal registration information, the TPICS end-user database 310 can contain information on an end-user's votes ("My Picks", see FIG. 19) 410, end-user's sweepstakes entries ("My Sweepstakes", see FIG. 20) 420, and consumer marketing or advertising information 430. Personal registration information can be imported from an external database 400, such as a database run by a provider 110, or can be directly entered through TPICS end-user registration forms, described below, and, in one embodiment, is at least partially editable by the end-user (see FIG. 21).

Figure 16:
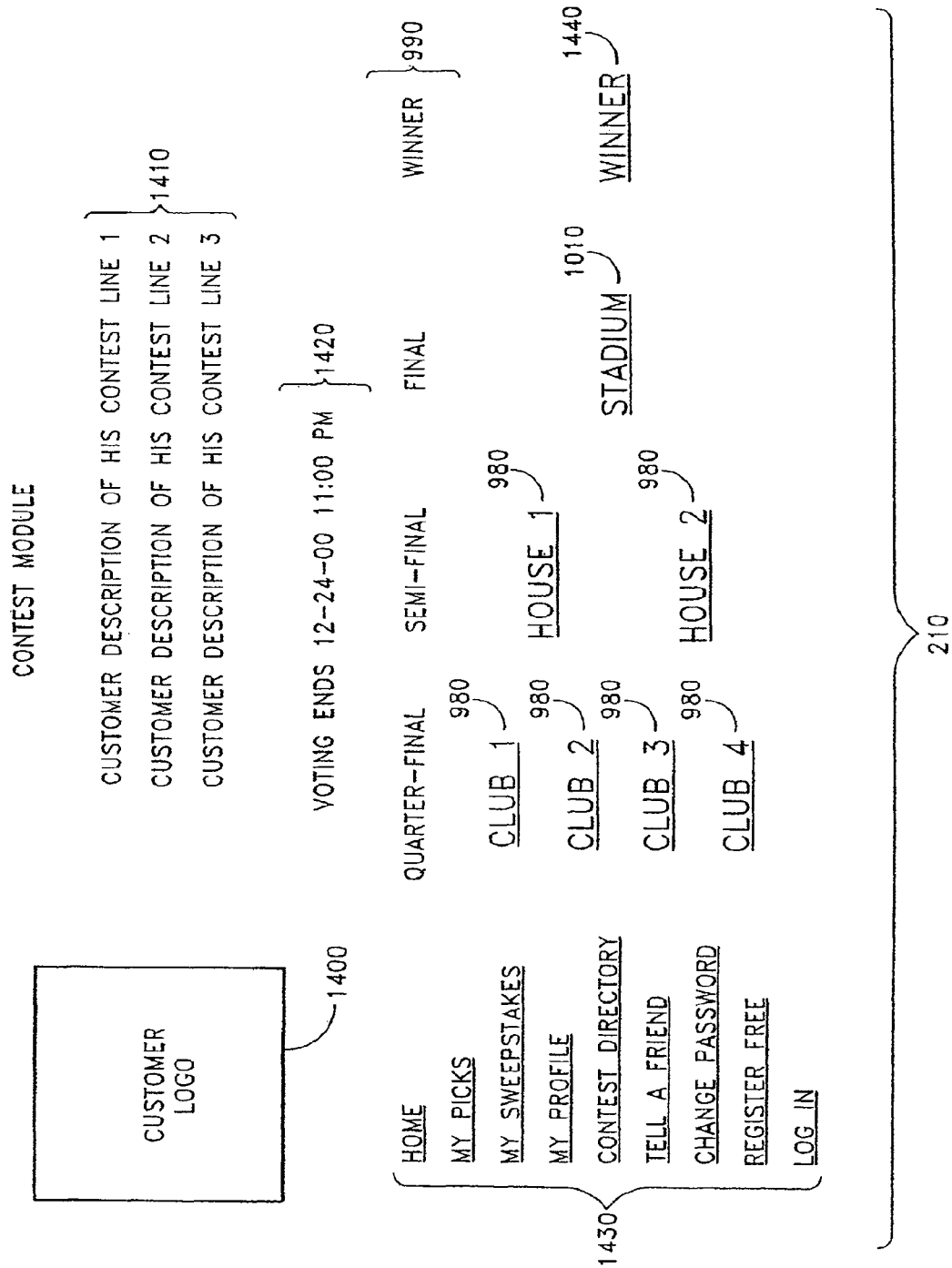
FIG. 16 shows an overview of one embodiment of a contest template form.
Figure 17:
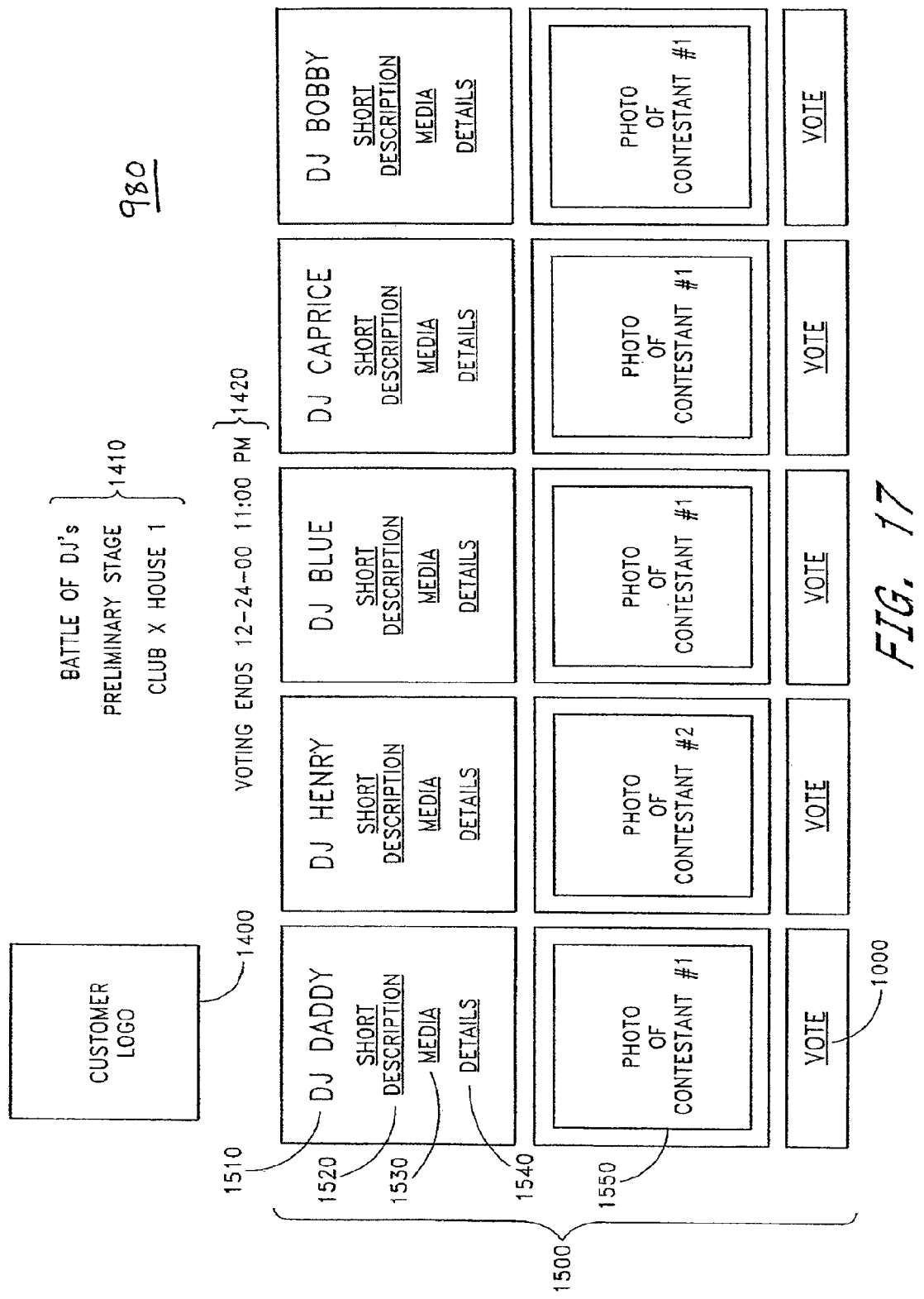
FIG. 17 shows an overview of one embodiment of a contest room.

FIG. 16 shows an overview of one embodiment of a TPICS contest template form. The contest template can be customizable within TPICS, or can be completely designed by the provider 110, where certain standard TPICS contest elements are included through embedded code (such as, for example XML, CSS, hyperlinks, or framed content.) In this embodiment, the contest template form includes a logo 1400 and a contest title 1410 customizably placed on the top portion of the form. A contest voting cutoff time 1420 is also posted to inform end-users 120 of contest duration. A set of end-user options 1430 is provided, and is described in more detail below. Finally, the TPICS contest 210 is customizably provided including one or more contest rounds 990 (e.g., quarter-final, semi-final, final) where each contest round 990 contains one or more contest rooms 980, 1010. Each contest room 980, 1010 provides, for example, a hyperlink to a detail view of each of the associated TPICS contestants (and associated content works).

After voting in each room 980 of a contest round 990, losing content is eliminated and winning content goes on to the next round 990. After the voting in the final round for the contestant works in the final room 1010, a winner 1440 is declared. The content producer associated with the winning content typically receives an award, such as, for example, sweepstakes entries, credit towards further submissions to TPICS, monetary awards, or a distribution agreement for their content.

FIG. 17 shows an overview of one embodiment of a TPICS contest room 980. Each contest room 980 includes objects representing some number of contestant 1500. For each contestant 1500, a contestant summary is provided including, for example, contestant name 1510, short description 1520, contestant media content 1530, and contestant details 1540, and the like. Other information provided for each contestant 1500, in one embodiment, includes contestant photos 1550. The media content 1530 is typically a link or path to descriptive data, either stored on TPICS or with a third party. The same options are typically provided for all contestants 1500 in a contestant room 980. Each contestant summary element 1510-1550 can include an option or link to more detailed information. Thus, in one embodiment, clicking on "contestant details" will provide a contestant detail form to an end-user, as shown below in FIG. 18. In one embodiment, the contest room includes customized form elements, including, for example, a customer logo 1400, a contest title 1410 and a voting cutoff time 1420.

An end-user 120 expresses a preference for a contestant by voting through a vote 1000. The vote may be a button, hyperlink, dialog box, or any other query which allows the user 120 to pick one or more contestants 1500 as preferred. The vote 1000 is associated with the voter (end-user, producer or expert submitting the vote) and is counted towards the content work in the contest, according to a voting algorithm. TPICS may be configured to allow one or more votes per voter, in each round or in each room. The number of votes permitted a voter in a room is preferably less than the number of contestants represented in the room.

FIG. 18 shows an overview of one embodiment of a TPICS contestant detail form. A contestant detail form can contain additional contestant information either stored at the TPICS system 100 in a content database 320, another TPICS database or some external location. For example, in one embodiment, the contestant detail form includes a contestant photo 1610 and contestant detailed information 1600. Provider customizations such as a customer logo 1400 can advantageously be included. Additionally, such a detail form can include, for example, media or products for sale through a purchase link 1620 to an e-commerce server 270, or links to a provider service or third party service such as the contestant's web page, interactive television channel, online store, and the like.

Figure 19:
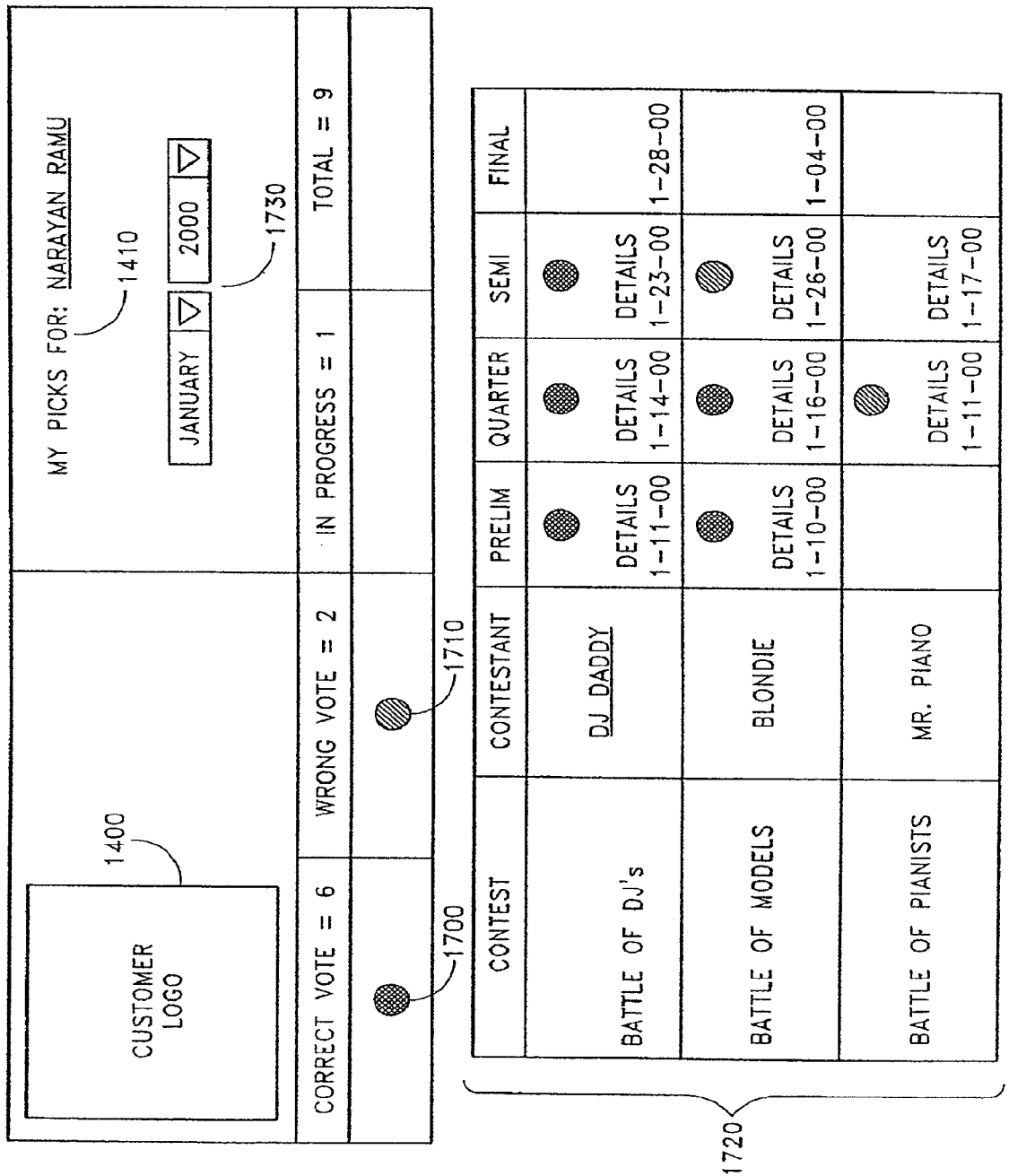
FIG. 19 shows one embodiment of a voting history form.

FIG. 19 shows one embodiment of an end-user voting history form 970, or "my picks" form, based on information stored in the voting ("my picks") data 410 portion of the end-user database 310. Such a form is accessible from a user options menu 1430. As shown in the user options menu 1430 (shown in FIG. 16), an end-user 120 can select a "my picks" option to view a history of previous and current "votes" in one or more ongoing or completed contests 210. Typically an end-user 120 can only vote 1000 in a particular contest round 990 while that round (or stage) is active. Once the contest round 990 has ended, voting for the round ends. After voting ends, if the end-user 120 voted for the contestant 1500 who received the most votes overall, the end-user's vote is "correct" 1700. If the end-user voted for a non-winning contestant, the end-user's vote is "wrong" 1710. As described below, in one embodiment of TPICS a correct vote results in the end-user receiving more sweepstakes entries than a wrong vote. However, an end-user may, in one embodiment, receive some sweepstakes entries for even a wrong vote. In each stage of a TPICS contest, the number of sweepstakes entries for either a correct or wrong vote can vary. In one embodiment, the "my picks" form presents a table view of vote totals 1720 of correct votes 1700 and wrong votes 1710 in each round 990 of each contest 210 in which the end-user 120 has participated.

For example, an HTML-based options selection button (i.e. drop down menu) can be used to view voting history 1730 for a particular user. As with other forms, customizations such as contest logo 1400 can be included.

FIG. 20 shows one embodiment of an end-user "my sweepstakes" form, based on information stored in the sweepstakes ("my sweepstakes") data 420 portion of the end-user database 310 and accessible from a user options menu 1430. In one embodiment, the "my sweepstakes" form presents a summary table view 1800 and detail table view 1810 of sweepstakes entries 1820. Summary and detail button options may determine which view TPICS presents. An end-user 120 can view the total number of sweepstakes entries 1820 awarded for various actions within the TPICS system 100. For each contest 210, given the number of correct votes 1700 and wrong votes 1710, a number of resulting sweepstakes entries 1820 are shown. For each non-contest activity (subscription to newsletters, friend referrals, and the like) a certain number of provider- (or administrator-) defined sweepstakes entries 1820 are added to the end-user's 120 total number of sweepstakes entries 1820. The sweepstakes entries may be used to enter contests for goods and services, including, for example, credit towards submission of content for expert review (in embodiments where the TPICS expert review system 290 is included) or credit towards purchases of content from providers 110 or third parties. Again, form customizations such as customer logo 1400 can be included in the form.

In one embodiment, TPICS 100 uses the same Sweepstakes features as in the first example embodiment described previously. In that example, there are different contest brackets for end-users with varying vote histories (i.e. end-users who vote more than 100 times/month, end-users who vote between 11-99 times/month, and end-users who vote less than 10 times/month), with each bracket having lower and upper bounds. The more an end-user votes, the more sweepstakes entries an end-user receives: end-users get different number of entries depending on how many times they have voted, which in turn puts them within certain brackets (i.e. frequent users, occasional users, new users, etc.)

FIG. 21 shows one embodiment of an end-user 120 profile form accessible from a user options menu 1430. Each end-user 120 can edit or reset various personal registration information 1900 stored in the end-user database 310 submitted during registration with the TPICS server. The end-user 120 can advantageously edit or reset personal registration information 1900 using an edit option 1910 or a reset option 1920. Options, such as privacy options (not shown), fee-for-use services (not shown), and the like, can advantageously be added to the end-user profile form.

FIG. 22 shows one embodiment of a list of available TPICS contests 210 accessible from a user options menu 1430. In one embodiment, for each contest 210 active on the contest server 200, a contest identification number 2200 is shown, along with contest short title 2210, contest short description 2220, and the sponsoring provider 2230 for each contest. The entries describing each contest may be hyperlinks providing more detail, for example, URL's may be associated with each of the entries representing a sponsoring provider, thus enabling hyperlink access to sponsor web sites when any of the sponsor entries is selected (for example by clicking over the text). The list of contests, available to all end-users 120, includes all public and active TPICS contests 210. The contest information embodied, for example, by 2200, 2210 and 2220 is typically stored in the provider database 300 along with other provider and contest information, but may be stored in any TPICS database.

FIG. 23 shows one embodiment of an end-user referral form accessible from a user options menu 1430. An end-user 120 can refer a friend via electronic mail, for which the end-user 120 can gain additional sweepstakes entries 1820. The user, in one embodiment, enters the friend name 2300, the friend e-mail address 2310, and can submit this information 2320 or reset the list of friend referrals 2330. If the friend registers with the TPICS system 100, additional sweepstakes entries 1820 are given to the referring end-user 120 in one embodiment.

Figure 24:
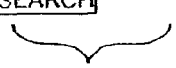
FIG. 24 shows one embodiment of a content submission form.

FIG. 24 shows one embodiment of a content submission form used by the producer submission module 235. As in other example forms, the customer logo 1400 and selection menu 1430 may be included in this embodiment of a content submission form. The content producer then submits content information, including but not limited to the content file 2400, which may be uploaded directly or simply provided as a hyperlink or file path. A genre 2410 is selected in this embodiment, for example, through an options pull-down menu with a set of pre-selected genres for the content producer to choose from. Other information may be collected as well, such as, for example, music tempo via a tempo pull-down menu 2420, music mood via a mood pull-down menu, lyrics, artist biography information, content description, and so on. The information shown in FIG. 24 is meant only as an example, and is not intended to be comprehensive or limiting. The information, once entered by the content producer through a network enabled access program such as a web browser, can be submitted through a submit button 2430 or cleared through a clear button 2440 in this embodiment.

Figure 25:
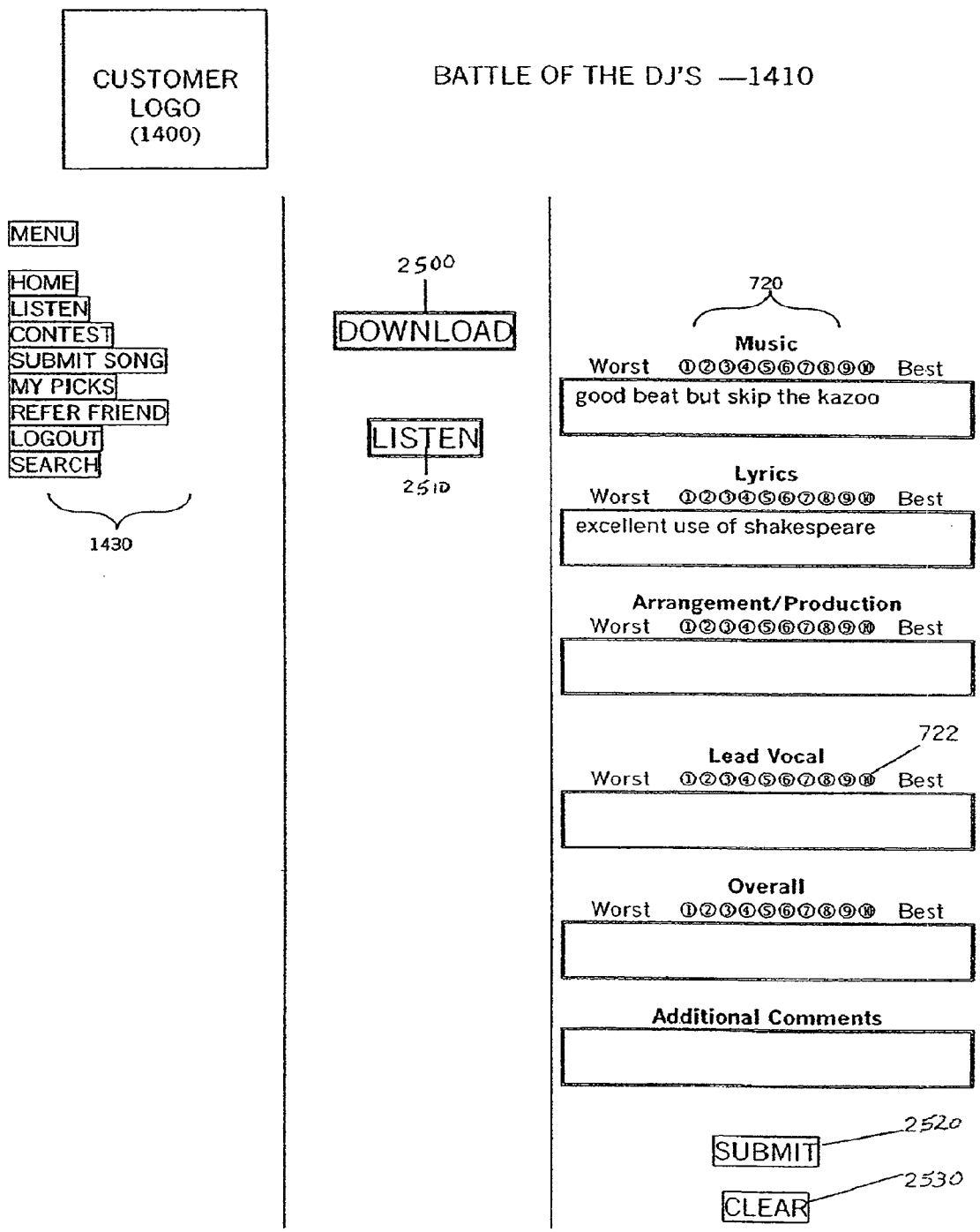
FIG. 25 shows one embodiment of an expert review form.

FIG. 25 shows one embodiment of an expert review form used by the expert review module 290. As in other forms, the customer logo 1400 and selection menu 1430 are present in this embodiment of an expert review form. The expert receives the expert review form from the contest server, through the network, and views it using a network enabled access program, such as a web browser, in this embodiment. The expert may download 2500 the content, or listen to (or view) 2510 the content via a streaming format such as provided by RealNetworks® or Microsoft®. The expert review 720 is divided into a number of categories, providing specific focus for the expert's review. In addition, for one or more categories, a predetermined set of aspect scores 722 (e.g., 1, 2, 3, 4, 5, 6, 7, 8, 9 and 10) is included, allowing the expert to simply select one of the set of aspect scores for a characteristic of the work. In another embodiment, the expert review form may provide for expert-selected aspect scores, numeric or otherwise. Alternatively, simple written instructions may provide guidance to the expert in suggesting a range of values to be used in ranking a work or characteristics of the work. When the expert is satisfied with the review, the review can be submitted via a submission button 2520 or cleared via a clear button 2530.

FIG. 26 shows one embodiment of a contest creation form used by the contest creation module 220 for creating a contest. Any number of contest creation formats can be used, and this form shows only one example using an HTML web form created by the contest creation module, and served by the contest server to the contest provider, where the contest provider views the form and submits contest creation information using a network enabled access program. Information such as the contest name 2600 (using a text input box), contest web address 2610 (using a text input box), contest template 2620 (using radio selector boxes), and contest period selection 2630 (using an options menu), using any kind of input form, can be entered. It will be appreciated by those of ordinary skill that a different format may be used to collect contest creation parameters, such as, for example, drop-down menus for a number of rounds, a number of rooms, a number of items per room, etc. Also, as an alternative to providing a fixed price for pre-determined contest formats, a price calculation algorithm can be used to determine the cost of a contest. One such algorithm may be $W*RM*RD (where W=number of works, RM=number of rooms, RD=number of rounds). Those of ordinary skill will appreciate that many other algorithms could be used and could weigh additional factors such as duration of contest period.

FIG. 27 shows an embodiment of a contest format form used by the contest creation module 220 for setting up a contest. In this example, contest description text 2700 (using text input boxes), a hyperlink to a customer logo 1400 to be displayed in a customer logo request 2710 (file path to logo data may be input using a text input box), and numerous contest form customizations 2720, such as background image or color 2730, font size and color 2740, hyperlink text size and color 2750, visited hyperlink text size and color 2760, or a CSS style sheet 2770 can be entered. The contest creation module 220 will apply the format selections to a contest it creates. Those of ordinary skill will appreciate that other formats may be entered and applied, such as, for example, font face, bolding, underlining, justification, and the like.

FIG. 28 shows yet another embodiment of a contest creation form used by the contest creation module 220 for producer selected content (see FIG. 5 item 715). When the contest provider submits content directly, rather than through a producer submission module 235, the contest provider can submit information including, for example, the contestant name 2800 (using a text input box), and the content work 2810 (using a path to data representing the content work entered via a text input box). In this case, the content is submitted via a hyperlink (uniform resource locator), and may or may not be stored on the TPICS system. A contest overview 2820 provides an overview of the customizations and format of the contest created.

FIG. 29 shows one embodiment of a form used by the contest creation module 220 for contest options. Any number of contest options, using a variety of input forms, such as HTML-based forms, can be used. In this embodiment, the contest creator is queried for a public or private contest 2900, where a private contest is not visible to other TPICS users in a contest directory such as shown in FIG. 22. Similarly, the contest provider can select whether a link to the contest directory is included using a contest directory link query 2910 (radio selector box). As another example, the contest provider can select whether banner advertising will be included from the advertising module using a banner advertisement query 2920 (radio selector box). Finally, the contest provider agrees to the terms and conditions 2930 of the TPICS system, by either accepting the conditions and creating the contest by an accept button 2940, or by canceling the contest 2950.

Applications of the Second Example Embodiment

In one embodiment, a TPICS system includes a Your Contest Network (YCN) using a set of semi-autonomous application modules, features and databases to provide services to providers such as, for example, third party, network accessible content providers, including but not limited to websites or interactive television features. Using YCN, providers can create their own custom contests using TPICS. Once providers have created their own contests, they imbed a "contest" link, or other contest code segment, within their own provider content in, for example, a website, interactive display, interactive television, or other interactive content. The "link" or contest code segment forwards visitors to the provider website or interactive display (hereinafter referred to as "users") from the provider to the provider's contest provided by a YCN server. End-users can register to become end-users of a YCN server in order to vote in the provider's contest or any other contest available on any particular YCN server, or end-users can be registered in association with a provider web-site or other external database.

A YCN server can share the same end-user membership database with an external server provided by a provider or by the YCN server itself, such as, for example, the expert review system described in the first example embodiment described above. In that case, both YCN and TPICS can share the same end-user membership database, MY PICKS, and MY SWEEPSTAKES data and features. However, YCN is typically much simpler than TPICS as it does not require any special class of reviewers to rank or grade content: specifically, YCN in one embodiment incorporates a contest server with the expert review module disabled. YCN only requires providers to set up their contest, and end-users to participate in the contest. Alternatively, each provider can correlate their membership database to YCN, by simply conforming their internal end-user data to a standard YCN end-user data template.

A YCN provider is typically responsible for uploading contestants and content in the first stage of their own contests, and therefore a YCN server does not require any system to "weed out" submissions to the contest. Such additional "weeding out" steps can be added, such as, for example, through the expert review TPICS implementation of the GCP ("general contestant pool") and SPP ("special preview pool or sneak peek pool") described above.

Providers can setup their account and create their contests by reaching a YCN server through any connection to the server, either local or through a network. In one embodiment, a contest can be created using a contest creation wizard ("CCW"). After contests have been created via a CCW, providers can update their contests and receive reports using a provider administrative tool ("PAT") provided to each provider by the YCN server. A provider can design, own and run multiple contests on a YCN server, and multiple providers can use the same YCN server for different contests served to different provider web-sites or content servers.

A YCN server can provide its providers any pre-defined set of contest templates. For example, a YCN server can provide 4 contest templates to select from, i.e. single-stage, 2-stage, 3-stage, and 4-stage contests, wherein each stage is an elimination round competition where a certain number of high-vote getting entries in each stage move on to the next stage. A YCN server need not use open-ended revolving contests, meaning that as winning contestants move forward to the next rounds, the previous rounds stay empty and are not filled. Alternatively, through application of modules from the TPICS system, previous rounds can stay filled as the contest continues over time.

For example, assuming a 4-stage contest (preliminary through final), when the 8 winners of the preliminary stage move into the 4 quarter-final pools, the 8 pools in the preliminary stage will remain empty and will not be filled by new contestants. The preliminary stage can, but need not, have new contest entrants after a previous set of contest entrants has been voted on in a contest round.

Each contest round can have a pre-defined length. For example, a YCN server can divide a contest into phases. In phase one of a YCN contest server 200, the length of a contest round can be any time period, from one hour to one day to one week. Minimum or maximum time bounds can be set, for example, restricting contests from being shorter than one day or longer than one week, but such bounds are adjustable by either the provider or the administrator of the YCN server. For example, a 4-stage contest with a contest round length of 1 day, takes a total of 4 days to complete. As another example, a 3-stage contest with a contest round length of one week, takes a total of 3 weeks to complete. The YCN system is flexible enough so that other lengths can be assigned to the contest rounds, for example, any multiple of 30 minutes such as 1 hour, 2 hours, 4.5 hours.

A YCN provider, in one embodiment, simply includes certain predefined YCN code segments in their own provider web site code. Alternatively, the YCN contest can be hosted on the YCN server, and the YCN provider can customize the contest using a number contest parameters. For example, contest text and titles, a YCN provider logo, a logo background color, and page formatting can be selected even if pages are hosted only on the YCN server.

A YCN provider is responsible for providing the contestants and media content to be used in the competition. A YCN server can host media, but a YCN server can allow providers to provide hosting and streaming their own media of any format (photos, MPEG Layer-3 Audio "MP3s", Real® media, OGG Vorbis, WMF "windows media format", and the like) at a known URL. A YCN server can thus typically need to store only the URLs for the contestant media, and not the actual media itself. When the YCN server need only store the URL of the provider-hosted content, it also allows any type of content accessible by URL to be implemented as part of a provider content, thus allowing for new media formats and new media technologies without the need to internally upgrade the YCN server.

Another embodiment of a YCN provider content design form, including YCN provider options for their contest, includes, for example, whether the contest is public, whether to link to the YCN contest directory, and whether to include banner advertising. The YCN provider is bound to a set of terms and conditions as well. Once the YCN provider has chosen contest parameters, customized the contest, and completed the registration process, then, in one embodiment, the YCN provider uses a standard e-commerce server to pay for the contest. In other embodiments, the YCN contest can be free.

Administrative personnel for a YCN server can use an administrative network to manage and monitor all the contests running on the YCN server. The administrative network can only be accessible to administrative personnel. In one embodiment, the YCN administrative network can be a subset of the TPICS administrator network.

Example YCN Application

In one example, a provider has a website called provider.com. The provider wants to create a contest on his site. The provider comes to a YCN server and uses a Contest Creation Wizard (CCW) to create his own custom contest, in one example embodiment of the CCW, using five steps. The order of these steps is adjustable depending on the implementation of the YCN server, and any particular order is not necessary to perform the steps properly.

The provider designs the contest by choosing a pre-defined template. The provider adds content to the first stage of the contest. The provider sets contest parameters—customizing the look and feel of the contest pages to match the provider's own web site. The provider chooses payment options—paying the YCN server provider for the creation and use of the contest. The provider publishes the contest, and thus starts the contest on the YCN server.

The provider signs up with a YCN server by entering required information, e.g. name, address, phone, etc. The amount and detail of information required varies from implementation to implementation. It is foreseen that this information can be automatically transferred from the provider to the YCN server through a secure identification channel, a preexisting database, and the like. The required provider information can also exist on another server such as an existing TPICS server.

Step 1: Design Contest

The provider defines the name of its contest (for example, "Battle of DJs," "Best Poem on Existentialism," or "Worst Business Method Patent Granted to Date"). In one embodiment, the contest name can be unique on the YCN server, but the YCN server can identify similarly named contests through internal identification numbers.

The provider can select a pre-defined contest template, such as, for example, one of the four pre-defined contests:

(a) Template #1 contains only 1 Stage (i.e. Final) containing only 1 pool (Pool 1), with 2 or more contestants allowed in the pool. Template #1 only has 1 Contest Round. The length of the Contest Round is fixed to 1 day or 1 week. Alternatively, end-users can vote approval or disapproval for one contestant, or the contest time can be adjusted.

(b) Template #2 contains 2 Stages (Semi-Final and Final) containing total of 3 pools (2 in Semi-Final and 1 in Final), with any number of contestants allowed in each pool. Template #2 has 2 Contest Rounds with any contest length for each round of the contest, such as 1 day or 1 week.

(c) Template #3 contains 3 Stages (Quarter-Final, Semi-Final and Final) containing total of 7 pools (4 in Quarter-, 2 in Semi- and 1 in Final), with 2 contestants allowed in each pool. Template #3 has 3 Contest Rounds with a fixed length of 1 day or one week per round. Therefore, the total contest period for Template #3 is either 3 days or 3 weeks.

(d) Template #4 contains 4 Stages (Preliminary, Quarter-Final, Semi-Final and Final) containing total of 15 pools (8 in Preliminary, 4 in Quarter-Final, 2 in Semi-Final and 1 in Final), with 2 contestants allowed in each pool. Template #4 has 4 Contest Rounds with a fixed length of 1 day or one week per round. Therefore, the total contest period for Template #4 is 4 days or 4 weeks.

Stage names are standardized for these templates (e.g. Preliminary, Quarter Final, Semi Final, and Final) but depending on YCN settings they can be changed by provider. In each Stage, there can be one or more "Pools" of contestants. This pool can be defined and later changed by the provider (e.g. Club House). Each pool can contain any number of contestants. The contestants, in one embodiment, are chosen by the provider.

Step 2: Add Content

In this Step, the provider enters any number of contestants in each pool of the first stage of the YCN contest. For each contestant, the provider enters a set of contestant identification information ("CII") constituting a number of fields of information for each contestant. CII contains, at least, the contestant name and the contestant content for the competition, or a code segment linking to the contestant content. For example, in one embodiment, the provider enters the following:

1—Contestant Name
2—Short Description of the Contestant
3—Picture or Picture Link for the contestant
4—Media Content or Media Link for the contestant
5—Detailed description of the contestant As noted previously, YCN can but does not need to store the photo and media content of contestants. YCN can accept URLs or other reference code which links to the required information. That information can be stored on the provider's web site, a third party web site, or distributed at various locations.

Step 3: Define Contest Parameters

In this step the provider can further customize their contest, for example, to add content and match the contest forms to the provider's own web pages. Customization can be provided through a combination of software code such as, for example, XML (extendable markup language), wherein certain standard YCN elements are called through known code segments. Alternatively, preformatted YCN web forms can be used to enter provider contest parameters. In one embodiment, for example, the customizations can include:

1—Contest Text: The provider can enter any number lines of text for his contest, and depending on implementation, this text can include code segments to include graphics, design, or text from the provider's web site.
2—Contest Logo
3—Logo background color or image
4—Page background color or image
5—Text font, size, and color
6—Assigning their contest to be a "Private" or "Public" contest:
   a. Public Contest means that YCN will list this provider's contest on the YCN's directory of live contests, whereby YCN visitors other than those forwarded by the provider's own web site can visit this contest and vote.
   b. Private Contest means that this contest will not be listed on the YCN directory of live contests. Therefore, only visitors forwarded from the provider's own web site can visit this contest and vote.
7—Including Contest Directory Link on the pages of the provider's contest
   a. YES means that visitors to this contest can click on the link and will be able to visit and vote in other contests on the YCN network.
   b. NO means that there will be no Contest Directory link on the provider's contest pages.
8—Including Banner Advertising
   a. YES means that YCN will be displaying YCN-controlled banner advertising on the pages of this provider's pages.
   b. NO means that no banner ads will be displayed on the pages of this provider's contest. If provider answers NO, he will have to pay additional charges to Your-Contest.net.

These options are provided by means of example. One of ordinary skill in the art will appreciate that the options can be extended, including adjusting the web page formatting to virtually any form, so long as some basic YCN elements remain present.

Step 4: Pay Service Fee

In this step, the provider pays for the use of YCN contest services and any other charges, for example by using a secure e-commerce system. Each contest template may have a pre-defined price. A YCN server can be used without an e-commerce connection (i.e. as a free system), and the e-commerce server can be used at other points in the YCN server such as, for example, to purchase additional content.

Step 5: Publish Contest

The YCN provider defines a contest start time. In one embodiment, the time is specified by a day and hour format, although the time can be provided in any known format, or a pre-defined but overrideable start time (e.g., the morning after provider contest publication at 8:00 AM) can be used. To activate the YCN provider contest, the provider clicks the PUBLISH button or performs an analogous "submission" action to publish the contest.

As long as the contest start time has not arrived, the provider can modify the contest start time and, in some embodiments, modify other features of the contest. However, once the contest has started, only certain customizable features of the contest can be edited, as described below for the Provider Administrative Tools ("PAT"). The YCN provider contest can be deleted, after which the contest will be over.

Provider Administrative Tool ("PAT")

Through the Provider Administrative Tool ("PAT") a YCN provider can perform administrative tasks related to their contest or contests hosted on YCN. For example, the PAT can permit the provider to edit their provider profile, manage end-users of the provider's contests, add new contests, edit existing contests, contact the YCN system administrator, seek help, and the like.

Specifically, YCN providers can edit their registration information which was originally entered upon registration. Further, YCN providers can manage end-users who use the provider's YCN contests. These are end-users who were forwarded to YCN via the provider's web site and, in one embodiment, then registered as members of YCN. In one embodiment, the provider can:

1—search for an end-user by Login Name (i.e. end-user Name), First Name, or Last Name.
2—access limited information about members
   a. First Name
   b. Last Name
   c. Login Name
   d. E-mail Address
   e. Number of Votes Cast in each of the provider's contests Depending on provider web site privacy policies, YCN privacy policies, and state and federal law, access to end-user and/or provider information can be limited. These limitations can be implemented by the YCN system administrator or by individual YCN providers.

Through the PAT, a YCN provider can use the CCW to create a new YCN contest, or to edit existing YCN contests. In one embodiment, if a YCN contest has already started, provider can edit:

(a) Contestant Pool names
(b) Contest Round names
(c) Photo and Media Content/Media Content URL of the contestants
(d) Background and text colors If a contest has not already started, the provider can edit all contest and contestant parameters that are available in the CCW.

YCN Administrator Intranet

The YCN Administrator Intranet ("YAI") allows YCN system administrators to manage and monitor the providers and contests of YCN. The YAI is only accessible to YCN personnel and is not typically accessible to YCN providers or YCN end-users.

The YCN system administrators can get summary and detail reports for all YCN contests. In one embodiment, information includes:

(a) Contest Status (e.g., In Progress, Pending (not started), Over)
(b) Contest Type (e.g., 2-stage, 4-stage)
(c) Referring Web Site
(d) Contact person
(e) Unique Voters: Number of unique YCN members (whether or not they were referred by provider's site) who have voted in this Contest
(f) Total Votes: total number of votes cast in a contest by Unique Voters
(g) Contest Details: Detail of the contest including contestant names in each stage, each match, number of votes cast per contestant, etc.

The system administrator can generate several types of accounting reports including reports for all contests, selected contests, all providers, selected providers, etc. The YCN system administrator can also generate Summary and Detail reports of its providers, and all attributes of the contest(s) created by the providers. Finally, the YCN system administrator can generate Summary and Detail reports of all YCN registered members.

YCN Front End

Once a provider creates and publishes a contest, the YCN server provides the provider with contest code such as a URL ("uniform resource locator") to be embedded in the provider's site (e.g. yourcontest.net/@providersite.com), content to be "framed" within the provider's site, a set of markup language code such as HTML, XML, and the like, or a set of script commands such as, for example, Java or JavaScript.

When visitors to the provider's site click on the above URL, they will enter the provider's contest, which in one embodiment is hosted on the YourContest.net servers. From there, the front end can resemble the fan elimination contest portion of the TPICS system described previously, or can use style sheets, markup language, or other customized forms provided by YCN or a YCN provider which contain standard YCN elements.

In one embodiment, non-user visitors to YCN (visitors to the YCN site who are not registered YCN end-users) can move around the contest pools (matches) and read about and listen to contestants, but cannot vote. Similarly, in one embodiment, visitors will have to register to YCN (which can be the same database as TPICS or a database associated with a provider site), to become an end-user. Registered end-users then can vote in the pools. In one embodiment, each time a registered member votes, he/she earns sweepstakes entries as defined in the a system table such as the TPICS vote weight tables, an example of which is shown below:

TABLE 3

| Total Votes | Entries for each Incorrect Vote | Entries for each Correct Vote |
|---|---|---|
| 1-15 | 1 entry | 2 entries |
| 16-30 | 2 entries | 4 entries |
| 31-45 | 4 entries | 8 entries |
| 46 or more | 8 entries | 16 entries |

For all "correct" votes (votes for a contestant who wins a contest round), refer-a-friend (referrals of friends who register with the site), registration with YCN, and opt-in entries are also calculated as defined in, for example, a similar vote weight table.

In one embodiment, the "Home" option takes the end-user back to the provider site that had originally referred the end-user to YCN when the end-user registered with YCN. Alternatively the "Home" option can take an end-user to the YCN homepage or any page designated by YCN, the provider, or customized by the end-user. The "Vote" option takes the end-user to the YCN provider contest to which the end-user was referred.

The "My Picks" option calculates and displays the YCN contest names and the date of each vote for a particular end-user, along with, in one embodiment, the number of sweepstakes entries and other statistics for a particular YCN end-user.

The "My Sweepstakes" option calculates and displays summary and detail reports for a YCN end-user's particular votes and sweepstakes entries. The report could, for example, display the votes (e.g. correct, wrong, etc.) for all the YCN contests in which the member has voted, along with additional sweepstakes entries for other YCN activities such as referring a friend, and the like. The end-user can modify his/her personal data through a "My Profile" option.

The "Contest Directory" displays an updated list of all active and public YCN contests. An active contest is one that is currently in progress (voting is open to registered end-users). A YCN provider chooses during contest creation whether the contest is public (displayed for all end-users to enter in the "Contest Directory") or private (not displayed in the "Contest Directory" and only open to end-users from that provider's web site.)

YCN is designed and implemented with open-ended scalability and performance in mind. Potentially, hundred of providers could create thousands of contests which would all be running in parallel, with tens of thousands of end-users voting on-line. In addition, the "Promotional Code" feature allows administrators or providers to selectively give users or providers discount coupons (through, for example, coupon passwords), and contains the functionality below:

(a) Generate Promotional Code: Allow YCN system administrator to generate Promotional Codes
(b) Add a new field to the E-commerce page, called "Promotional Code". Providers, who enter a valid Promotional Code, can create a contest for free or have some type of discount.

Member E-mail Confirmation

When a new person registers to YCN as a YCN end-user, the system may automatically send a confirmation e-mail to the registrant's e-mail address. The end-user typically then clicks on a link inside the body of the e-mail, or alternatively replies to the system confirmation e-mail, to confirm registration. This provides some assurance that YCN only registers end-users with valid e-mail addresses. If the automated system e-mail results in an error, that is if the registrant's e-mail address is not valid, the end-user typically is not registered as a YCN end-user.

Instant Vote Calculation and Results

Once a YCN end-user successfully casts a vote in a pool, the YCN system typically calculates the vote results for all contestants in the pool automatically and displays the results to the end-user. For example, there are 3 contestants in a pool, where contestant A has 55 votes, Contestant B has 34 votes, and Contestant C has 10 votes. If an end-user casts a vote for Contestant B, system should then automatically calculate all the votes and display the following to the member:

(a) Contestant A: 55
(b) Contestant B: 35
(c) Contestant C: 10

This invention may be embodied in other specific forms without departing from the essential characteristics as described herein. The embodiments described above are to be considered in all respects as illustrative only and not restrictive in any manner. The scope of the invention is indicated by the following claims and their equivalents rather than by the foregoing description.

What is claimed is:

1. A computer based contest method comprising:
accessing computer-executable instructions from at least one computer-readable storage medium; and
executing the computer-executable instructions, thereby causing computer hardware comprising at least one computer processor to perform operations comprising:
receiving first content data, the first content data representing a first content work from a first content creator;
storing the first content data in a computer accessible data storage;
receiving second content data, the second content data representing a second content work from a second content creator;
storing the second content data in the computer accessible data storage;
selecting the first and second content data from the computer accessible data storage;
generating contest data based on the first and second content data wherein the contest data comprise a representation of the first and second content works;
transmitting the contest data to cause the contest data to be displayed on a computer generated stage, and causing the computer generated stage to display both the first and second content data simultaneously, the computer generated stage is displayed on a display device;
generating vote request data representing a request to at least one user to cast at least one vote for the first content work or for the second content work;
receiving vote data and aggregating the vote data, the vote data representing at least one vote for the first content work or for the second content work; and
comparing aggregate vote data for the first and second content works, wherein the aggregate vote data is received from a plurality of users.

2. The computer based method of claim 1, further comprising the steps of:
comparing a first number of votes for the first content work to a second number of votes for the second content work; and
selecting the first content work as the winning work if the first number of votes for the first content work is greater than the second number of votes for the second content work.

3. The computer based method of claim 2, further comprising the step of generating a vote status display that represents a number of votes for the first content work and a number of votes for the second content work.

4. The computer based contest method of claim 2, wherein the winning work is selected after a period of time representing the duration of the contest.

5. The computer based contest method of claim 1, further comprising the steps of:
receiving first expert review data, the first expert review data comprising a first score for the first content work, wherein at least one expert assigns the first score to the first content work; and
receiving second expert review data, the second expert review data comprising a second score for the second content work, wherein at least one expert assigns the second score to the second content work.

6. The computer based contest method of claim 5, wherein the step of transmitting the contest data occurs after receipt of the first and second expert review data.

7. The computer based contest method of claim 5, further comprising the step of comparing the first and second expert review data to select either the first content work or the second content work as a top scoring content work.

8. The computer based contest method of claim 7, further comprising the step of adding top scoring content data representing the selected top scoring content work to contest pool data that represent a plurality of content works.

9. The computer based contest method of claim 8, further comprising the step of transmitting contest pool data.

10. The computer based contest method of claim 1, wherein the step of transmitting the contest data occurs after a predetermined time.

11. The computer based contest method of claim 1, wherein the operations further comprises selecting at least one of the first or second content works as a winner based on the aggregated vote data.

12. A contest system comprising:
at least one computer processor configured to execute modules comprising at least:
a producer submission module configured to receive first content data, the first content data representing a first content work from a first content creator;
a computer readable storage configured to store the first content data;
the producer submission module configured to receive second content data, the second content data representing a second content work from a second content creator;
the computer readable storage configured to store the second content data;
a content filtering module configured to select the first and second content data from the computer readable storage;
a contest creation module configured to generate contest data based on the first and second content data wherein the contest data comprise a representation of the first and second content works;
a communications module configured to transmit over a network the contest data to cause the contest data to be displayed on a computer generated stage, and to cause the computer generated stage to display both the first and second content data simultaneously, the computer generated stage is displayed on a display device;
a voting module configured to generate vote request data representing a request to at least one user to cast at least one vote for the first content work or for the second content work;
the voting module configured to receive vote data and aggregating the vote data, the vote data representing at least one vote for the first content work or for the second content work; and
the voting module configured to compare aggregate vote data for the first and second content works, wherein the aggregate vote data is received from a plurality of users.

13. The contest system of claim 12, wherein the voting module is further configured to compare a first number of votes for the first content work to a second number of votes for the second content work; and select the first content work as the winning work if the first number of votes for the first content work is greater than the second number of votes for the second content work.

14. The contest system of claim 13, wherein the winning work is selected after a period of time representing the duration of the contest.

15. The contest system of claim 12, wherein the voting module is further configured to generate a vote status display data that represents a number of votes for the first content work and a number of votes for the second content work and transmit the vote status display data over a network to cause the vote status display data to be displayed on the computer generated stage.

16. The contest system of claim 12, wherein the communications module is further configured to transmit the contest data after a predetermined time.

17. The contest system of claim 12, wherein the voting module is further configured to select at least one of the first or second content works as a winner based on the aggregated vote data.

18. The computer based contest method of claim 12, further comprising:
an expert review module configured to receive first expert review data, the first expert review data comprising a first score for the first content work;
the expert review module configured to further receive second expert review data, the second expert review data comprising a second score for the second content work;
the expert review module configured to further compare the first and second expert review data to select either the first content work or the second content work as a top scoring content work; and
a contest module configured to add top scoring content data representing the selected top scoring content work to contest pool data that represent a plurality of content works.

19. The contest system of claim 12, further comprising an expert review module configured to receive first expert review data, the first expert review data comprising a first score for the first content work, wherein at least one expert assigns the first score to the first content work; and
configured to receive second expert review data, the second expert review data comprising a second score for the first content work, wherein at least one expert assigns the second score to the second content work.

20. The contest system of claim 19, wherein the communications module is configured to transmit the contest data after receipt of the first and second expert review data.

21. The contest system of claim 19, wherein the expert review module is further configured to compare the first and second expert review data to select either the first content work or the second content work as a top scoring content work.

22. A computer based contest method comprising:
accessing computer-executable instructions from at least one computer-readable storage medium; and
executing the computer-executable instructions, thereby causing computer hardware comprising at least one computer processor to perform operations comprising:
receiving first content data, the first content data representing a first content work from a first content creator;
storing the first content data in a computer accessible data storage;
receiving second content data, the second content data representing a second content work from a second content creator;
storing the second content data in the computer accessible data storage;
selecting the first and second content data from the computer accessible data storage;
generating contest data based on the first and second content data wherein the contest data comprise a representation of the first and second content works;
transmitting the contest data to cause the contest data to be displayed on a computer generated stage, and causing the computer generated stage to display both the first and second content data simultaneously, the computer generated stage is displayed on a display device;
generating vote request data representing a request to at least one user to cast at least one vote for the first content work or for the second content work;
receiving vote data and aggregating the vote data, the vote data representing at least one vote for the first content work or for the second content work;

comparing aggregate vote data for the first and second content works, wherein the aggregate vote data is received from a plurality of users;

receiving first expert review data, the first expert review data comprising a first score for the first content work;

receiving second expert review data, the second expert review data comprising a second score for the second content work;

comparing the first and second expert review data to select either the first content work or the second content work as a top scoring content work;

adding top scoring content data representing the selected top scoring content work to contest pool data that represent a plurality of content works.

23. The computer based contest method of claim 22, further comprising the step of transmitting contest pool data.

24. The computer based contest method of claim 22, further comprising selecting at least one of the first or second content works as a winner based on the aggregated vote data.

25. The computer based method of claim 22, further comprising:

comparing a first number of votes for the first content work to a second number of votes for the second content work; and selecting the first content work as the winning work if the first number of votes for the first content work is greater than the second number of votes for the second content work.

26. The computer based method of claim 25, further comprising generating a vote status display that displays a number of votes for the first content work and a number of votes for the second content work.

* * * * *

UNITED STATES PATENT AND TRADEMARK OFFICE
CERTIFICATE OF CORRECTION

| | | |
|---|---|---|
| PATENT NO. | : 8,019,641 B2 | Page 1 of 1 |
| APPLICATION NO. | : 12/233487 | |
| DATED | : September 13, 2011 | |
| INVENTOR(S) | : Foroutan | |

It is certified that error appears in the above-identified patent and that said Letters Patent is hereby corrected as shown below:

At Title page 1, line 1, item 73 please delete "Opusone Corporation," and insert therefore, --OPUSONE CORPORATION D/B/A MAKESTAR.COM--.

At Title page 2, column 1, line 13, item 56 please delete ""Panle" and insert therefore, --"Panel--.

At Sheet 10 of 30, FIG. 9, Reference Numeral 910, please delete "(SSPs)" and insert therefore, --(SPPs)--.

At column 5, line 41, after "operations" please insert --.--.

At column 6, line 59, please delete "an a" and insert therefore, --a--.

At column 33, line 65, please delete "(SSPs)" and insert therefore, --(SPPs)--.

At column 34, line 59, please delete "an a" and insert therefore, --a--.

At column 46, line 30, please delete "the a" and insert therefore, --the--.

Signed and Sealed this
Sixth Day of March, 2012

David J. Kappos
*Director of the United States Patent and Trademark Office*